(12) United States Patent
Kim et al.

(10) Patent No.: US 11,251,586 B2
(45) Date of Patent: Feb. 15, 2022

(54) OPTICAL TRANSMISSION MODULE

(71) Applicant: SUZHOU LEKIN SEMICONDUCTOR CO., LTD., Taicang (CN)

(72) Inventors: Baek Jun Kim, Seoul (KR); Ho Jae Kang, Seoul (KR); Keon Hwa Lee, Seoul (KR); Yong Gyeong Lee, Seoul (KR)

(73) Assignee: SUZHOU LFKTN SEMICONDUCTOR CO., LTD., Taicang (CN)

( * ) Notice: Subject to any disclaimer, the term of this patent is extended or adjusted under 35 U.S.C. 154(b) by 38 days.

(21) Appl. No.: 16/469,968

(22) PCT Filed: Dec. 13, 2017

(86) PCT No.: PCT/KR2017/014663
§ 371 (c)(1),
(2) Date: Jun. 14, 2019

(87) PCT Pub. No.: WO2018/110981
PCT Pub. Date: Jun. 21, 2018

(65) Prior Publication Data
US 2020/0083670 A1      Mar. 12, 2020

(30) Foreign Application Priority Data

Dec. 15, 2016 (KR) .................. 10-2016-0171468
Dec. 26, 2016 (KR) .................. 10-2016-0179274
Jan. 26, 2017 (KR) .................. 10-2017-0012757

(51) Int. Cl.
H01S 5/183      (2006.01)
H01S 5/022      (2021.01)
(Continued)

(52) U.S. Cl.
CPC .......... H01S 5/18361 (2013.01); H01S 5/022 (2013.01); H01S 5/02251 (2021.01);
(Continued)

(58) Field of Classification Search
CPC ... H01S 5/0228–02284; H01S 5/02256; H01S 5/0226; H01S 5/02272;
(Continued)

(56) References Cited

U.S. PATENT DOCUMENTS 4,385,800 A    5/1983  Basola et al.
4,797,890 A *  1/1989  Inaba ....................... H01S 5/42
                                                       372/50.124
(Continued)

FOREIGN PATENT DOCUMENTS

CN    1469147 A    1/2004
CN    1573389 A    2/2005
(Continued)

*Primary Examiner* — Joshua King
(74) *Attorney, Agent, or Firm* — Birch, Stewart, Kolasch & Birch, LLP

(57) ABSTRACT

Embodiments relate to a semiconductor device, an optical transmission module, and an optical transmission apparatus. An optical transmission module according to an embodiment includes a board; a submount disposed on a first surface of the board; a vertical cavity surface emitting laser (VCSEL) semiconductor device disposed on a first surface of the submount; and a module housing including a coupling unit and a body, the coupling unit spaced apart from the vertical cavity surface emitting laser (VCSEL) semiconductor device and facing the first surface of the submount, the body extending from the coupling unit toward the first surface of the board and disposed around the submount and the vertical cavity surface emitting laser (VCSEL) semiconductor device.

20 Claims, 58 Drawing Sheets

(51) Int. Cl.
*H01S 5/42* (2006.01)
*H01S 5/02251* (2021.01)
*G02B 6/42* (2006.01)

(52) U.S. Cl.
CPC ............ *H01S 5/423* (2013.01); *G02B 6/4228* (2013.01); *G02B 6/4296* (2013.01); *H01S 5/18327* (2013.01); *H01S 5/18341* (2013.01)

(58) Field of Classification Search
CPC .................... H01S 5/02236–02244; H01S 5/02208–02216; H01S 5/42–426; G02B 6/4296; G02B 6/4202; G02B 6/428–4281
See application file for complete search history.

(56) References Cited

U.S. PATENT DOCUMENTS

| | | | | |
|---|---|---|---|---|
| 4,988,159 | A | 1/1991 | Turner et al. | |
| 5,434,939 | A * | 7/1995 | Matsuda | G02B 6/4202 257/116 |
| 5,761,229 | A * | 6/1998 | Baldwin | H01S 5/02288 372/109 |
| 5,812,571 | A * | 9/1998 | Peters | G02B 6/421 372/36 |
| 6,001,664 | A * | 12/1999 | Swirhun | H01S 5/0262 148/DIG. 128 |
| 6,069,905 | A * | 5/2000 | Davis | G02B 6/4204 372/103 |
| 6,526,205 | B1 * | 2/2003 | Wilson | G02B 6/4231 216/24 |
| 6,588,942 | B1 * | 7/2003 | Weld | G02B 6/4228 385/88 |
| 6,757,308 | B1 * | 6/2004 | Eldring | H01S 5/02284 372/109 |
| 6,810,065 | B1 * | 10/2004 | Naone | H01S 5/18311 372/45.01 |
| 7,232,263 | B2 | 6/2007 | Sashinaka | G02B 6/4204 385/52 |
| 7,358,109 | B2 * | 4/2008 | Gallup | H01S 5/02288 257/E33.056 |
| 8,050,308 | B2 * | 11/2011 | Lipson | G02B 27/0944 372/108 |
| 8,378,475 | B1 * | 2/2013 | Veitch | H01L 27/14618 257/686 |
| 8,399,292 | B2 * | 3/2013 | Doany | G02B 6/4246 438/106 |
| 8,634,682 | B1 * | 1/2014 | Stone | G02B 6/43 385/14 |
| 2002/0025122 | A1 * | 2/2002 | Ouchi | G02B 6/4249 385/88 |
| 2002/0025125 | A1 * | 2/2002 | Williams | G02B 6/3897 385/92 |
| 2002/0031313 | A1 * | 3/2002 | Williams | G02B 6/3897 385/92 |
| 2002/0057883 | A1 * | 5/2002 | Malone | H01S 5/026 385/136 |
| 2003/0026303 | A1 * | 2/2003 | Ouchi | H01S 5/02272 372/36 |
| 2003/0053501 | A1 * | 3/2003 | Sekiya | H01S 5/18361 372/50.11 |
| 2004/0022487 | A1 | 2/2004 | Nagasaka et al. | |
| 2004/0165845 | A1 * | 8/2004 | Lemoff | H01S 5/423 385/116 |
| 2004/0190851 | A1 * | 9/2004 | Garner | G02B 6/3672 385/137 |
| 2004/0228588 | A1 * | 11/2004 | Eldring | H01S 5/02284 385/94 |
| 2004/0252736 | A1 * | 12/2004 | Nakayama | G02B 6/4204 372/36 |
| 2005/0002618 | A1 | 1/2005 | Miyamae et al. | |
| 2005/0069013 | A1 * | 3/2005 | Bhandarkar | H01S 5/4012 372/102 |
| 2005/0121687 | A1 | 6/2005 | Yamada | |
| 2005/0286597 | A1 | 12/2005 | Mukoyama et al. | |
| 2006/0051029 | A1 | 3/2006 | Aizpuru et al. | |
| 2006/0086947 | A1 * | 4/2006 | Johnson | G02B 6/4248 257/100 |
| 2006/0115277 | A1 * | 6/2006 | Yamada | G02B 6/4202 398/143 |
| 2006/0275000 | A1 | 12/2006 | Yuang | |
| 2007/0278666 | A1 * | 12/2007 | Garcia | H01L 23/3677 257/707 |
| 2008/0043796 | A1 * | 2/2008 | Jikutani | G02B 6/43 372/50.11 |
| 2009/0323748 | A1 * | 12/2009 | Nobuhara | G02B 6/4232 372/43.01 |
| 2010/0074581 | A1 | 3/2010 | Tanobe et al. | |
| 2010/0108868 | A1 * | 5/2010 | Tamura | G02B 6/4232 250/227.28 |
| 2010/0111125 | A1 * | 5/2010 | Kondo | H01S 5/1833 372/45.01 |
| 2010/0272388 | A1 | 10/2010 | Im et al. | |
| 2011/0026937 | A1 * | 2/2011 | Saitou | G02B 6/424 398/201 |
| 2011/0044369 | A1 * | 2/2011 | Andry | H01L 27/1446 372/50.124 |
| 2012/0170084 | A1 * | 7/2012 | Takeda | H01S 5/18391 358/480 |
| 2013/0266255 | A1 | 10/2013 | Tan et al. | |
| 2014/0097459 | A1 * | 4/2014 | Motohara | H01L 31/02325 257/98 |
| 2015/0003792 | A1 | 1/2015 | Mathai et al. | |
| 2015/0098237 | A1 | 4/2015 | Motohara | |
| 2016/0013616 | A1 | 1/2016 | Yamauchi | |
| 2018/0048125 | A1 * | 2/2018 | Hayakawa | G02F 1/0115 |

FOREIGN PATENT DOCUMENTS

| | | | | |
|---|---|---|---|---|
| CN | 101652691 A | | 2/2010 | |
| DE | 10053569 A1 * | | 5/2001 | ......... H01S 5/02288 |
| FR | 2879759 A1 * | | 6/2006 | ............. H01S 5/183 |
| JP | 09199795 A * | | 7/1997 | |
| JP | H09199795 A * | | 7/1997 | |
| JP | 2006-30463 A | | 2/2006 | |
| JP | 2006030813 A * | | 2/2006 | |
| JP | 2012-32733 A | | 2/2012 | |
| JP | 2012-203147 A | | 10/2012 | |
| JP | 2013-15859 A | | 1/2013 | |
| JP | 2015068835 A * | | 4/2015 | |
| KR | 10-2006-0048555 A | | 5/2006 | |
| KR | 10-2010-0117005 A | | 11/2010 | |
| KR | 10-1276508 B1 | | 6/2013 | |
| WO | WO-9905758 A1 * | | 2/1999 | ......... H01S 5/02284 |
| WO | WO-0079659 A1 * | | 12/2000 | ............. H01L 33/44 |

\* cited by examiner

[FIG. 1]
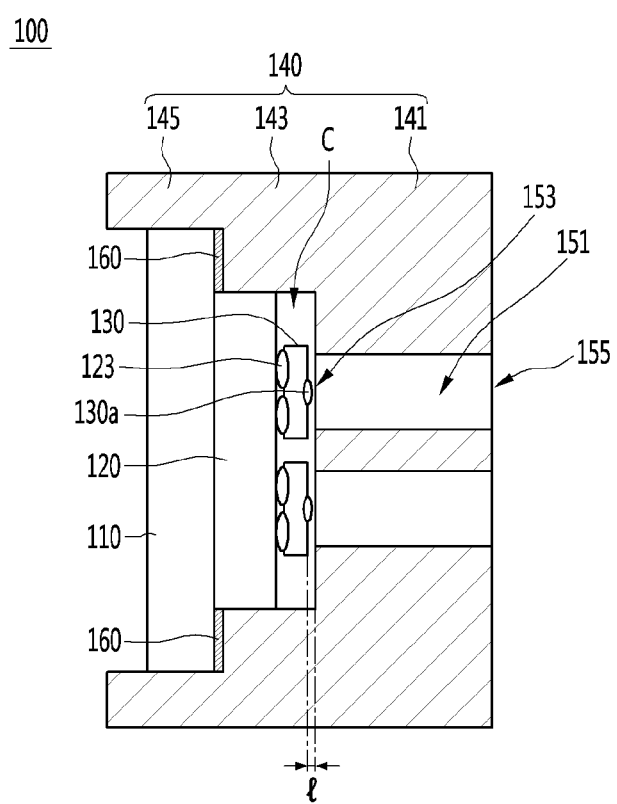

[FIG. 2]
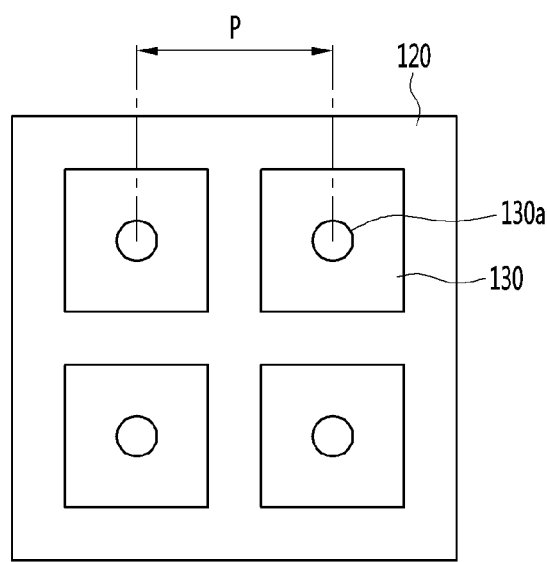

[FIG. 3]
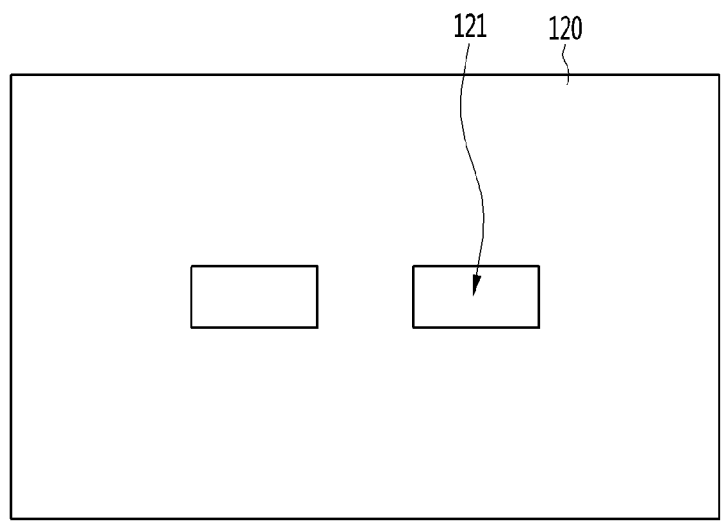

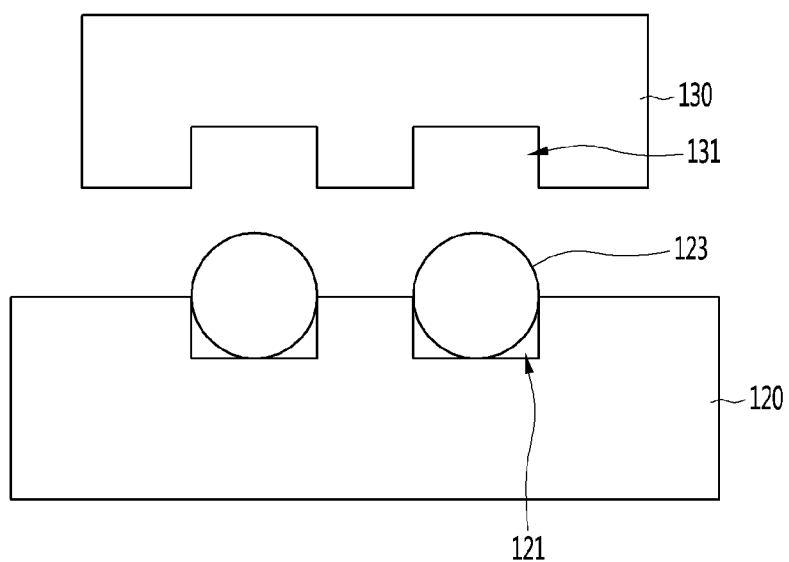
[FIG. 4]

[FIG. 5]
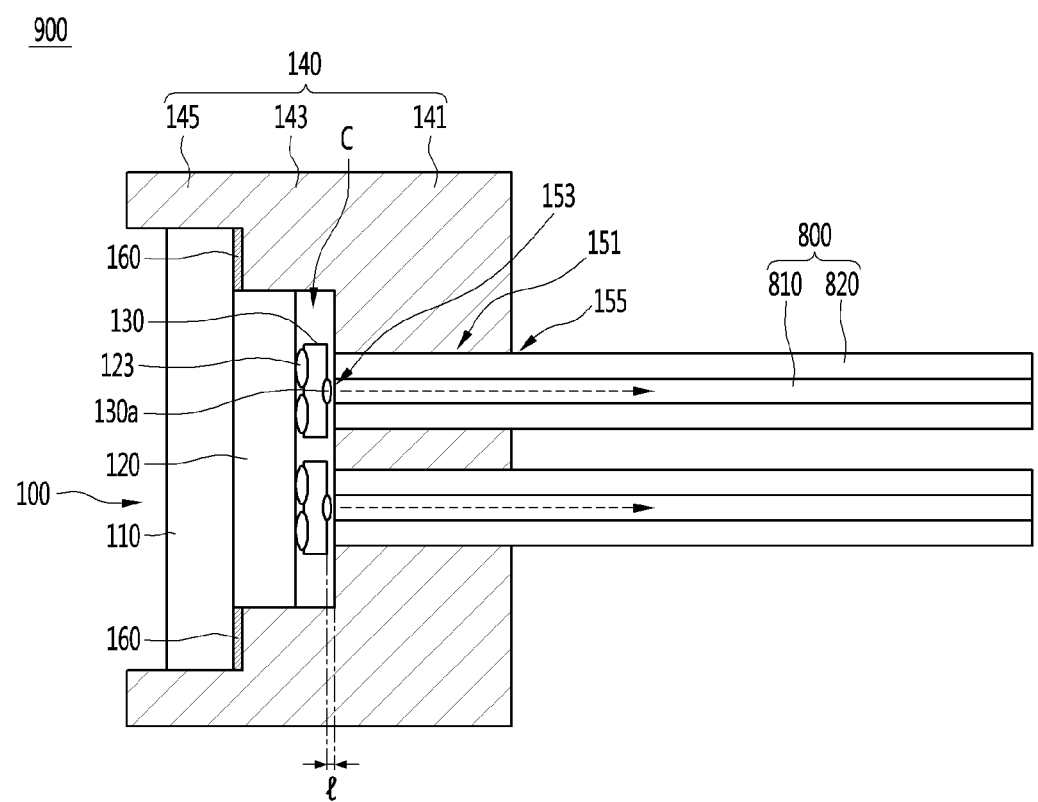

[FIG. 6]
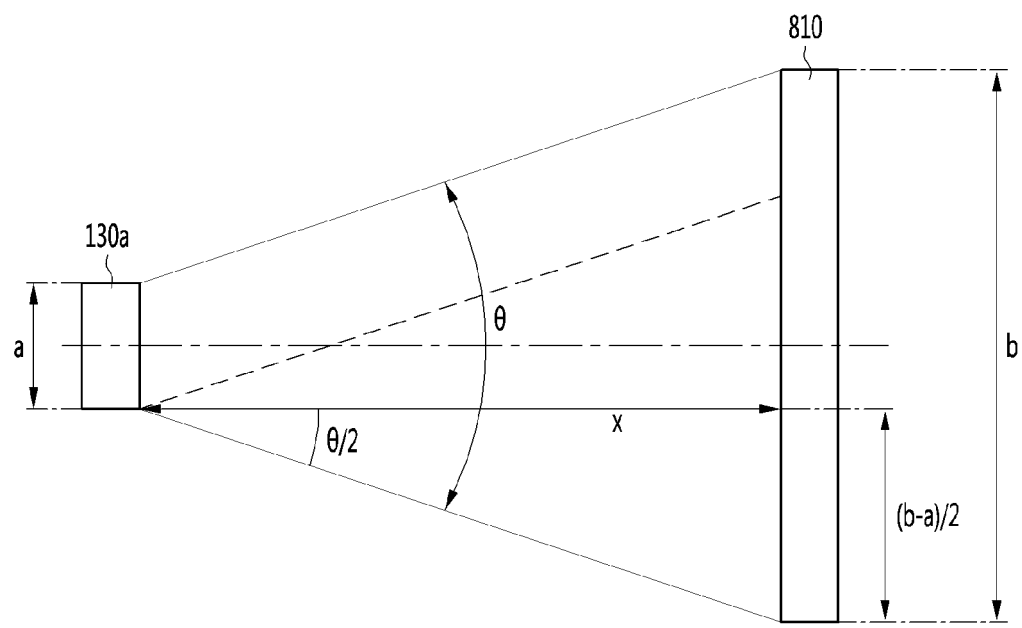

[FIG. 7]
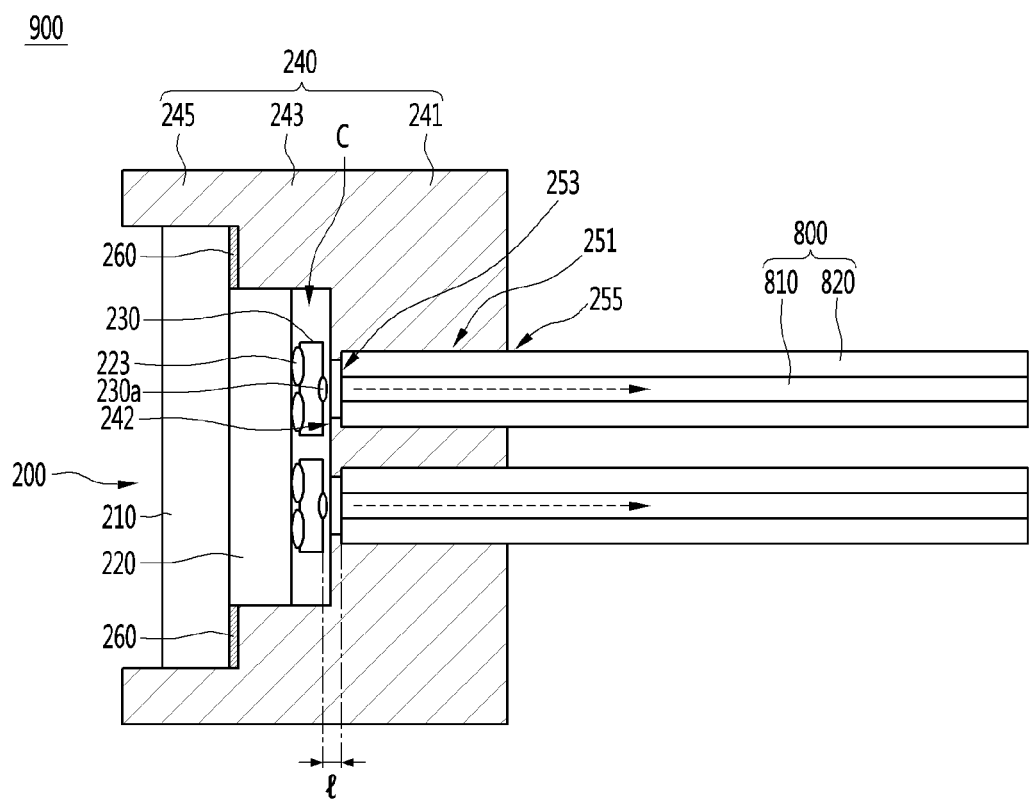

【FIG. 8】
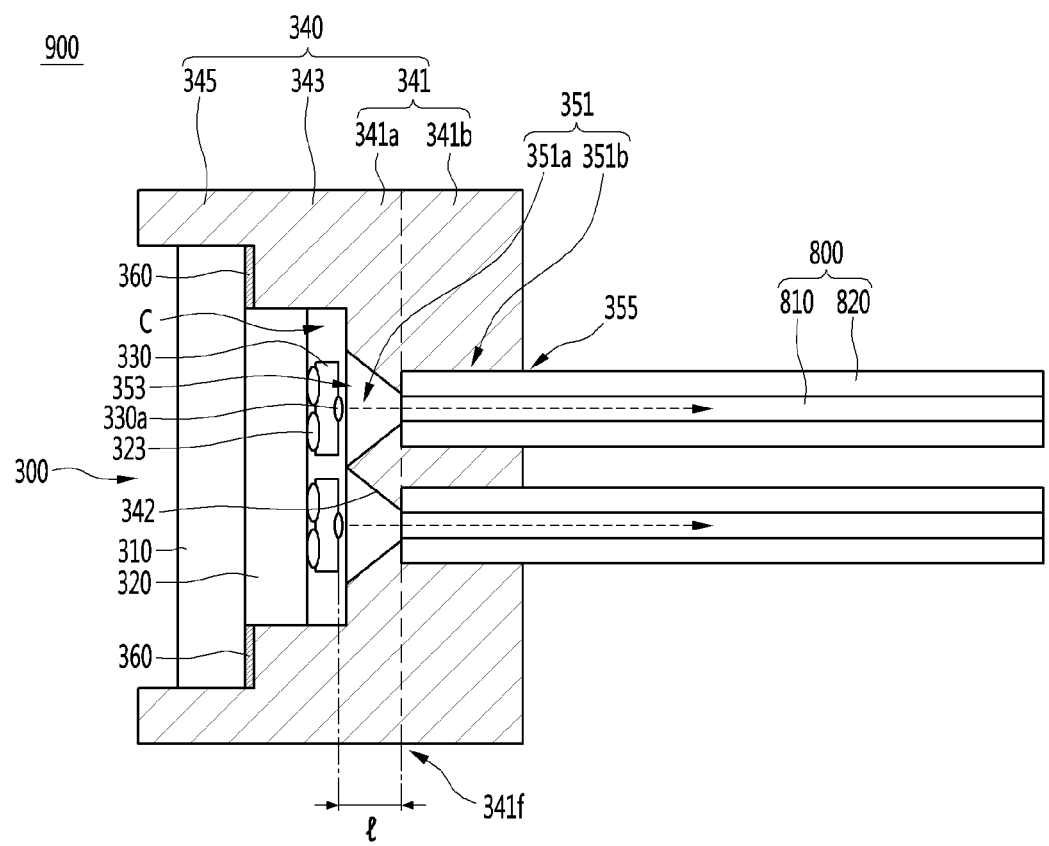

[FIG. 9]
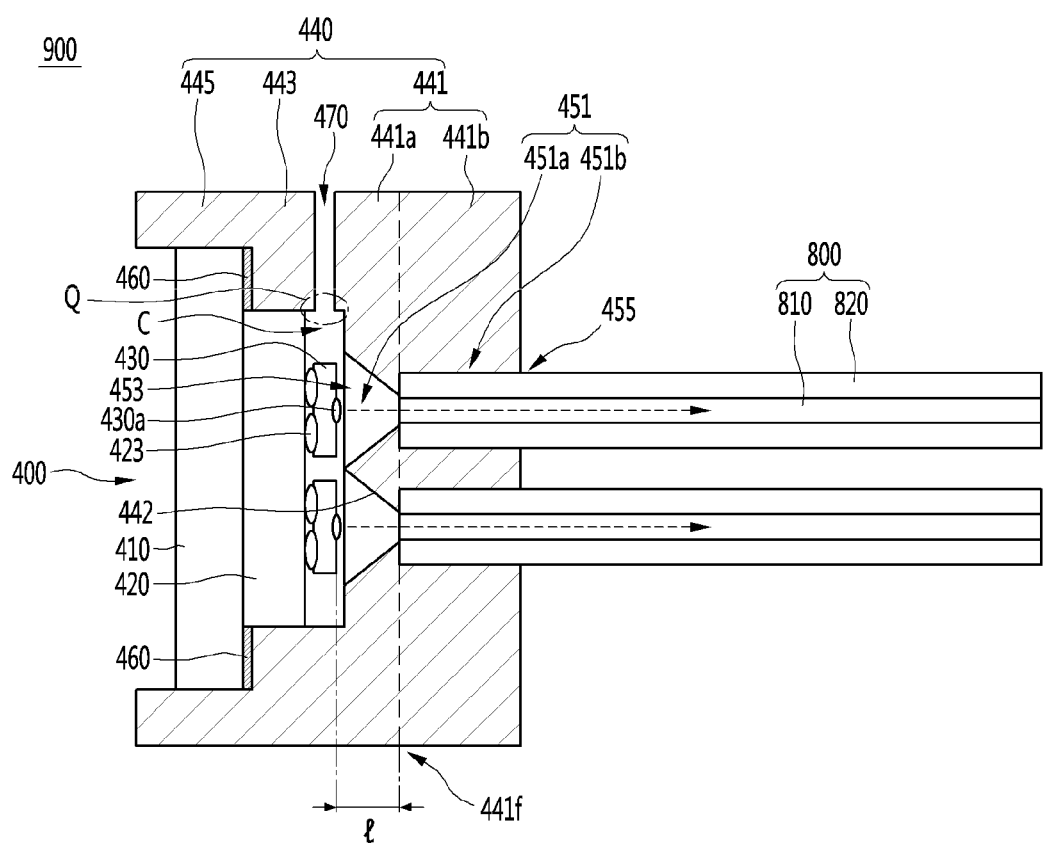

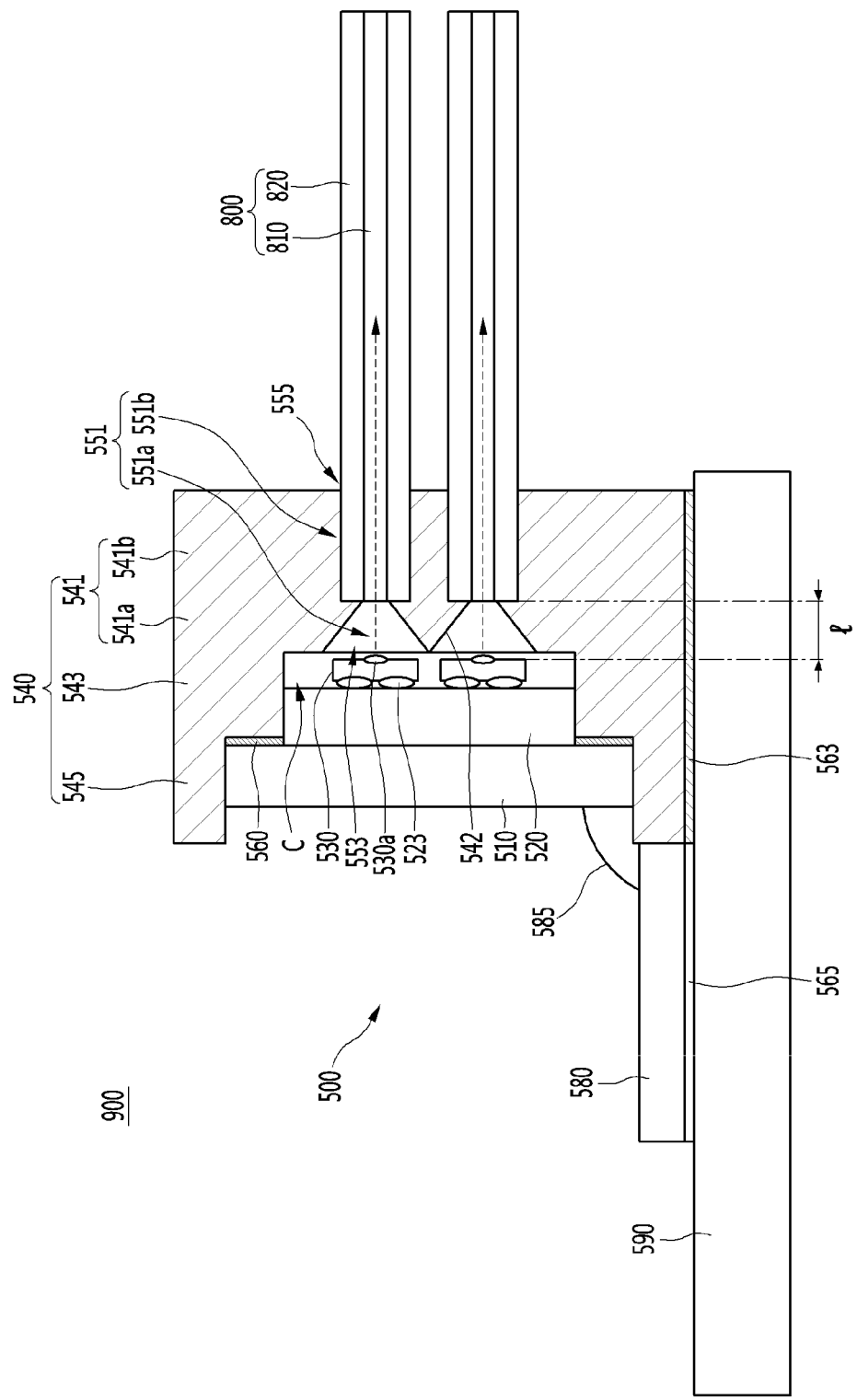
[FIG. 10]

[FIG. 11]
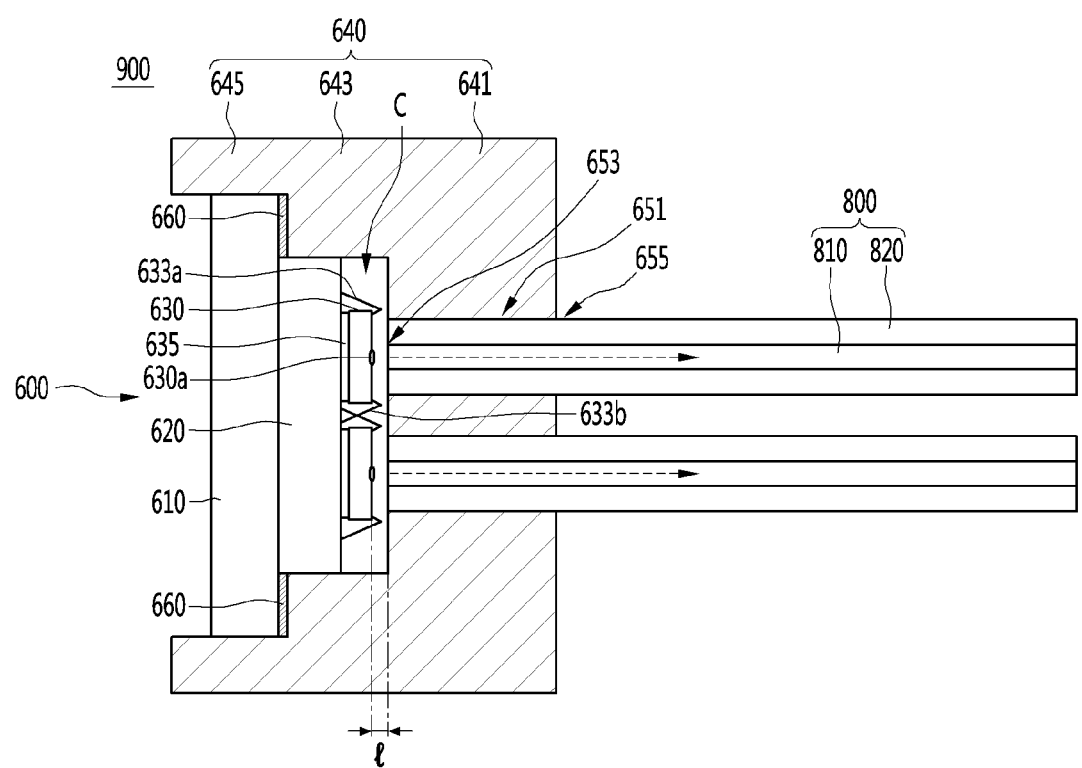

[FIG. 12]
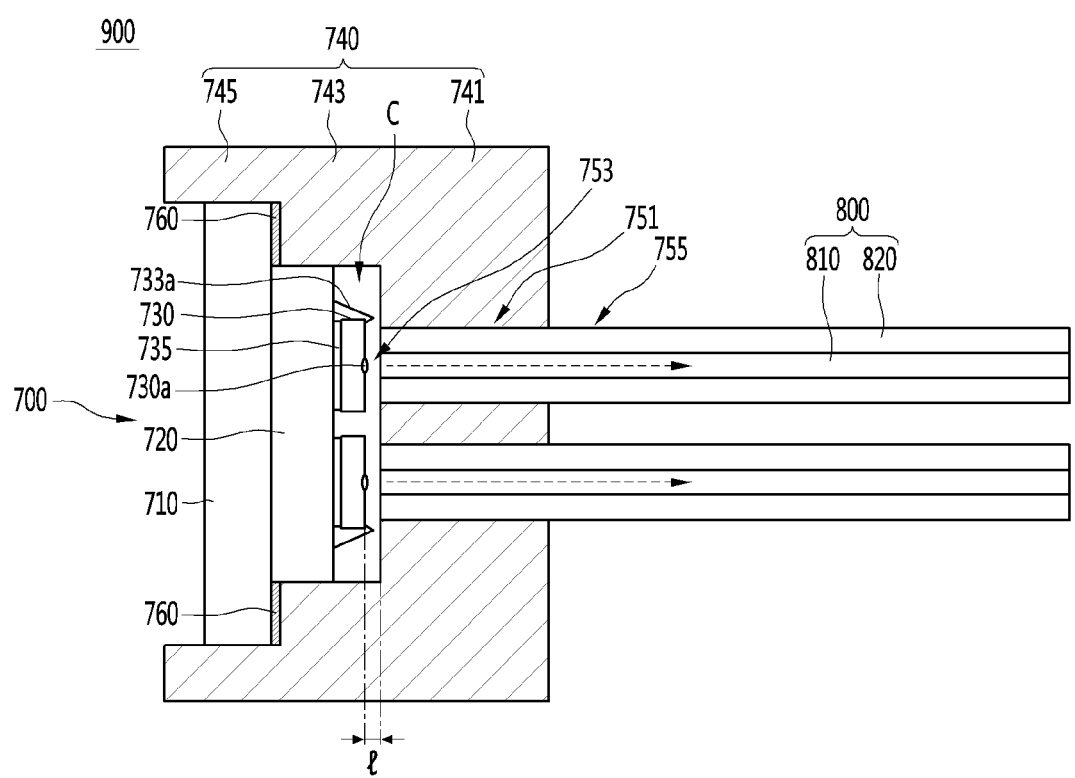

[FIG. 13a]
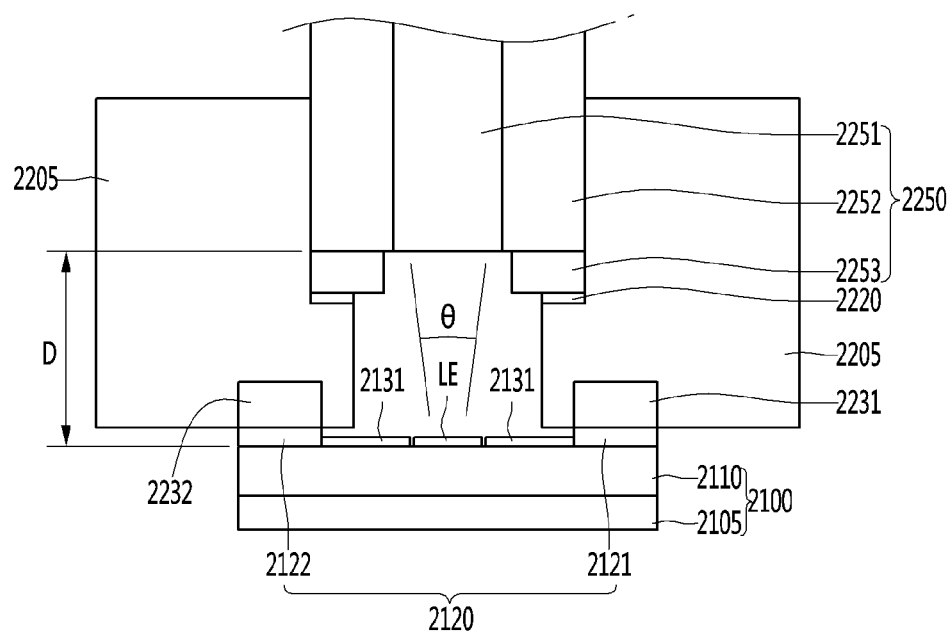

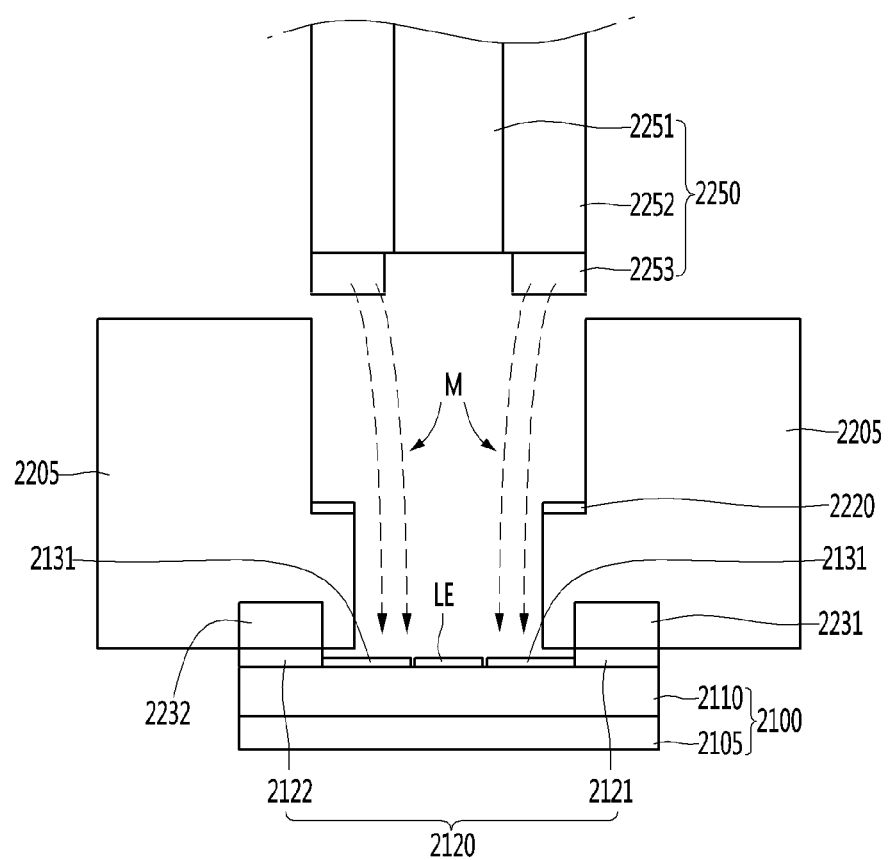
[FIG. 13b]

[FIG. 14a]
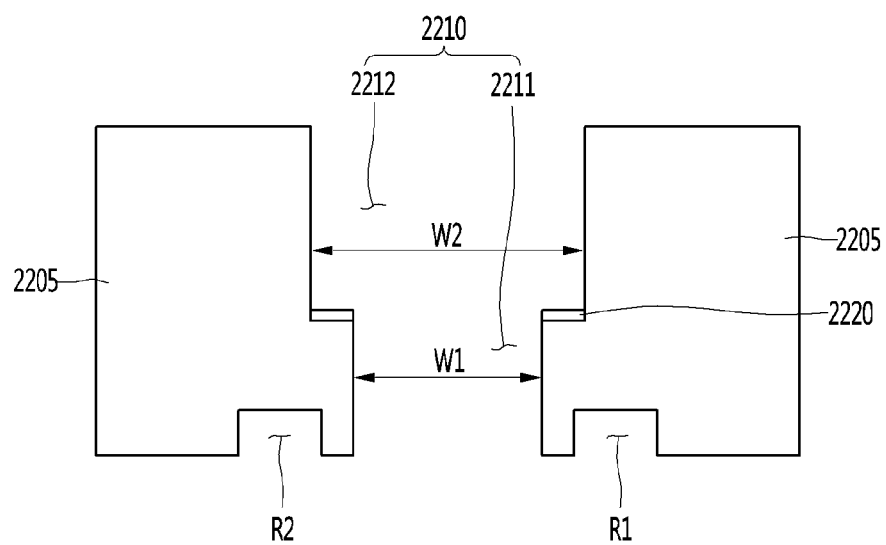

[FIG. 14b]
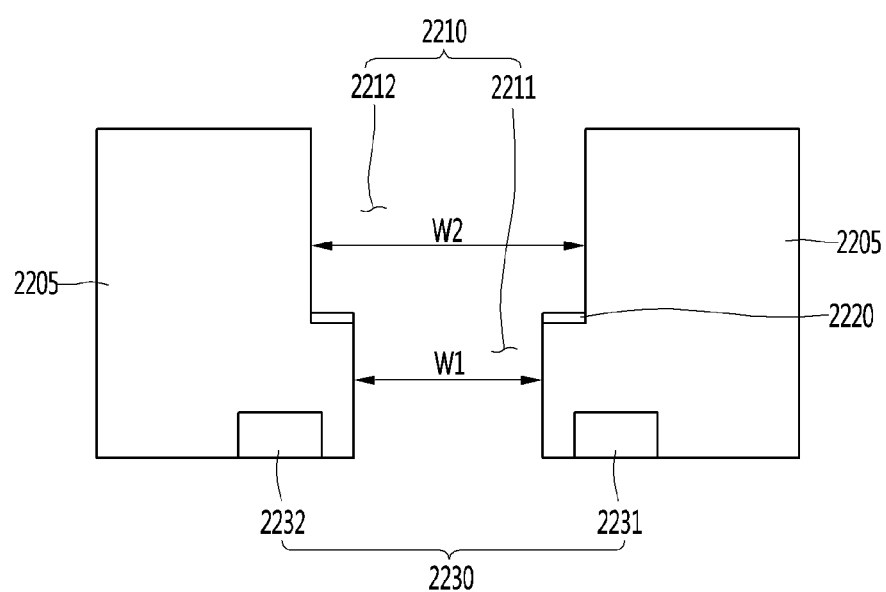

[FIG. 14c]
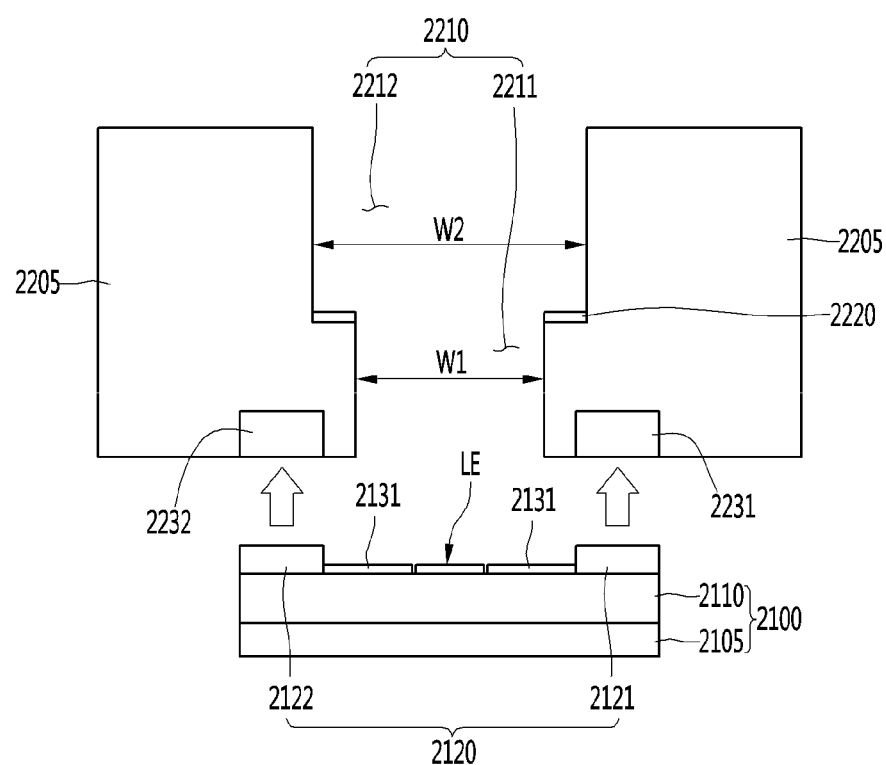

[FIG. 14d]
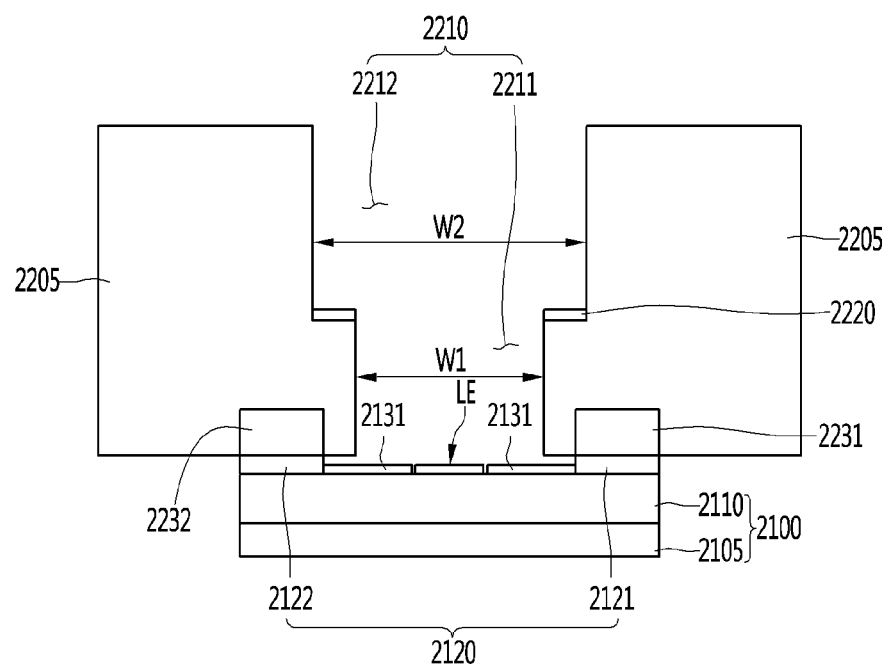

[FIG. 15]
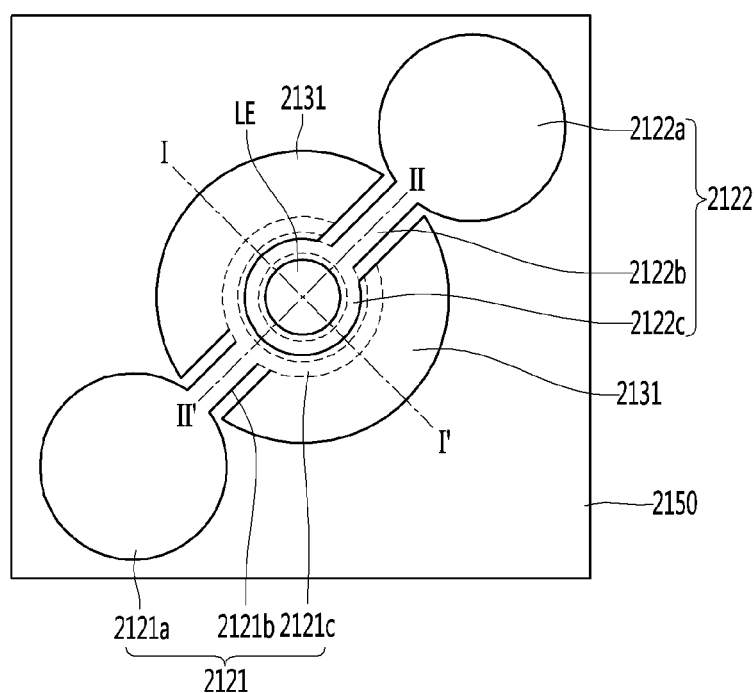

[FIG. 16]
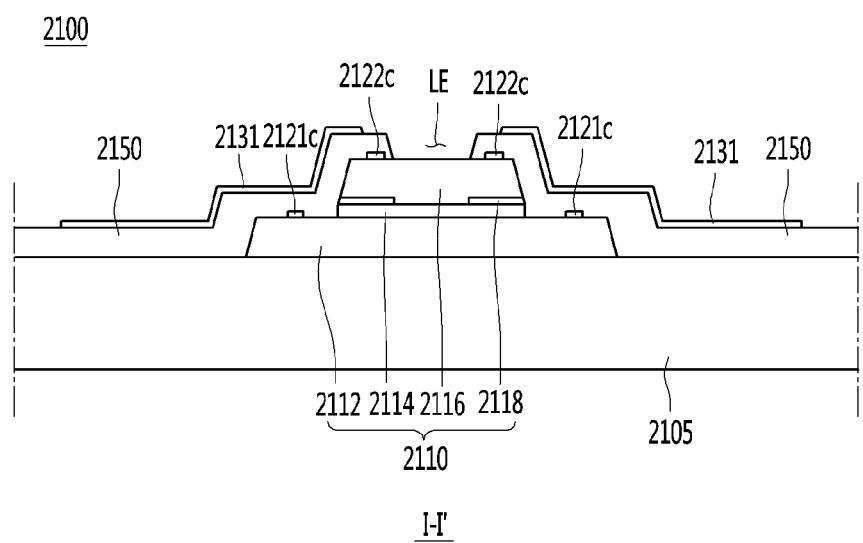
I-I'

[FIG. 17]
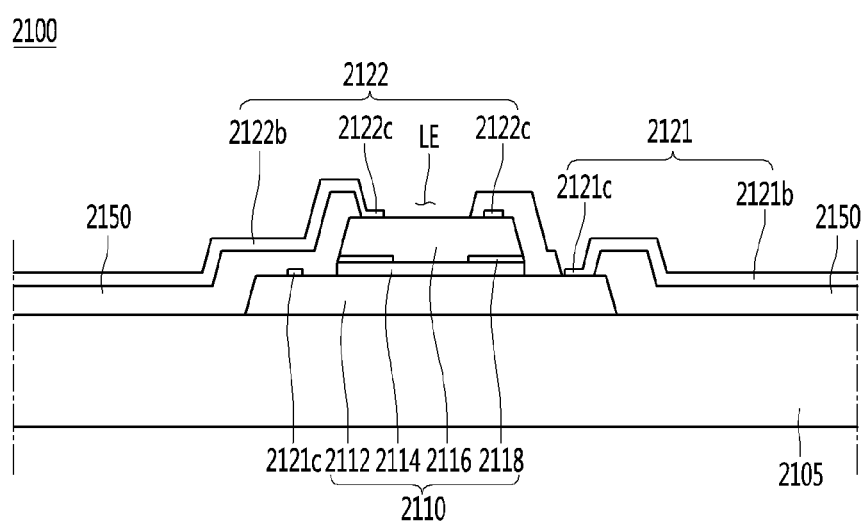
II-II'

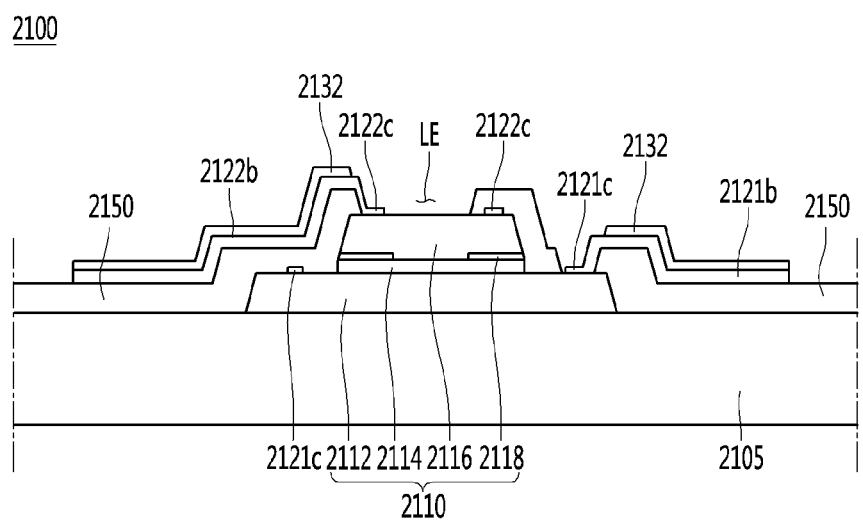
[FIG. 18]
II-II'

【FIG. 19a】
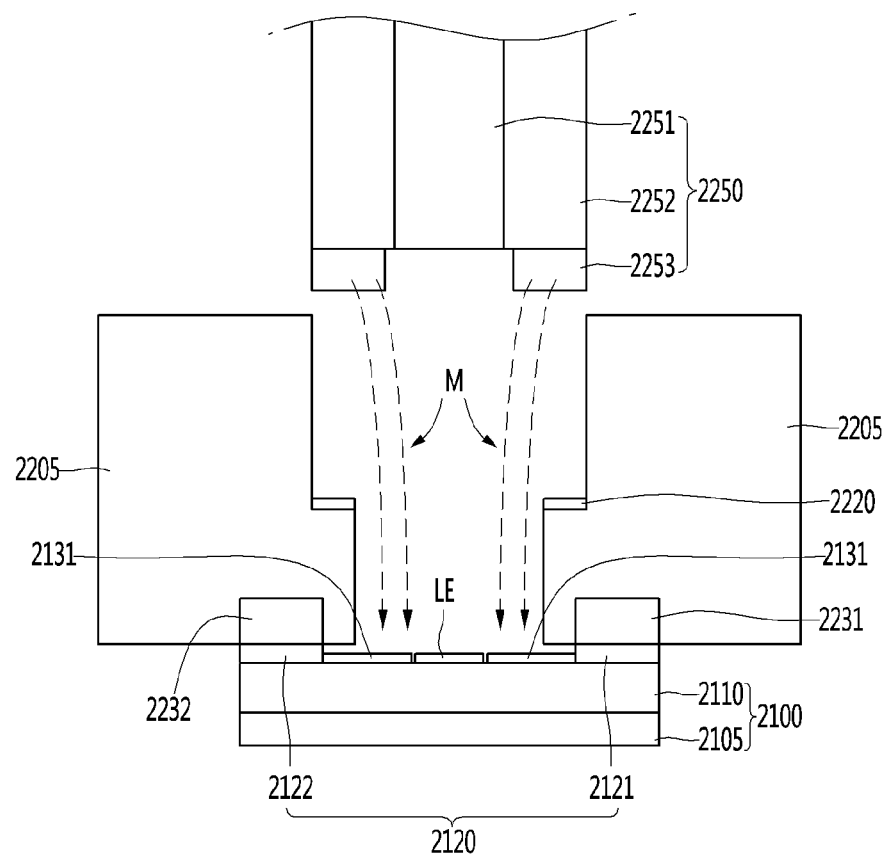

[FIG. 19b]
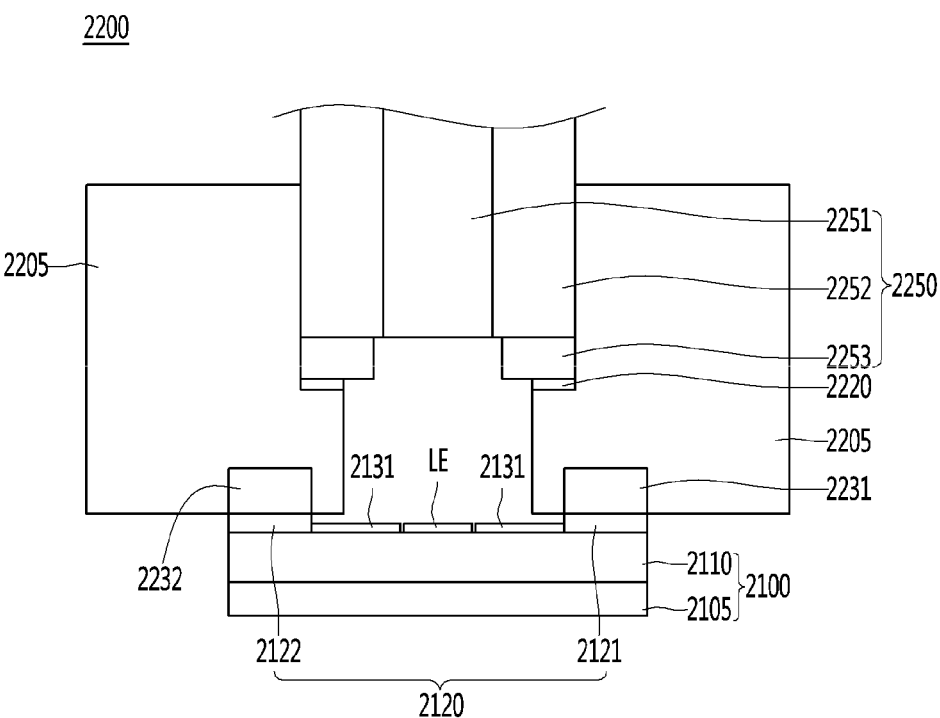

[FIG. 20]
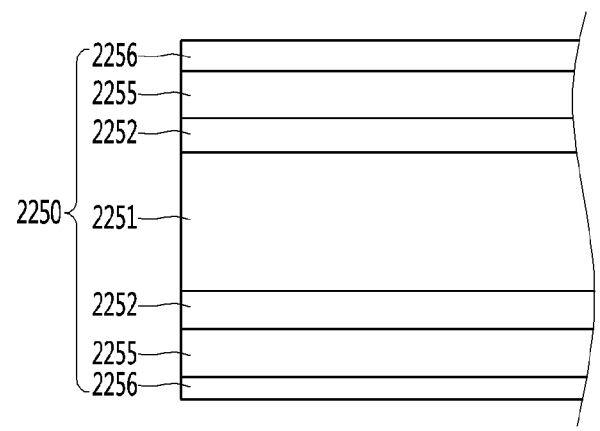

[FIG. 21]
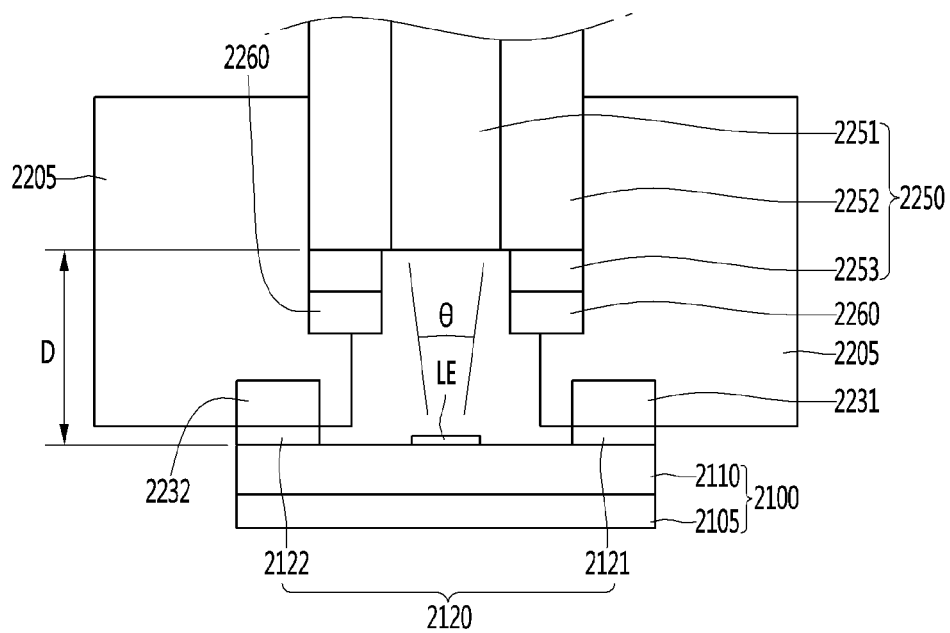

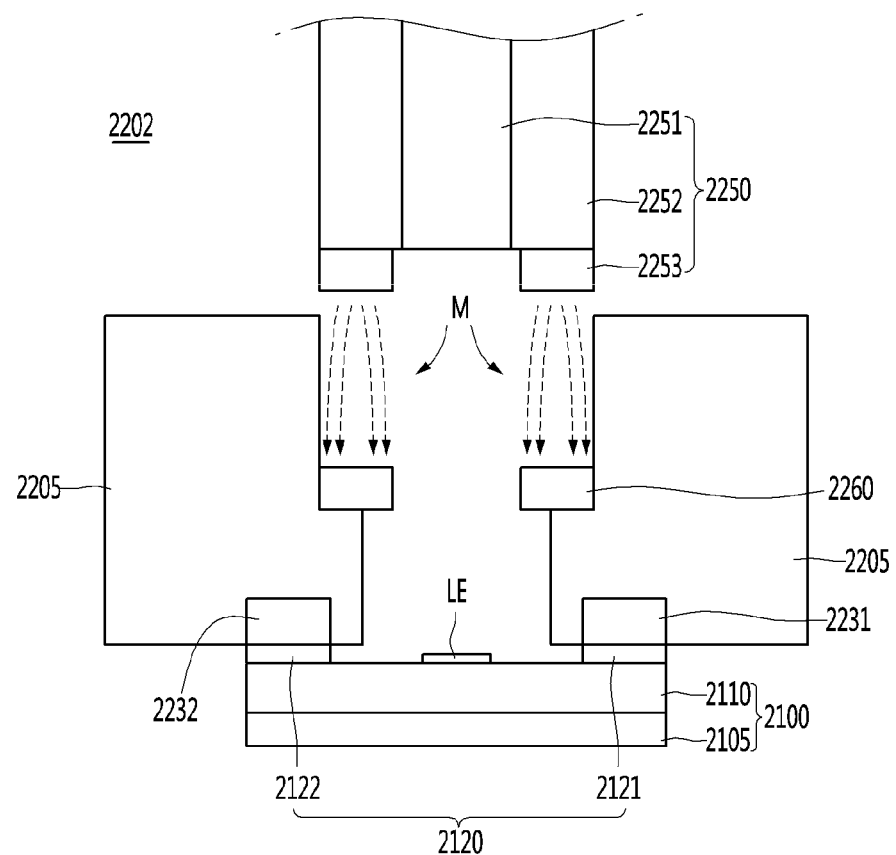
[FIG. 22]

[FIG. 23]
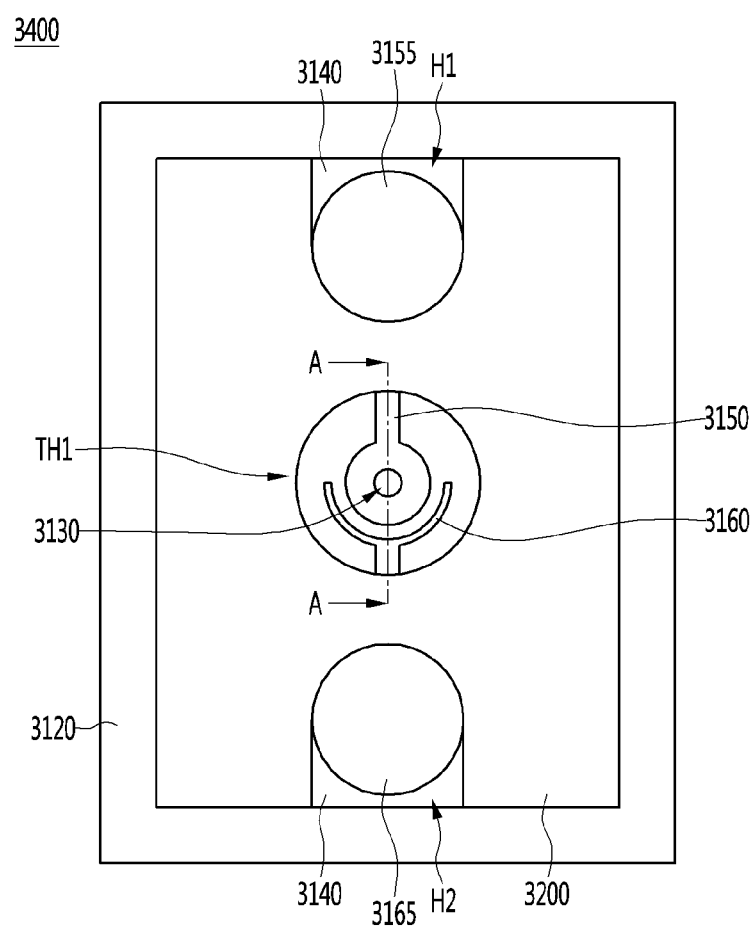

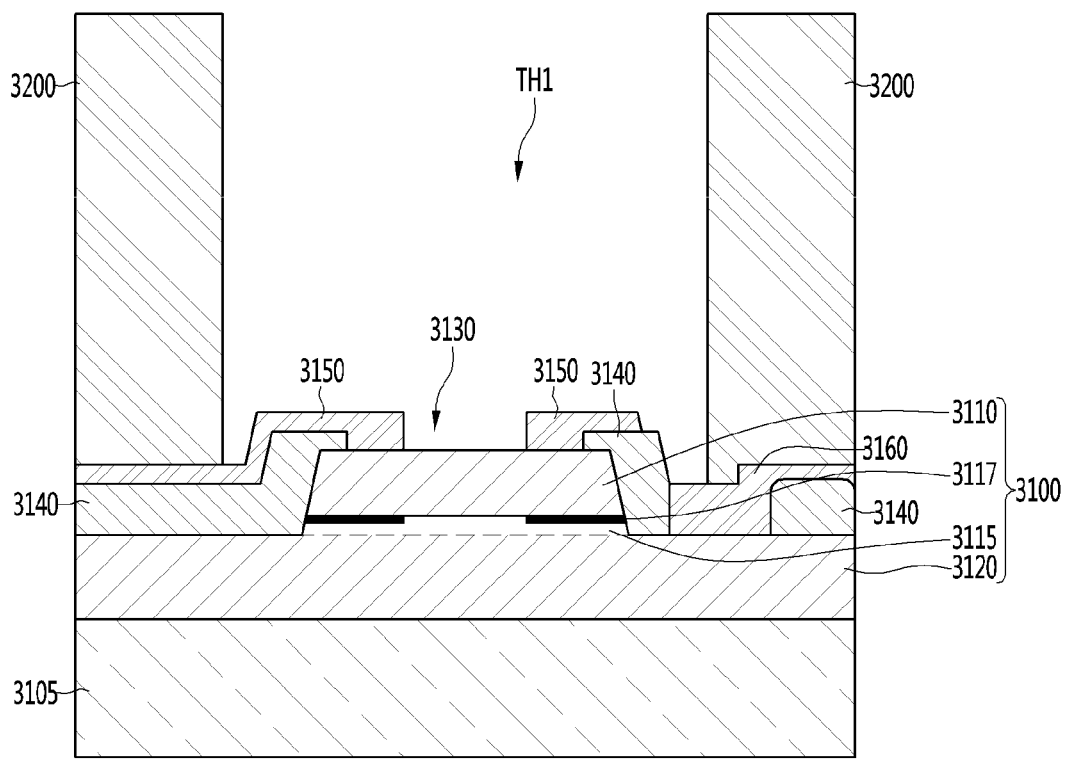
[FIG. 24]

[FIG. 25]
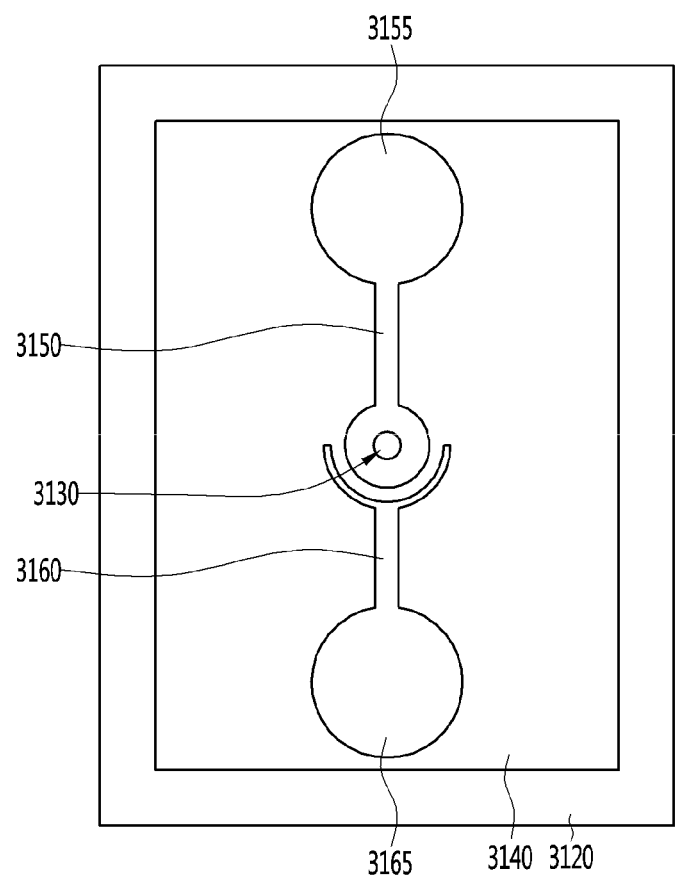

【FIG. 26】
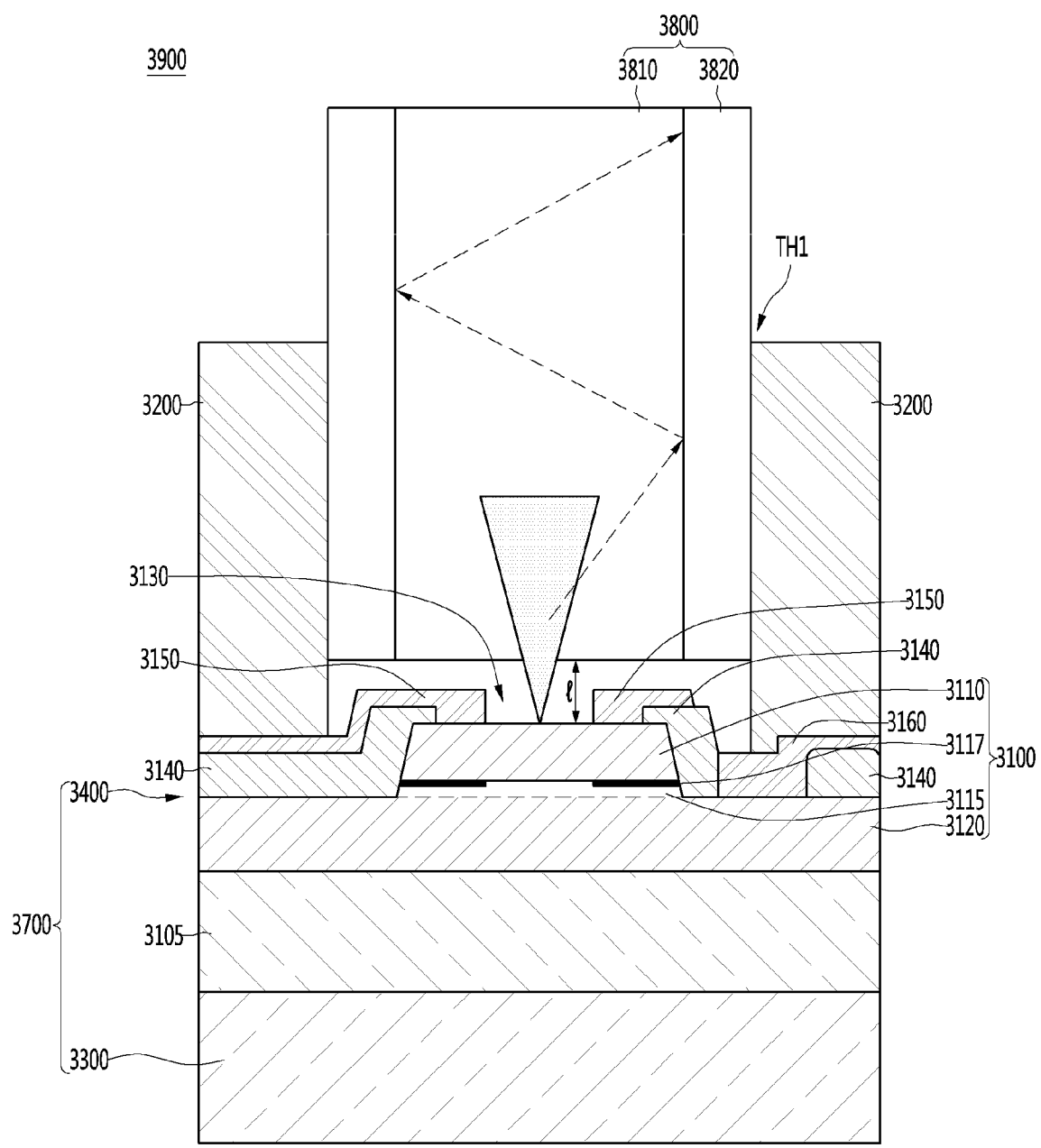

[FIG. 27]
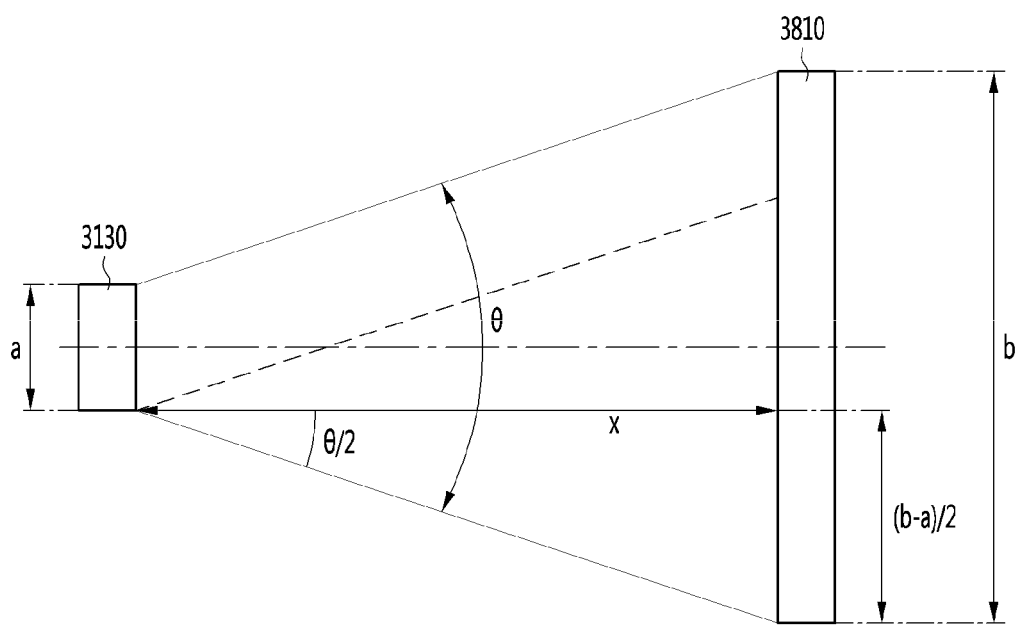

[FIG. 28]
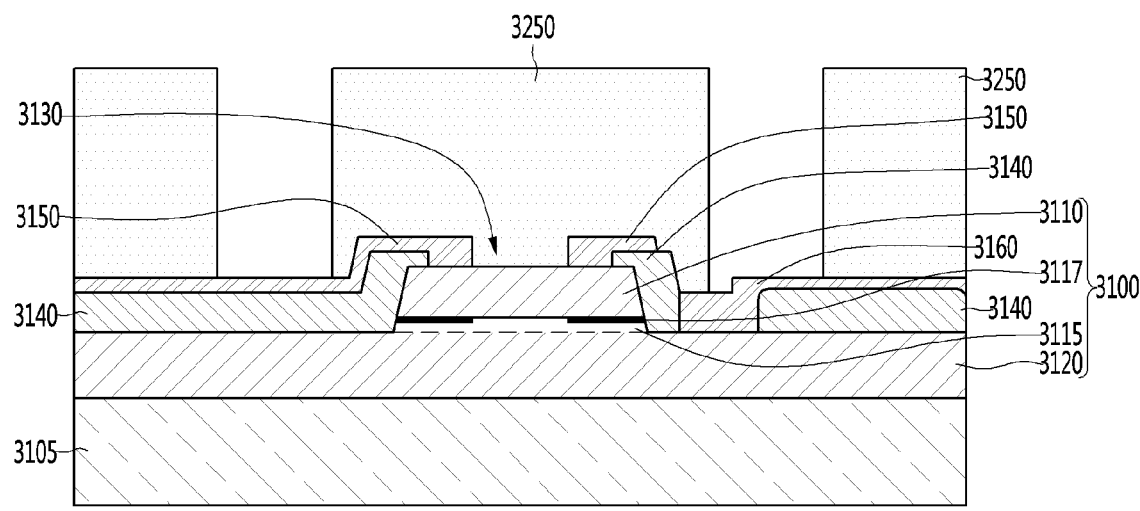

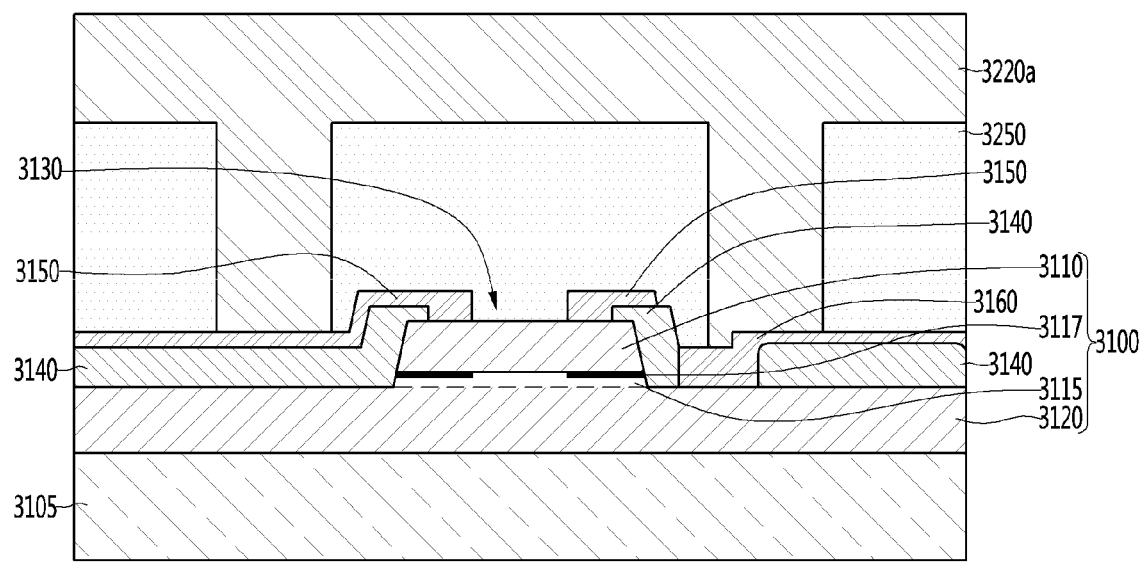
[FIG. 29]

[FIG. 30]
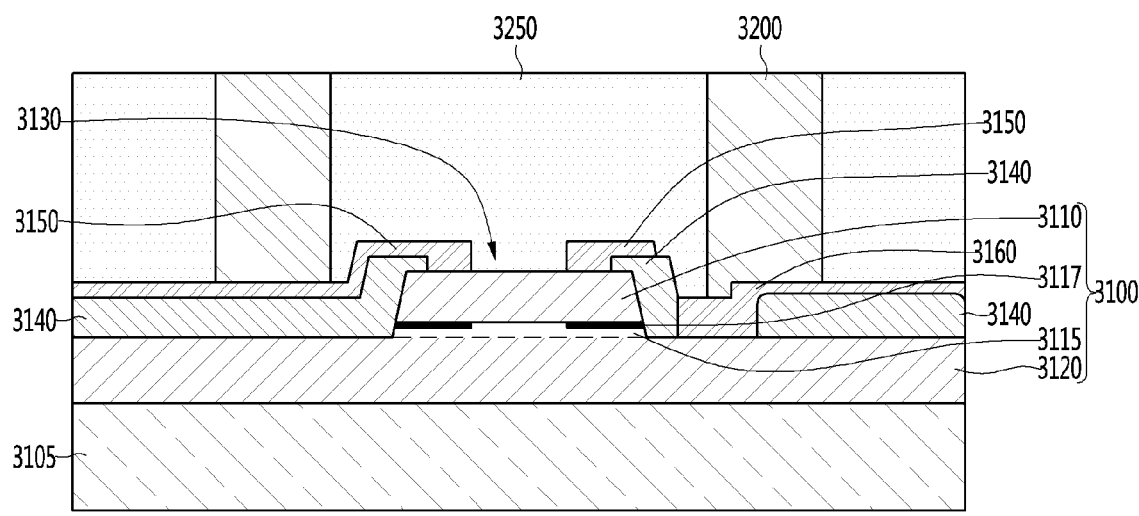

[FIG. 31]
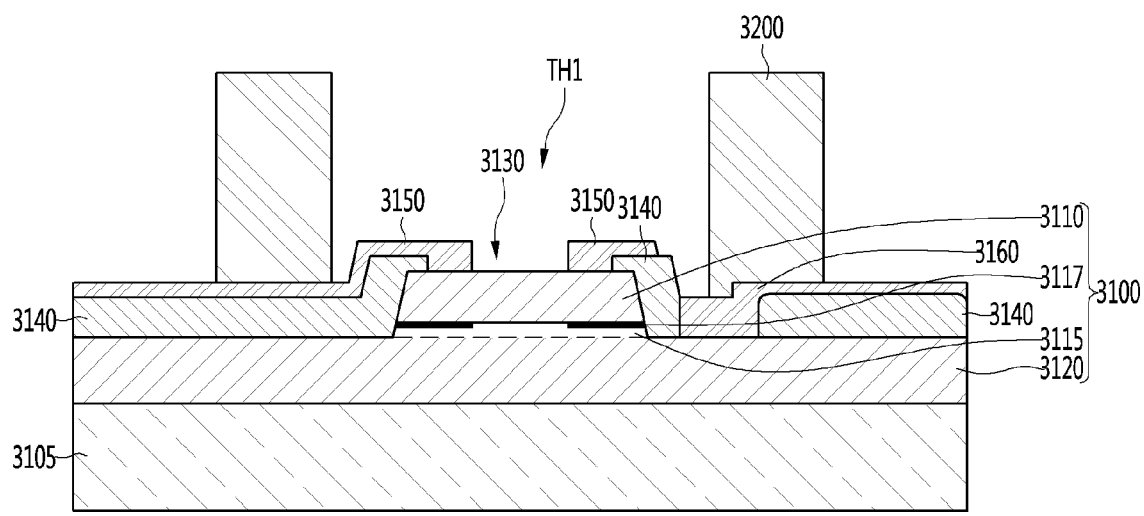

[FIG. 32]
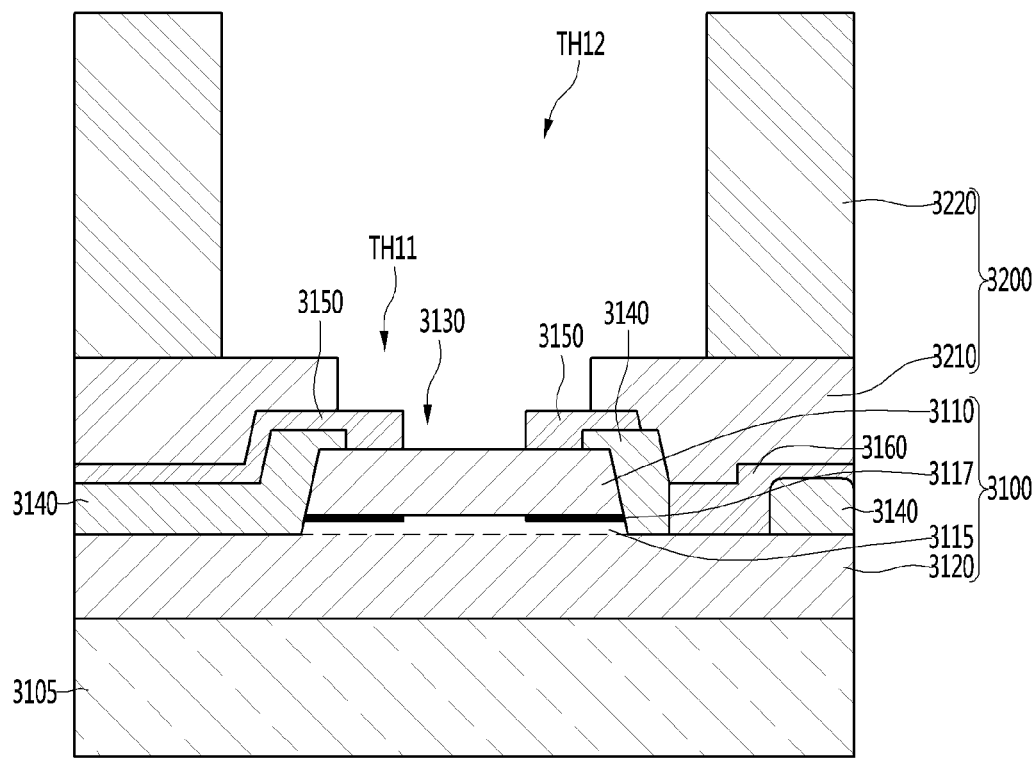

[FIG. 33]
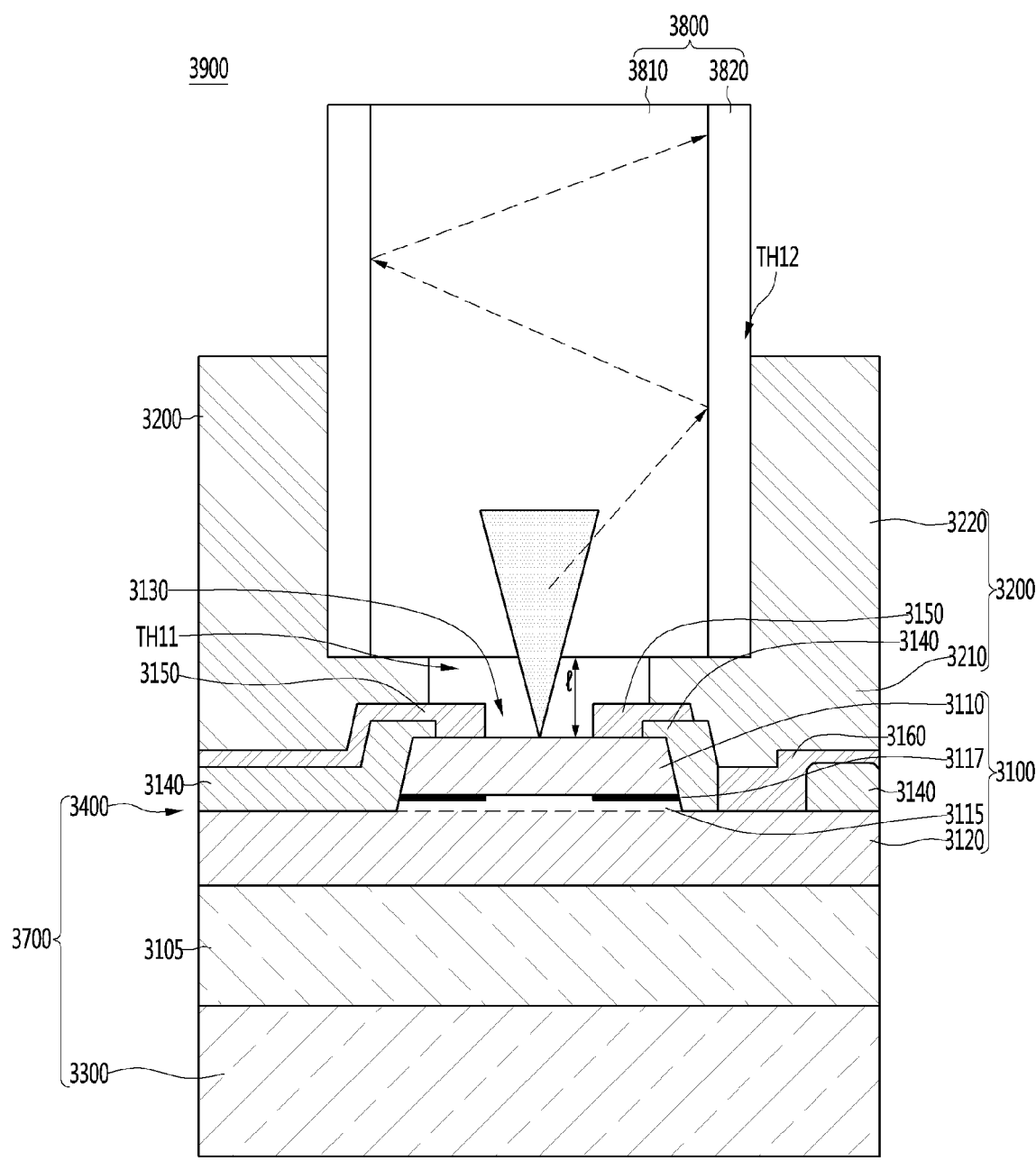

[FIG. 34]
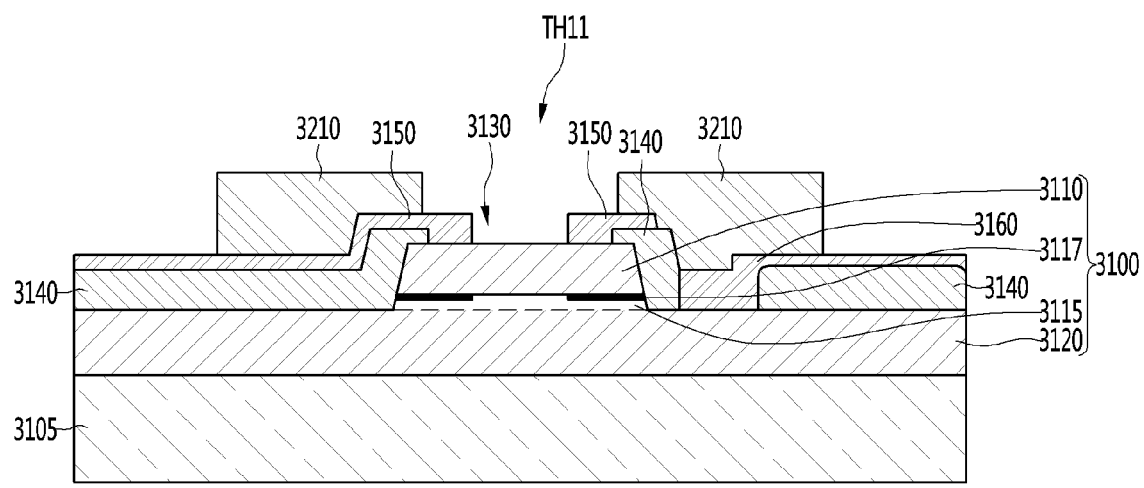

[FIG. 35]
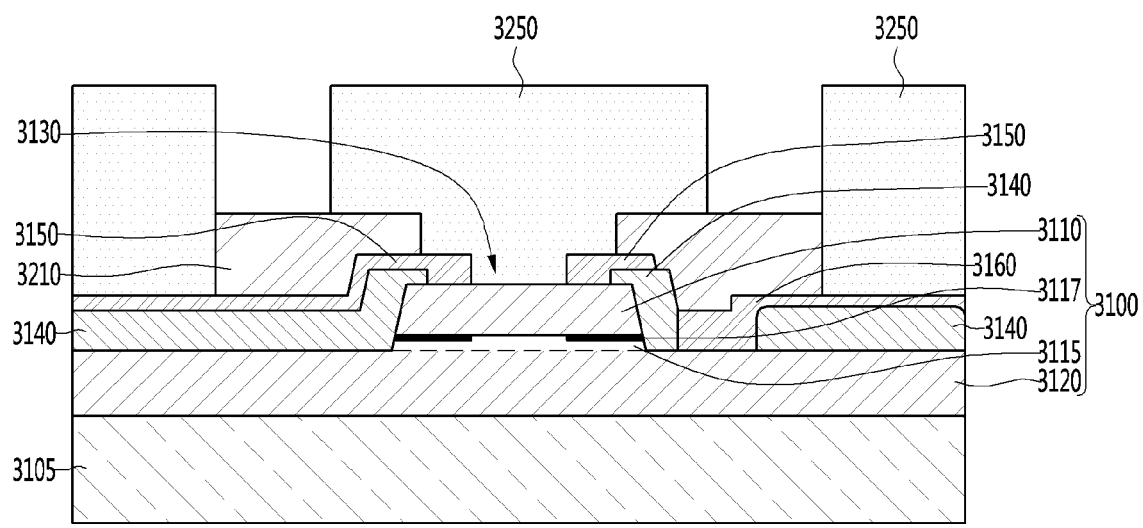

[FIG. 36]
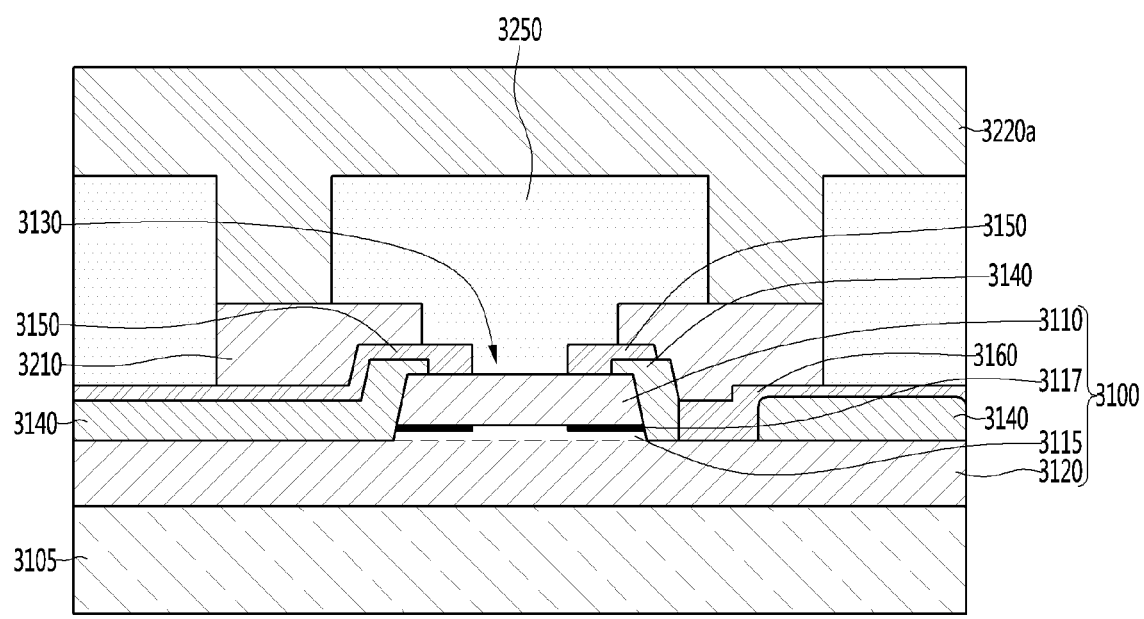

[FIG. 37]
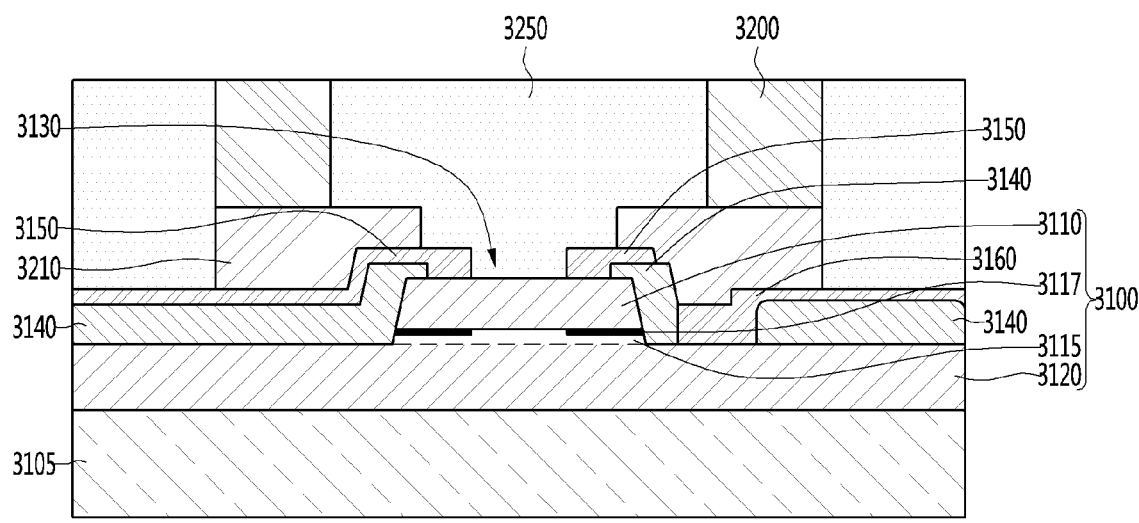

[FIG. 38]
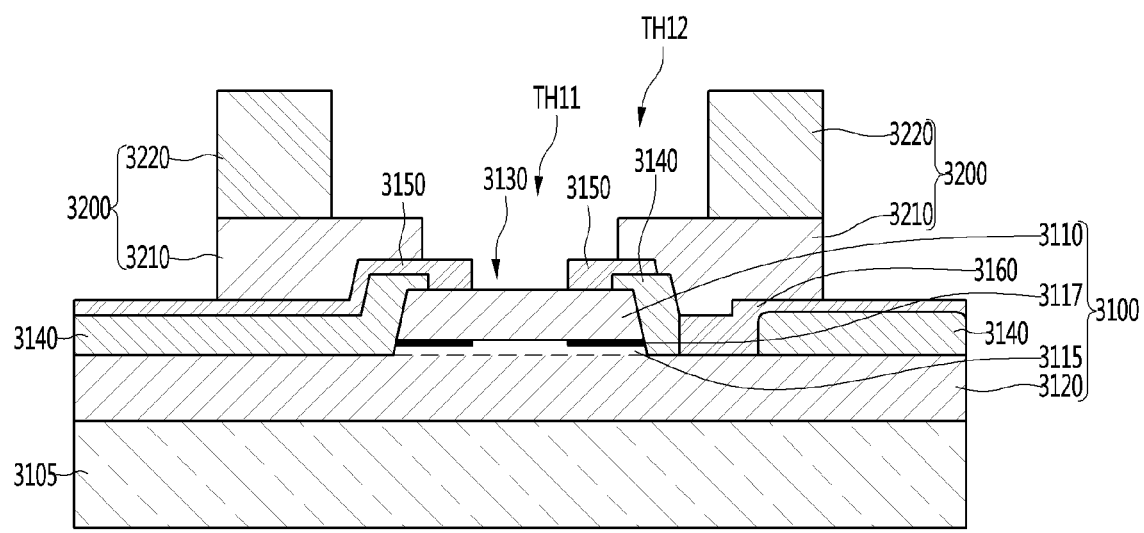

[FIG. 39]
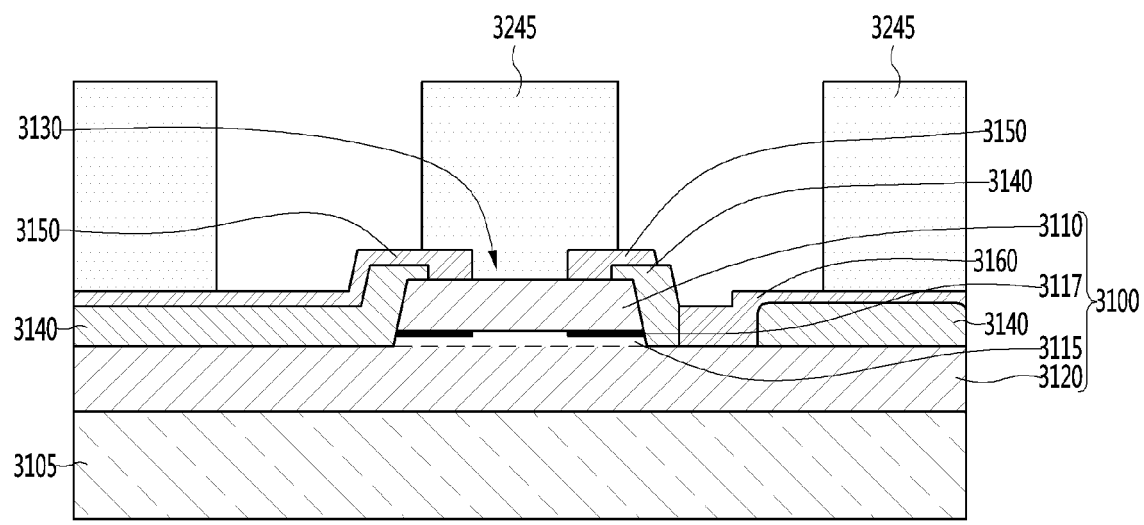

[FIG. 40]
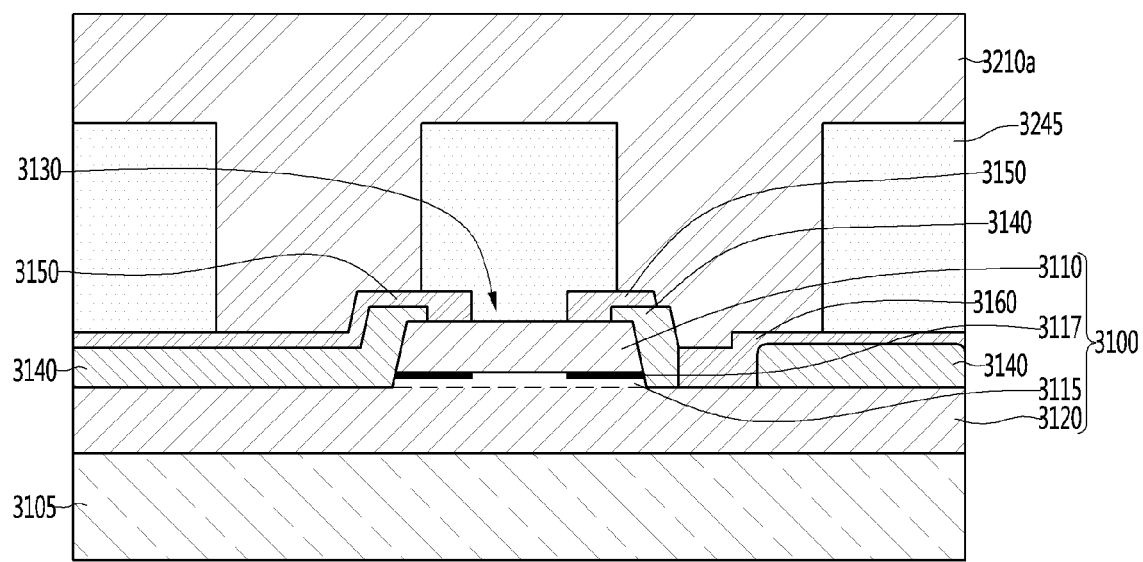

【FIG. 41】
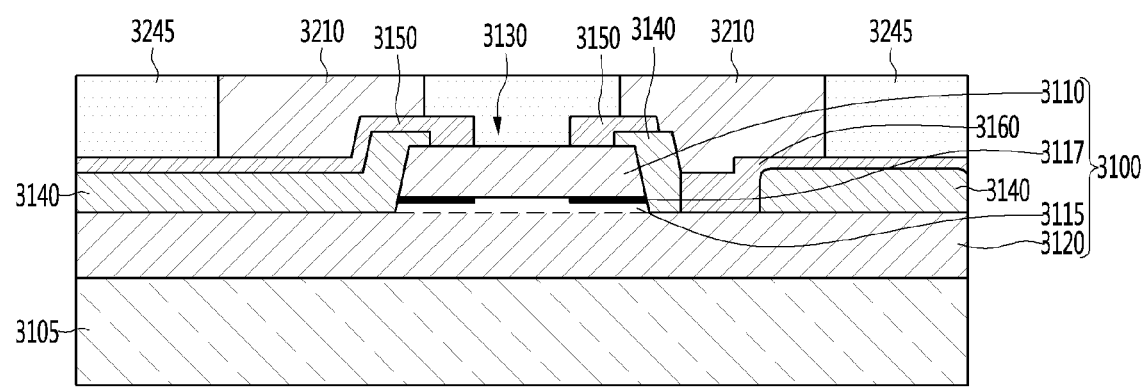

【FIG. 42】
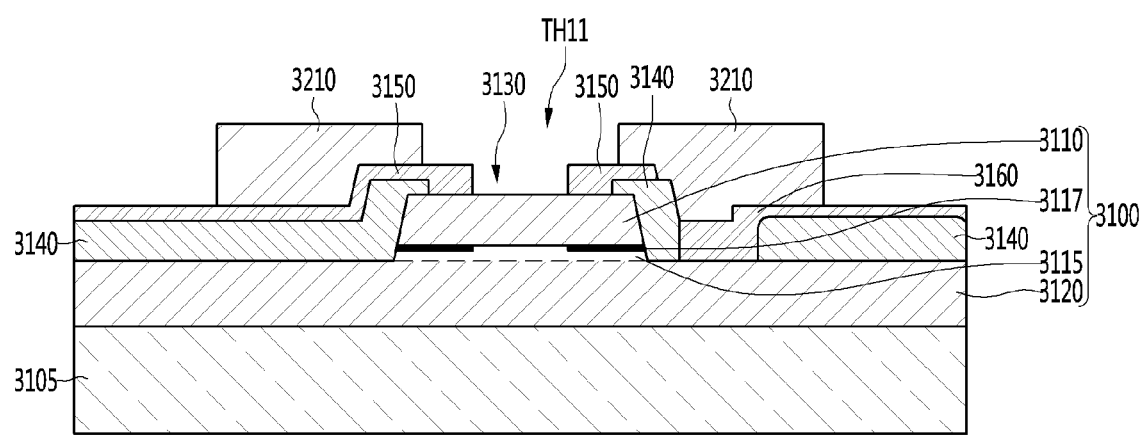

[FIG. 43]
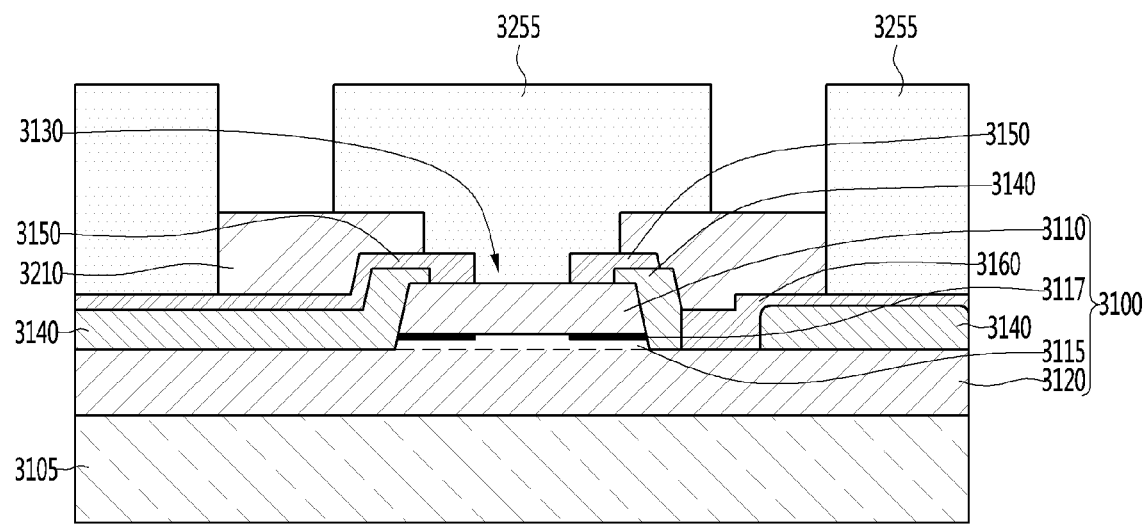

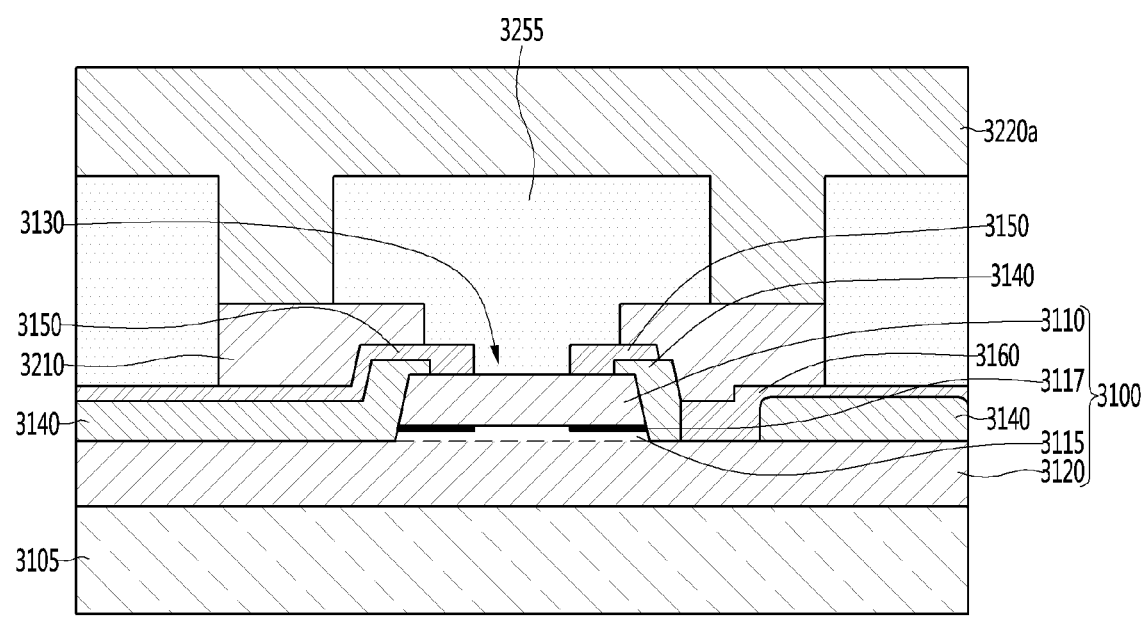
[FIG. 44]

[FIG. 45]
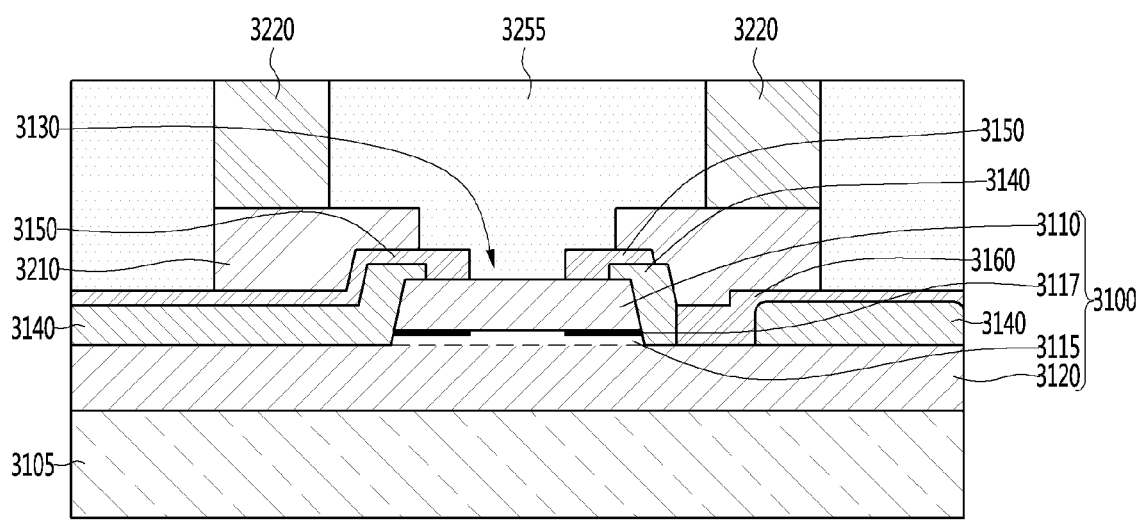

[FIG. 46]
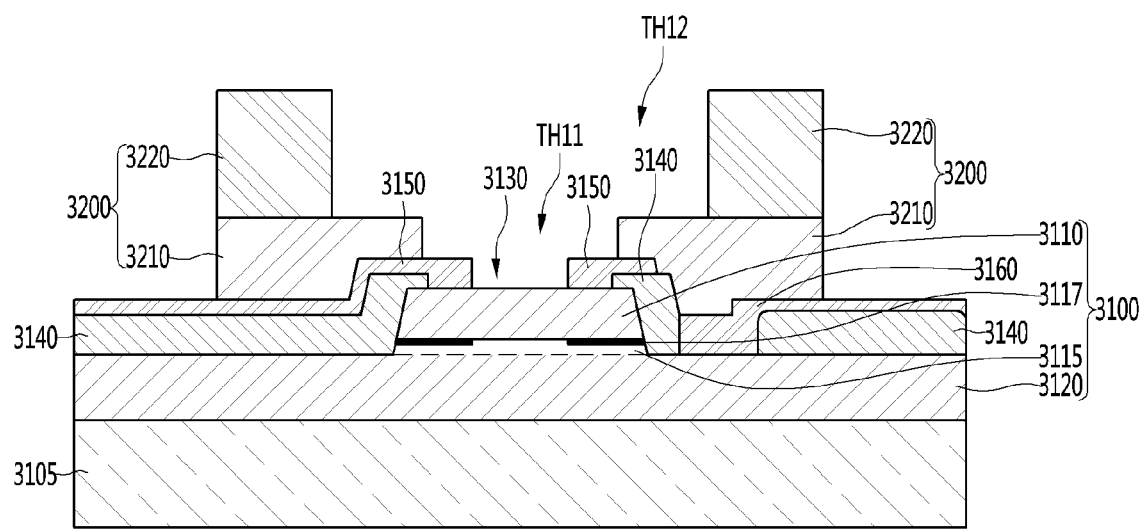

[FIG. 47]
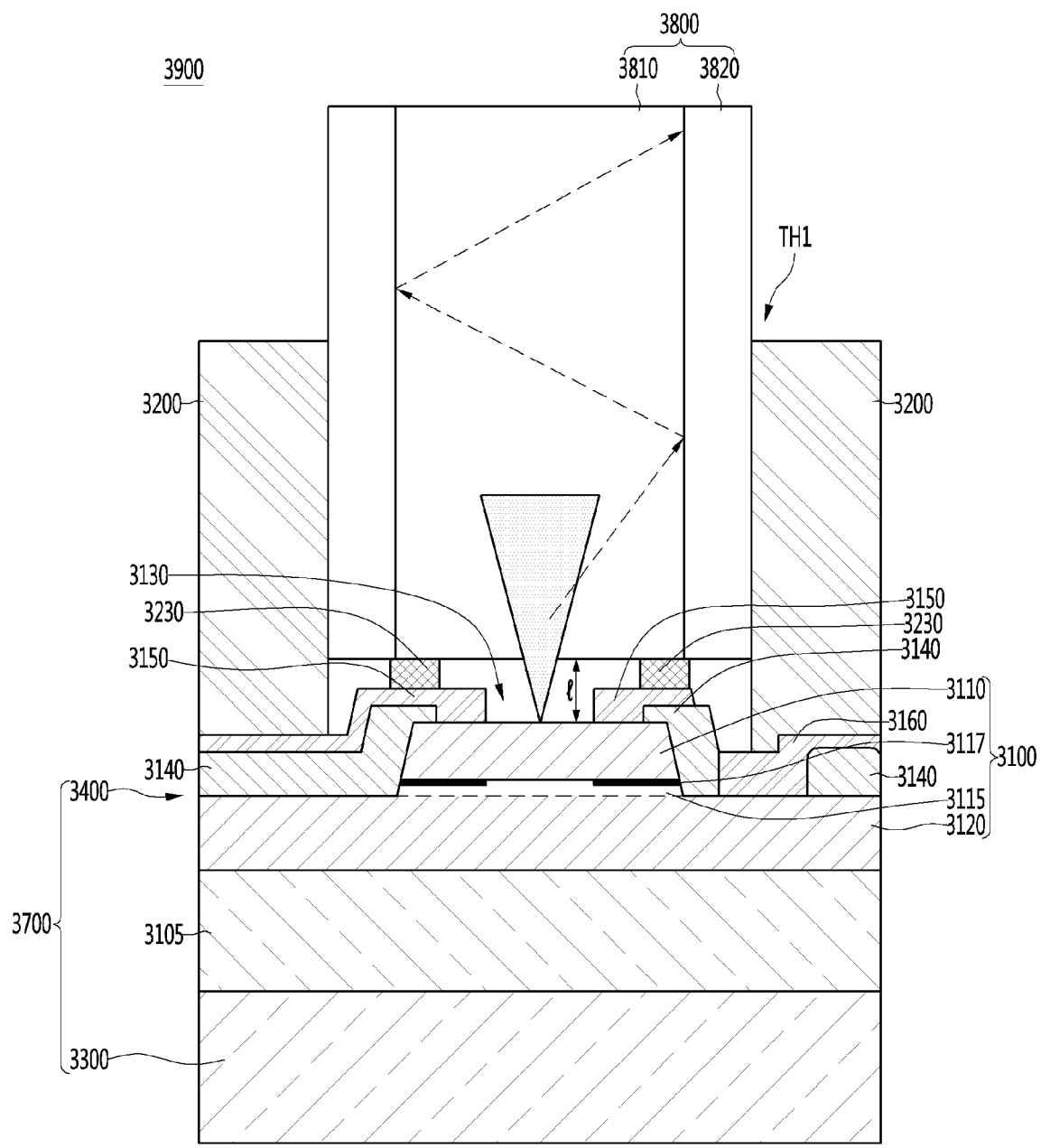

【FIG. 48】
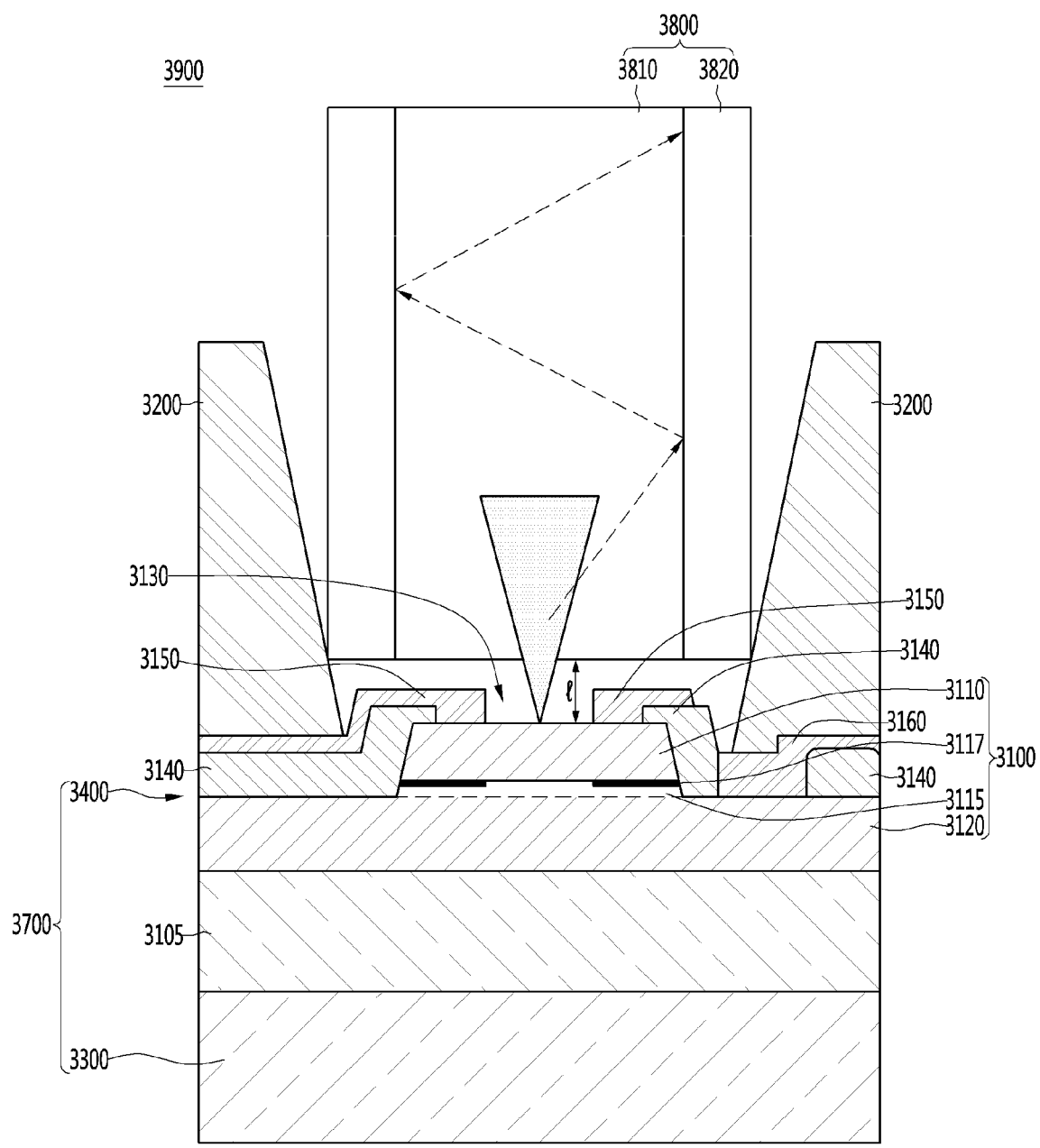

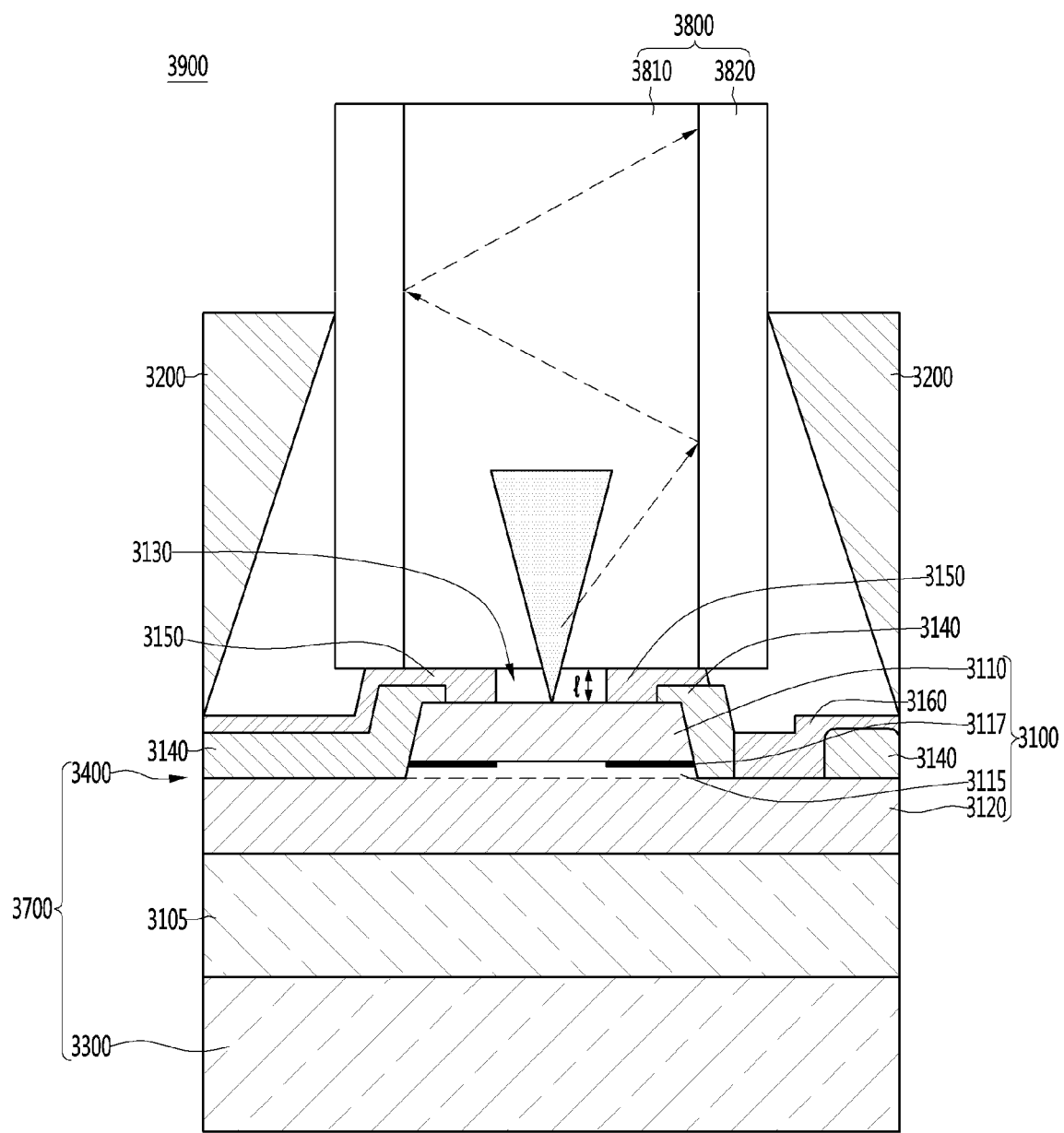
[FIG. 49]

[FIG. 50]
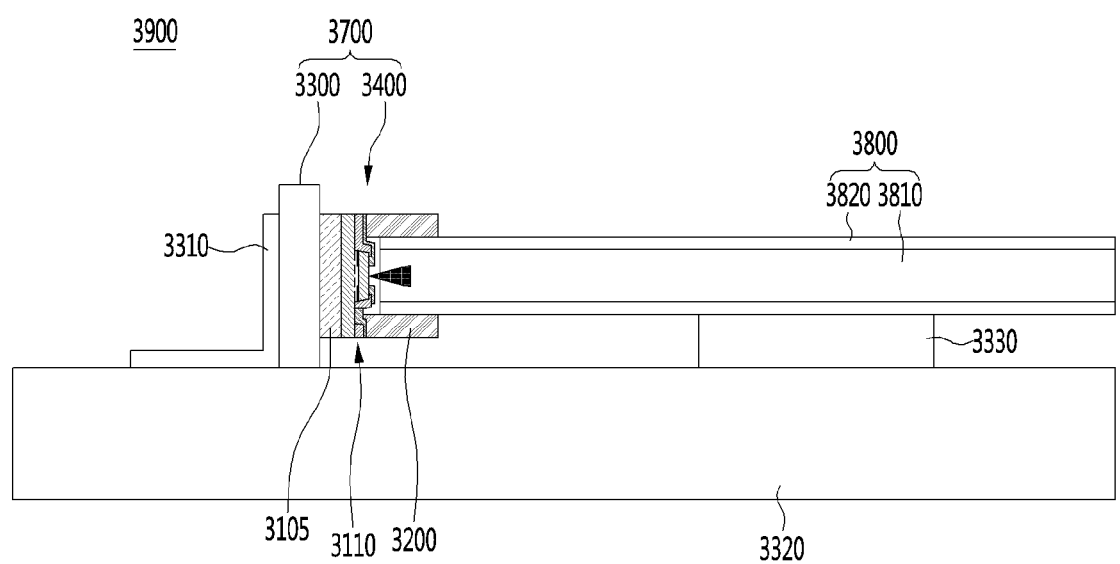

【FIG. 51】
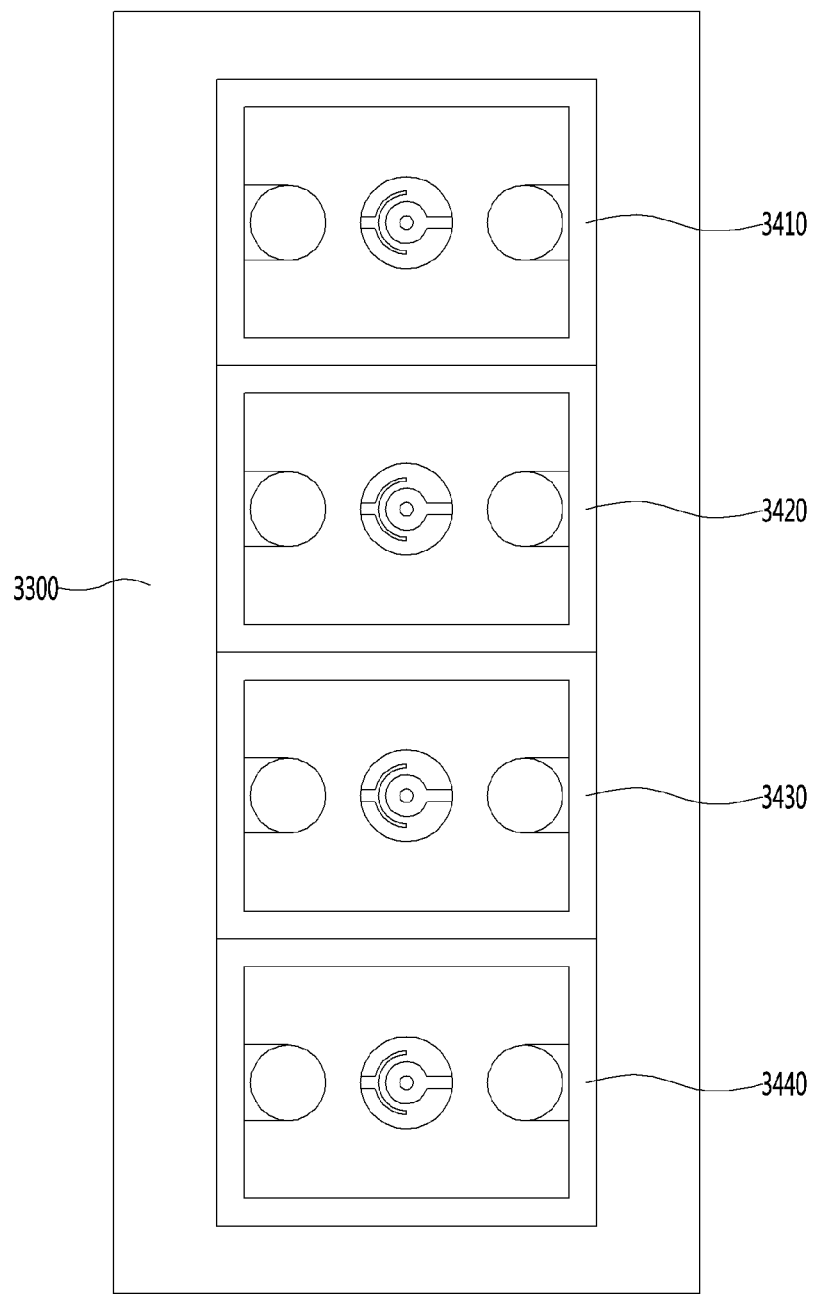

【FIG. 52】
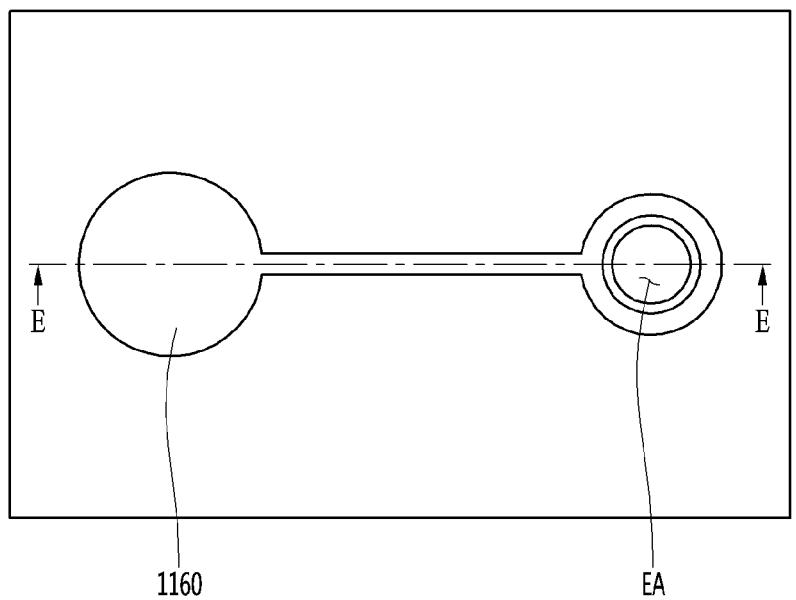

[FIG. 53]
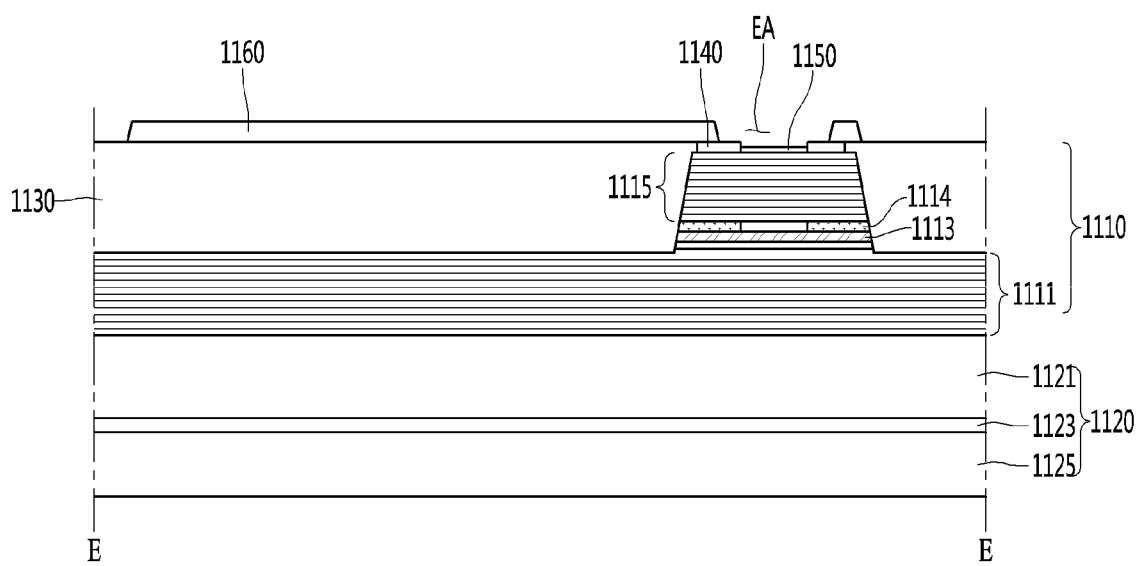

OPTICAL TRANSMISSION MODULE

CROSS REFERENCE TO RELATED APPLICATIONS

This application is the National Phase of PCT International Application No. PCT/KR2017/014663, filed on Dec. 13, 2017, which claims priority under 35 U.S.C. 119(a) to Patent Application Nos. 10-2016-0171468, filed in the Republic of Korea on Dec. 15, 2016, 10-2016-0179274, filed in the Republic of Korea on Dec. 26, 2016, and 10-2017-0012757, filed in the Republic of Korea on Jan. 26, 2017, all of which are hereby expressly incorporated by reference into the present application.

TECHNICAL FIELD

Embodiments relate to a semiconductor device, an optical transmission module, and an optical transmission apparatus.

BACKGROUND ART

A semiconductor device including compounds such as GaN and AlGaN has many merits such as wide and easily adjustable bandgap energy, so the device can be used variously as light emitting devices, light receiving devices and various kinds of diodes.

In particular, light emitting devices such as light emitting diodes and laser diodes obtained by using a group III-V or a group II-VI compound semiconductor substances can implement light having various wavelength band such as red, green, blue and ultraviolet rays due to the development of thin film growth technology and device materials. In addition, the light emitting devices such as light emitting diodes and laser diodes obtained by using a group III-V or a group II-VI compound semiconductor substances can implement a white light source having high efficiency by using fluorescent substances or combining colors. Such a light emitting device has advantages such as low power consumption, semi-permanent lifetime, quick response speed, safety, and environmental friendliness compared to conventional light sources such as fluorescent lamps and incandescent lamps.

In addition, when a light receiving device such as a photodetector or a solar cell is manufactured using a group III-V or a group II-VI compound semiconductor substances, a photoelectric current is generated by absorbing light having various wavelength domains with the development of device materials, so that light having various wavelength domains such as from gamma rays to radio waves can be used. In addition, the above light receiving device has advantages such as quick response speed, safety, environmental friendliness and easy control of device materials, so that the light receiving device can be easily used for a power control, a super-high frequency circuit or a communication module.

Accordingly, the semiconductor device has been applied and expanded to a transmission module of an optical communication tool, a light emitting diode backlight replacing a cold cathode fluorescence lamp (CCFL) constituting a backlight of a liquid crystal display (LCD), a white light emitting diode lighting apparatus replaceable with a fluorescent lamp or an incandescent bulb, a vehicular headlight, a traffic light and a sensor for detecting gas or fire. In addition, the applications of the semiconductor device can be expanded to a high frequency application circuit, a power control apparatus, or a communication module.

For example, the light emitting device may be provided as a p-n junction diode having a characteristic in which electrical energy is converted into light energy by using a group III-V element or a group II-VI element in the periodic table, and various wavelengths can be realized by adjusting the composition ratio of the compound semiconductor substances.

Semiconductor devices have also been applied in the field of optical communications. The optical transmission apparatus may comprise an optical transmission module including a semiconductor device and an optical cable coupled to the optical transmission module. The semiconductor device may be employed in an optical transmission module to perform a function of providing an optical signal to a core of the optical cable coupled thereto. At this time, the optical alignment between the semiconductor device of the optical transmission module and the core of the optical cable must match well so that the optical signal can be transmitted normally.

To this end, an optical alignment process must be performed so that a beam emitted from the semiconductor device can be received by the beam incident surface of the optical cable core using optical means such as a reflecting mirror, a prism, and a lens. Accordingly, it takes a long time to manufacture the optical transmission apparatus, and there is a disadvantage that the manufacturing cost is increased. In addition, since optical means for optical alignment must be included, it is difficult to miniaturize the size of the optical transmission module and the optical transmission apparatus.

Meanwhile, a vertical cavity surface emitting laser (VCSEL) is used in the conventional semiconductor light source device technology, and it is used for optical communication, optical parallel processing, optical connection, and the like.

For example, in recent years, the necessity of a high definition multimedia interface (HDMI) cable has been increased due to the spread of a high quality TV, and in a data communication module such as an HDMI, a semiconductor light emitting device such as a vertical cavity surface emitting laser (VCSEL) and a light receiving device such as a Photo Diode (PD) are used.

However, since the vertical cavity surface emitting laser (VCSEL) is vertically emitted from the surface of the laser, unlike the side emitting laser diode used in the conventional optical communication, the optical coupling efficiency can be increased by positioning the axis of the optical cable perpendicularly to the laser emitting surface.

Meanwhile, in the prior art, a passive alignment method and an active alignment method are adopted in a manner of aligning a core of an optical cable with a light source of a vertical cavity surface emitting laser (VCSEL), and furthermore a lens is used to focus the beam emitted from the laser to the core portion of the optical cable.

In the prior art, a passive alignment method is a method of manually aligning a light source and an optical cable using a proper mechanism. However, such conventional passive alignment technology requires a complicated structure for precise optical alignment, thus the degree of difficulty of the manufacturing process is high, and the volume also becomes large. In addition, since many mechanical parts such as a guide pin and a structure are used in the prior art, it is difficult to precisely align the parts due to the machining error of these parts during manual alignment, and it is difficult to control the transmission characteristics.

In the prior art, the active alignment method is a method in which a light source is moved finely in the x, y, and z directions with reference to the optical cable core while driving a light source, so that the light output coupled through the optical cable is maximally aligned.

However, such a conventional active alignment has to go through a precise and complex alignment process and has a rather high alignment time Further, in addition to the above described alignment problem, the prior art has a problem in that an additional operation for fixing an optical cable to an optical module case, a platform, or the like is required using an additional structure or the like to maintain the alignment position after the optical cable is aligned, and it is difficult to maintain accurate alignment.

DETAIL DESCRIPTION OF THE INVENTION

Technical Problem

An embodiment can provide an optical transmission module and an optical transmission apparatus that are compact and can facilitate optical alignment.

An embodiment can provide an optical transmission module and an optical transmission apparatus suitable for mass production by lowering the manufacturing cost and simplifying the manufacturing process.

An embodiments can provide an optical transmission module and an optical transmission apparatus capable of implementing a high optical alignment scheme and improving coupling efficiency.

An embodiment can provide a semiconductor device, an optical module, and an optical assembly that are capable of self-alignment between an optical cable and a semiconductor light emitting device.

An embodiments can provide a semiconductor device, an optical module, and an optical assembly capable of self-alignment and self-attachment between an optical cable and a semiconductor light emitting device.

Technical Solution

An optical transmission module according to an embodiment may comprise a board; a submount disposed on a first surface of the board; a vertical cavity surface emitting laser (VCSEL) semiconductor device disposed on a first surface of the submount; and a module housing comprising a coupling unit and a body, the coupling unit spaced apart from the vertical cavity surface emitting laser (VCSEL) semiconductor device and facing the first surface of the submount, the body extending from the coupling unit toward the first surface of the board and disposed around the submount and the vertical cavity surface emitting laser (VCSEL) semiconductor device, wherein the coupling unit of the module housing may comprise a first opening, a through hole, and a second opening, the first opening facing and being aligned with a beam emitting surface of the vertical cavity surface emitting laser (VCSEL) semiconductor device and having a diameter larger than a diameter of the beam emitting surface, the through hole extending from the first opening and passing through the coupling unit, and the second opening being connected to the through hole and provided at an outer surface of the coupling unit, and wherein the body of the module housing may be coupled to the first surface of the board.

According to the embodiment, wherein the vertical cavity surface emitting laser (VCSEL) semiconductor device may be electrically connected to the submount, and the submount may be electrically connected to the board.

According to the embodiment, wherein the submount may comprise a second surface extending from the first surface of the submount toward the board, and wherein the body of the module housing may be coupled to the second surface of the submount and the first surface of the board.

According to the embodiment, wherein the diameter of the first opening and a diameter of the second opening may be the same.

According to the embodiment, wherein the diameter of the first opening may be smaller than a diameter of the second opening.

The optical transmission module according to the embodiment may comprise an adhesive layer disposed between the body and the first surface of the board.

According to the embodiment, wherein the vertical cavity surface emitting laser (VCSEL) semiconductor device disposed on the submount may comprise a plurality of vertical cavity surface emitting laser (VCSEL) semiconductor devices, and the coupling unit may comprise a plurality of through holes aligned to face to a beam emitting surface of each of the plurality of vertical cavity surface emitting laser (VCSEL) semiconductor devices, respectively.

According to the embodiment, wherein the module housing may comprise an extension extending from the body in a direction perpendicular to the first surface of the board and disposed around the board.

According to the embodiment, wherein the distance from the beam emitting surface of the vertical cavity surface emitting laser (VCSEL) semiconductor device to the first opening of the body may be from several tens of micrometers to several hundreds of micrometers.

According to the embodiment, wherein the coupling unit may comprise a first coupling unit providing the first opening, and a second coupling unit coupled to the first coupling unit and providing the second opening, wherein the through hole, provided in the coupling unit and connecting the first opening and the second opening, may comprise a first through hole provided in the first coupling unit and a second through hole provided in the second coupling unit, and wherein a diameter of the first through hole may be reduced from the first opening to a region in which the first coupling unit and the second coupling unit are in contact with each other.

According to the embodiment, wherein a diameter of the second through hole may be the same from a region, in which the first coupling unit and the second coupling unit are in contact with each other, to the second opening.

According to the embodiment, wherein a diameter of the first through hole may be smaller than a diameter of the second through hole in a region in which the first coupling unit and the second coupling unit are in contact with each other.

According to the embodiment, wherein the first coupling unit may be disposed so as to protrude toward a center of the through hole in a region where the first coupling unit and the second coupling unit are in contact with each other.

According to the embodiment, wherein a distance from the beam emitting surface of the vertical cavity surface emitting laser (VCSEL) semiconductor device to the area where the first and second coupling units of the module housing are in contact may be from several tens of micrometers to several hundreds of micrometers.

An optical transmission apparatus according to an embodiment may comprise an optical transmission module comprising a board; a submount disposed on a first surface of the board; a vertical cavity surface emitting laser (VCSEL) semiconductor device disposed on a first surface of the submount; and a module housing comprising a coupling unit and a body, the coupling unit spaced apart from the vertical cavity surface emitting laser (VCSEL) semiconductor device and facing the first surface of the submount, the body extending from the coupling unit toward the first surface of the board and disposed around the submount and the vertical cavity surface emitting laser (VCSEL) semiconductor device, wherein the coupling unit of the module housing may comprise a first opening, a through hole, and a second opening, the first opening facing and being aligned with a beam emitting surface of the vertical cavity surface emitting laser (VCSEL) semiconductor device and having a diameter larger than a diameter of the beam emitting surface, the through hole extending from the first opening and passing through the coupling unit, and the second opening being connected to the through hole and provided at an outer surface of the coupling unit, and wherein the body of the module housing may be coupled to the first surface of the board: and an optical cable coupled to the coupling unit of the optical transmission module and receiving a beam emitted from the vertical cavity semiconductor emitting laser (VCSEL) semiconductor device.

According to the embodiment, wherein the optical cable may comprise a core and a cladding disposed around the core, and wherein a diameter of the first opening may be larger than a diameter of the core.

According to the embodiment, wherein a distance from the beam emitting surface of the vertical cavity surface emitting laser (VCSEL) semiconductor device to a beam incident surface of the core may be from several tens of micrometers to several hundreds of micrometers.

Further, a semiconductor device according to the embodiment may comprise a light emitting structure including a first semiconductor layer, an active layer, and a second semiconductor layer; a first electrode electrically connected to the first semiconductor layer; a second electrode electrically connected to the second semiconductor layer; an insulating layer disposed on the light emitting structure; and a first magnetic material layer disposed on the insulating layer.

According to the embodiment, wherein the light emitting structure may comprise an aperture layer having a predetermined opening and disposed on the active layer, and wherein the first magnetic material layer may be disposed so as not to overlap with the aperture in a vertical direction.

According to the embodiment, wherein the first magnetic material layer may comprise a ferromagnetic material.

The semiconductor device according to the embodiment may further comprise a second magnetic material layer disposed on the first electrode or the second electrode.

According to the embodiment, wherein the second magnetic material layer may be disposed on a first extended electrode of the first electrode.

According to the embodiment, wherein the second magnetic material layer may be disposed on a second extended electrode of the second electrode.

Further, a semiconductor device according to the embodiment may comprise a light emitting structure including a first semiconductor layer, an active layer, and a second semiconductor layer; a first electrode electrically connected to the first semiconductor layer; a second electrode electrically connected to the second semiconductor layer; an insulating layer disposed on the light emitting structure; and a second magnetic material layer disposed on the first electrode or the second electrode.

According to the embodiment, wherein the second magnetic material layer may be disposed on a first extended electrode of the first electrode.

According to the embodiment, wherein the second magnetic material layer may be disposed on a second extended electrode of the second electrode.

According to the embodiment, wherein the second magnetic material layer may comprise a ferromagnetic material.

In addition, an optical transmission module according to the embodiment may comprise a submount having a guide hole; a semiconductor device disposed on the submount; an optical cable disposed in the guide hole of the submount; and a third magnetic material layer disposed at an end of the optical cable.

According to the embodiment, wherein the optical cable may comprise a core and a cladding, and wherein the third magnetic material layer may be provided at an end of the cladding.

According to the embodiment, wherein the guide hole of the submount may comprise a first guide hole having a first width and a second guide hole having a second width larger than the first width, and wherein a first adhesive material layer may be provided under the second guide hole of the submount.

According to the embodiment, wherein the first adhesive material layer may comprise at least one of a pressure sensitive adhesive, a chemical reaction adhesive, and a thermosetting adhesive.

According to the embodiment, wherein the first adhesive material layer may comprise a pressure sensitive adhesive.

In addition, the optical transmission module according to the embodiment may comprise a submount having a guide hole; a semiconductor device disposed on the submount; an optical cable disposed at the guide hole, a fourth magnetic material layer disposed on a side of the guide hole of the submount, and a fifth magnetic material layer disposed on an end of the optical cable.

According to the embodiment, wherein the third magnetic material layer may face the first magnetic material layer of the semiconductor device, the first magnetic material layer may comprise a ferromagnetic material, and the third magnetic material layer may comprise a permanent magnet.

An optical transmission module according to the embodiment may comprise a submount having a guide hole; a semiconductor device disposed on the submount; an optical cable disposed in the guide hole of the submount; a fourth magnetic material layer disposed on a side of the guide hole of the submount; and a fifth magnetic material layer disposed on an end of the optical cable.

According to the embodiment, wherein both the fourth magnetic material layer and the fifth magnetic material layer may be provided as permanent magnets.

According to the embodiment, when any one of the fourth magnetic material layer and the fifth magnetic material layer is a ferromagnetic material, the remainder may be provided as a permanent magnet.

In addition, an optical assembly according to the embodiment may comprise an optical transmission module including any one of the semiconductor devices.

A vertical cavity surface emitting laser semiconductor device according to an embodiment may comprise a light emitting structure including a first conductivity type DBR layer, a second conductivity type DBR layer, and an active layer disposed between the first conductivity type DBR layer and the second conductivity type DBR layer; and a guide unit disposed on an upper surface of the light emitting structure; wherein the light emitting structure may comprise a light emitting aperture that emits light in a direction perpendicular to the upper surface of the light emitting structure, wherein the guide unit may provide a through hole having a diameter larger than a diameter of the light emitting aperture, and wherein the through hole may be provided on the light emitting aperture.

The vertical cavity surface emitting laser semiconductor device according to the embodiment may further comprise a first electrode disposed on the light emitting structure and electrically connected to the first conductivity type DBR layer, and wherein the guide unit may be disposed on an upper surface of the first electrode.

The vertical cavity surface emitting laser semiconductor device according to the embodiment may further comprise a second electrode disposed on the light emitting structure and electrically connected to the second conductivity type DBR layer, and wherein the guide unit may be disposed in contact with an upper surface of the first electrode and an upper surface of the second electrode.

According to the embodiment, wherein the guide unit may comprise a first opening exposing a first electrode pad connected to the first electrode, and a second opening exposing a second electrode pad connected to the second electrode.

According to the embodiment, wherein a diameter of the light emitting aperture may be several micrometers to tens of micrometers, and wherein a diameter of the through hole may be several tens of micrometers to several hundreds of micrometers.

According to the embodiment, wherein the guide unit may be provided in at least one selected from a group including an epoxy molding compound, a black epoxy molding compound, and a polyimide.

According to the embodiment, wherein the through hole can be provided with a diameter larger than a width of the active layer.

According to the embodiment, wherein a thickness of the guide unit may be several micrometers to several hundreds of micrometers.

According to the embodiment, wherein the guide unit may comprise a first guide unit and a second guide unit disposed on the first guide unit, wherein the first guide unit may have a first through hole having a first thickness and a first diameter, and wherein the second guide unit may have a second thickness larger than the first thickness and a second through-hole having a second diameter larger than the first diameter.

According to the embodiment, wherein the first guide unit and the second guide unit may be formed of the same material.

According to the embodiment, wherein the first guide unit and the second guide unit may be formed of different materials.

According to the embodiment, wherein the first guide unit may be formed of polyimide, and the second guide unit may be formed of a black epoxy molding compound.

According to the embodiment, wherein the first through hole of the first diameter of the first guide unit may be provided larger than a diameter of the light emitting aperture of the light emitting structure.

According to the embodiment, wherein the first thickness of the first guide unit may be several micrometers, and the second thickness of the second guide unit may be several micrometers to several hundreds of micrometers.

The vertical cavity surface emitting laser semiconductor device according to the embodiment may further comprise a support disposed on the light emitting structure and provided larger than the diameter of the light emitting aperture and smaller than the diameter of the through hole.

According to the embodiment, wherein the support may be arranged to form a closed loop on the light emitting structure, and a thickness of the support may be several micrometers.

The optical transmission module according to the embodiment may comprise a vertical cavity surface emitting laser semiconductor device including a light emitting structure having a first conductivity type DBR layer, a second conductivity type DBR layer, and an active layer disposed between the first conductivity type DBR layer and the second conductivity type DBR layer; and a guide unit disposed on an upper surface of the light emitting structure: and a circuit board disposed under the vertical cavity surface emitting laser semiconductor device and electrically connected to the first conductivity type DBR layer and the second conductivity type DBR layer, wherein the light emitting structure may comprise a light emitting aperture that emits light in a direction perpendicular to an upper surface of the light emitting structure, wherein the guide unit may provide a through hole having a diameter larger than a diameter of the light emitting aperture, and wherein the through hole may be provided on the light emitting aperture.

The optical transmission apparatus according to the embodiment may comprise the optical transmission module; and an optical cable coupled to the guide unit of the optical transmission module and receiving light emitted from the vertical cavity surface emitting laser semiconductor device.

According to the embodiment, wherein the optical cable may comprise a core and a cladding disposed around the core, and a diameter of the core may be larger than a diameter of the light emitting aperture of the light emitting structure.

According to the embodiment, wherein a distance from a beam emitting surface of the vertical cavity surface emitting laser semiconductor device to a beam incident surface of the core may be provided to be less than ten micrometers.

Advantageous Effects

According to the optical transmission module and the optical transmission apparatus of the embodiment, there is an advantage that the optical transmission module can be small in size and can perform optical alignment easily.

According to the optical transmission module and the optical transmission apparatus of the embodiment, the manufacturing cost can be reduced and the manufacturing process can be simplified, which is advantageous for mass production.

According to the optical transmission module and the optical transmission apparatus of the embodiment, there is an advantage that a coupling efficiency can be improved by implementing a high optical alignment scheme.

According to the semiconductor device, the optical module, and the optical assembly of the embodiment, there is an advantage that a technical effect capable of self-alignment between the optical cable and the semiconductor light emitting device can be provided.

According to the semiconductor device, the optical module and the optical assembly of the embodiment, there is an advantage that a technical effect capable of self-alignment and self-attachment between the optical cable and the semiconductor light emitting device can be provided.

DESCRIPTION OF DRAWINGS

FIG. 1 is a view showing an optical transmission module according to an embodiment.

FIG. 2 is a view explaining an arrangement relationship between the semiconductor device and the submount of the optical transmission module shown in FIG. 1.

FIG. 3 is a plan view explaining flip chip bonding between the semiconductor device and the submount of the optical transmission module shown in FIG. 1.

FIG. 4 is a sectional view explaining flip chip bonding between the semiconductor device and the submount of the optical transmission module shown in FIG. 3.

FIG. 5 is a view explaining an optical transmission apparatus according to an embodiment.

FIG. 6 is a view showing an arrangement relationship between a divergence angle of a beam emitted from a semiconductor device and an optical cable in an optical transmission apparatus according to an embodiment.

FIG. 7 is a view showing another example of an optical transmission module according to an embodiment and an optical transmission apparatus including the same.

FIG. 8 is a view showing another example of an optical transmission module according to an embodiment and an optical transmission apparatus including the same.

FIG. 9 is a view showing another example of an optical transmission module according to an embodiment and an optical transmission apparatus including the same.

FIG. 10 is a view showing another example of an optical transmission module according to an embodiment and an optical transmission apparatus including the same.

FIG. 11 is a view showing another example of an optical transmission module according to an embodiment and an optical transmission apparatus including the same.

FIG. 12 is a view showing another example of an optical transmission module according to an embodiment and an optical transmission apparatus including the same.

FIG. 13a is a cross-sectional view showing an optical transmission module according to an embodiment.

FIG. 13b is a conceptual view explaining self-alignment and self-attachment in an optical transmission module according to an embodiment.

FIGS. 14a to 14d are views explaining a coupling of a submount and a semiconductor device in an optical transmission module according to an embodiment.

FIG. 15 is a plan view showing a semiconductor device in an optical transmission module according to an embodiment.

FIG. 16 is a sectional view taken along line I-I' in the optical transmission module shown in FIG. 15.

FIG. 17 is a sectional view taken along line II-II' in the optical transmission module shown in FIG. 15.

FIG. 18 is another example of a sectional view taken along line II-IP in the optical transmission module shown in FIG. 15.

FIGS. 19a and 19b are conceptual views explaining self-alignment and self-attachment in an optical transmission module according to an embodiment.

FIG. 20 is a sectional view showing another example of an optical cable in an optical transmission module according to an embodiment.

FIG. 21 is a sectional view showing another example of an optical transmission module according to an embodiment.

FIG. 22 is a conceptual view explaining self-alignment and self-attachment in an optical transmission module according to an embodiment.

FIG. 23 is a plan view showing a semiconductor device according to an embodiment.

FIG. 24 is a sectional view taken along line A-A of the semiconductor device shown in FIG. 23.

FIG. 25 is a view showing a shape in which a guide unit is removed from the semiconductor device shown in FIG. 23.

FIG. 26 is a view showing an optical transmission apparatus according to an embodiment.

FIG. 27 is a view showing an arrangement relationship between a divergence angle of a beam emitted from a semiconductor device and an optical cable in an optical transmission apparatus according to an embodiment.

FIGS. 28 to 31 are views explaining a method of manufacturing a semiconductor device according to an embodiment.

FIG. 32 is a view showing another example of a semiconductor device according to an embodiment.

FIG. 33 is a view showing another example of an optical transmission apparatus according to an embodiment.

FIGS. 34 to 38 are views explaining another example of a method of manufacturing a semiconductor device according to an embodiment.

FIGS. 39 to 46 are views explaining another example of a method of manufacturing a semiconductor device according to an embodiment.

FIG. 47 is a view showing another example of an optical transmission apparatus according to an embodiment.

FIG. 48 is a view showing another example of an optical transmission apparatus according to an embodiment.

FIG. 49 is a view showing another example of an optical transmission apparatus according to an embodiment.

FIG. 50 is a view showing another example of an optical transmission apparatus according to an embodiment.

FIG. 51 is a view showing another example of an optical transmission module according to an embodiment.

FIG. 52 is a plan view showing a semiconductor device according to an embodiment.

FIG. 53 is a sectional view taken along line E-E of the semiconductor device shown in FIG. 52.

MODE FOR INVENTION

Hereinafter, embodiments will be described with reference to the accompanying drawings. In the description of the embodiments, in the case that each layer (film), region, pattern or structure may be referred to as provided "on/over" or "under" a substrate, each layer (film), region, pad, or pattern, the terms "on/over" and "under" include both "directly" and "indirectly interposed with another layer". In addition, "on/over" or "under" of each layer will be described based on the drawings, but the embodiments are not limited thereto.

Hereinafter, an optical transmission module and an optical transmission apparatus according to an embodiment of the present invention will be described in detail with reference to the accompanying drawings.

First, referring to FIG. 1, an optical transmission module according to an embodiment of the present invention will be described. FIG. 1 is a view showing an optical transmission module according to an embodiment.

An optical transmission module 100 according to the embodiment may comprise a board 110, a submount 120, a semiconductor device 130, and a module housing 140 as shown in FIG. 1.

As an example, the submount 120 may be disposed on the board 110. The submount 120 may be disposed on a first surface of the board 110. The submount 120 may be described as being disposed on an upper surface of the board 110 in consideration of the coupling and arrangement relationship of the board 110, the submount 120, and the semiconductor device 130.

The semiconductor device 130 may be disposed on the submount 120. The semiconductor device 130 may be disposed on a first surface of the submount 120. For example, the first surface of the submount 120 and the first surface of the board 110 may be disposed parallel to each other. The semiconductor device 130 may be described as being disposed on an upper surface of the submount 120 in consideration of the coupling and arrangement relationship of the board 110, the submount 120, and the semiconductor device 130.

The semiconductor device 130 according to the embodiment may be selected from a light emitting device including a light emitting diode device and a laser diode device. For example, the semiconductor device 130 may be a vertical cavity surface emitting laser (VCSEL) semiconductor device. A vertical cavity surface emitting laser (VCSEL) semiconductor devices can emit beams in an upper direction at an upper surface. A vertical cavity surface emitting laser (VCSEL) semiconductor device can emit the beam upward in a beam angle of about 5 degrees to 30 degrees, for example. A vertical cavity surface emitting laser (VCSEL) semiconductor devices can emit beams upward more specifically in a beam angle of 15 degrees to 20 degrees. A vertical cavity surface emitting laser (VCSEL) semiconductor devices may comprise a light emitting aperture 130a that emits a circular beam. According to the embodiment, a diameter of the light emitting aperture 130a may be several micrometers. For example, the diameter of the light emitting aperture 130a may be in the range of 8 micrometers to 10 micrometers. An example of a vertical cavity surface emitting laser (VCSEL) semiconductor device will be described later.

According to the embodiment, the semiconductor device 130 may be electrically connected to the submount 120. The semiconductor device 130 may be electrically connected to the submount 120 by a flip chip bonding method, a die bonding method, a wire bonding method, or the like. An optical transmission module shown in FIG. 1 shows an example in which the semiconductor device 130 is electrically coupled to the submount 120 by a flip chip bonding method. The submount 120 may be electrically connected to the board 110. For example, the submount 120 may be coupled to the board 110 by a kind of chip on board (COB) method. The submount 120 may be disposed on the board 110.

The submount 120 may comprise a circuit electrically connected to the semiconductor device 130. In addition, the submount 120 may comprise a circuit electrically connected to the board 110. As an example, the submount 120 may be formed based on a material such as silicon (Si) or aluminum nitride (AlN). The submount 120 may be formed in the form of a wafer and may be provided to be applied to individual devices through a cutting process such as dicing.

For example, after the semiconductor device 130 is coupled to a large submount in the form of a wafer, it may be separated into individual submounts 120 through a cutting process. At this time, a process error regarding the size of the submount 120 due to cutting of the submount 120 can be controlled within a few micrometers. For example, the process error regarding the size of the submount 120 by dicing cut to the submount 120 may be controlled at 2 micrometers to 3 micrometers. In addition, a difference in distance between the cutting line set for cutting the submount 120 and the cutting line actually cut can be controlled at 2 micrometers to 3 micrometers.

The board 110 may comprise a circuit that provides an electrical signal to the submount 120. The board 110 may provide an external signal to the submount 120. As described above, a driving of the semiconductor device 130 can be controlled by the electrical connection between the board 110, the submount 120, and the semiconductor device 130. For example, the board 110 may be formed of a printed circuit board. The board 110 may comprise at least one of a rigid printed circuit board (Rigid PCB) and a flexible printed circuit board (FPCB).

The optical transmission module 100 according to the embodiment may comprise a plurality of semiconductor devices 130 disposed on the submount 120 as shown in FIG. 2. FIG. 2 is a view explaining the arrangement relationship between the semiconductor device and the submount of the optical transmission module shown in FIG. 1.

The optical transmission module 100 shown in FIG. 2 shows a case in which the optical transmission module 100 is applied to an optical transmission apparatus having four channels. Four semiconductor devices 130 may be disposed on the submount 120 when the optical transmission module 100 according to the embodiment has four channels. The number of the semiconductor devices 130 disposed on the submount 120 may be arranged to correspond to the number of channels.

The number of the semiconductor devices 130 disposed on the submount 120 may be three or less, or five or more, corresponding to the number of channels. For example, when the optical transmission module 100 is applied to an optical transmission apparatus having eight channels, eight semiconductor devices 130 may be disposed on the submount 120.

The plurality of semiconductor devices 130 may be disposed on the submount 120, and may be arranged in a matrix, for example, aligned in a first direction and in a second direction perpendicular to the first direction. In addition, the plurality of semiconductor devices 130 may be arranged in one direction.

According to the embodiment, the semiconductor device 130 may comprise a light emitting aperture 130a. The beam emitted from the light emitting aperture 130a may have a circular light pattern. According to the embodiment, a diameter of the light emitting aperture 130a may be several micrometers. For example, the diameter of the light emitting aperture 130a may be in the range of 8 micrometers to 10 micrometers. The semiconductor device 130 may transmit a signal using a beam emitted from the light emitting aperture 130a.

For example, the semiconductor device 130 may be formed to have a width of 50 micrometers to 200 micrometers. In addition, the semiconductor device 130 may be formed to have a length of 50 micrometers to 200 micrometers. The semiconductor device 130 may be formed to have a thickness of, for example, 80 micrometers to 150 micrometers. A spacing p between the plurality of semiconductor devices 130 may be several hundred micrometers. The spacing p between the plurality of semiconductor devices 130 may be changed according to the size of the semiconductor device 130. The optical transmission module 100 according to the embodiment is coupled to an optical cable for transmitting a beam emitted from the semiconductor device 130, the spacing p between the plurality of semiconductor devices 130 can be changed. The spacing p between the plurality of semiconductor devices 130 may be, for example, 400 micrometers to 600 micrometers.

The plurality of semiconductor devices 130 may be coupled to the submount 120 by a flip chip bonding method as an example. According to the embodiment, the flip chip bonding method as shown in FIGS. 3 and 4 can be applied to reduce the process error. FIG. 3 is a plan view explaining flip chip bonding between the semiconductor device and the submount of the optical transmission module shown in FIG. 1, and FIG. 4 is a sectional view explaining flip chip bonding between the semiconductor device and the submount of the optical transmission module shown in FIG. 3.

As shown in FIGS. 3 and 4, when the flip chip bonding method is used to couple the submount 120 and the semiconductor device 130, the first recess 121 may be provided in the submount 120, and a second recess 131 may be provided in the semiconductor device 130. After bumps 123 are disposed in the first recess 121, heat treatment may be performed. At this time, the bumps 123 can be melted by the heat treatment and can be held in the first recess 121. The first recess 121 can perform a kind of dam function and can prevent the bumps 123 from overflowing or falling out from a region of the first recess 121. So that the position of the first recess 121 and the position of the bump 123 can be controlled with high accuracy.

The second recess 131 may be provided on a coupling surface of the semiconductor device 130 configured to be coupled to the submount 120. Accordingly, when the semiconductor device 130 is coupled to the submount 120 by the flip-chip bonding method, the position of the bump 123 and the position of the second recess 131 can be controlled with high accuracy. The semiconductor device 130 may be disposed on the submount 120 by a self-alignment method. According to such a flip chip bonding method, the process error can be controlled within a few micrometers. For example, according to the embodiment, the coupling process error between the semiconductor device 130 and the submount 120 can be managed under 5 micrometers. The semiconductor device 130 may be disposed on the submount 120 and may be managed under a process error range of 5 micrometers or less.

For example, the bump 123 may comprise a material capable of eutectic bonding. For example, the bump 123 may comprise at least one of AuSn, NiSn, or InAu.

The optical transmission module 100 according to the embodiment, as shown in FIG. 1, may comprise the module housing 140. The module housing 140 may comprise a coupling unit 141 and a body 143. For example, the coupling unit 141 and the body 143 may be integrally formed as one body, but are not limited thereto.

The coupling unit 141 may be spaced apart from the semiconductor device 120. For example, the coupling unit 141 may be spaced apart from an upper surface of the semiconductor device 120. An inner surface of the coupling unit 141 may be spaced apart from the light emitting aperture 130a of the semiconductor device 120.

The coupling unit 141 may be disposed to face a first surface of the submount 120. The inner surface of the coupling unit 141 may be disposed to face an upper surface of the submount 120. The inner surface of the coupling unit 141 may be disposed to face the upper surface of the semiconductor device 130. The inner surface of the coupling unit 141 may be disposed parallel to the first surface of the submount 120 on which the semiconductor device 130 is disposed.

The body 143 may extend from the coupling unit 141 toward a first surface of the board 110. The body 143 may be disposed around the submount 120. The body 143 may be disposed around the semiconductor device 130. The body 143 may provide a cavity C. The submount 120 may be disposed in the cavity C. The submount 120 may be disposed in the cavity C and coupled to the body 143. The semiconductor device 130 may be disposed in the cavity C. The semiconductor device 130 may be spaced apart from an inner surface of the body 143.

The body 143 may be coupled to the board 110. The body 143 may be disposed on the first surface of the board 110. A surface of the body 143 may be disposed on the first surface of the board 110 on which the submount 120 is disposed. For example, a first adhesive layer 160 may be disposed between the body 143 and the board 110. The first adhesive layer 160 may couple the board 110 and the body 143.

For example, the first adhesive layer 160 may be formed of an ultraviolet (UV) curable adhesive layer. When the first adhesive layer 160 is formed of an ultraviolet curable adhesive layer, after the first adhesive layer 160 is disposed between the body 143 and the board 110, the body 143 and the board 110 can be stably coupled by irradiating ultraviolet rays. According to the embodiment, the body 143 may be formed of an ultraviolet ray transmitting material for irradiating the first adhesive layer 160 with ultraviolet rays. For example, the body 143 may be formed of at least one selected from a group including glass, polycarbonate (PC) resin, acrylic resin, liquid crystal polymer (LCP) resin, polyethylene terephthalate (PET) resin, or the like.

Meanwhile, the first adhesive layer 160 may be formed of a thermosetting adhesive layer. When the first adhesive layer 160 is formed of a thermosetting adhesive layer, after the first adhesive layer 160 is disposed between the body 143 and the board 110, the body 143 and the board 110 can be stably coupled by heat treatment and squeezing. For example, the first adhesive layer 160 may be an epoxy-based adhesive layer. According to the embodiment, the body 143 may be formed of at least one selected from a group including metal, glass, polycarbonate (PC) resin, acrylic resin, liquid crystal polymer (LCP) resin, polyethylene terephthalate (PET)) resin, or the like.

Meanwhile, the body 143 may be coupled to the submount 120 and the board 110. The submount 120 may comprise a first surface on which the semiconductor device 130 is disposed. The submount 120 may comprise a second surface extending from the first surface toward the board 110. The body 143 may be coupled to the submount 120. The body 143 may be coupled to the second surface of the submount 120. For example, the body 143 and the submount 120 may be physically coupled. Also, the body 143 and the submount 120 may be coupled by an adhesive layer disposed therebetween.

According to the embodiment, the coupling unit 141 may comprise a through hole 151, a first opening 153, and a second opening 155. The through hole 151 may be formed through the coupling unit 141. The coupling unit 141 may comprise a plurality of through holes 151.

The first opening 153 may be disposed to face and arranged in alignment with a beam emitting surface of the semiconductor device 130. The first opening 153 may be disposed to face and arranged in alignment with the beam emitting surface of the light emitting aperture 130a. For example, the first opening 153 may be formed to have a diameter larger than a diameter of the beam emitting surface of the semiconductor device 130. The first opening 153 may be formed to have a diameter larger than a diameter of the beam emitting surface of the light emitting aperture 130a.

The through hole 151 may extend from the first opening 153 and through the coupling unit 141. The second opening 155 may be connected to the through hole 151. The second opening 155 may be formed on an outer surface of the coupling unit 141. For example, a diameter of the through hole 151 may be the same as the diameter of the first opening 153. A diameter of the second opening 155 may be the same as the diameter of the first opening 153.

The optical transmission module 100 according to the embodiment may comprise a plurality of semiconductor devices 130 and the coupling unit 141 may comprise a plurality of through holes 151 corresponding to the plurality of semiconductor devices 130.

According to the embodiment, the module housing 140 may comprise an extension 145. The extension 145 may extend from the body 143 toward the board 110. The extension 145 may extend from the body 143 in a direction perpendicular to the first surface of the board 110. For example, the extension 145 may be disposed around the board 110. The board 110 may be disposed in a space surrounded by the extension 145. Also, the extension 145 may be coupled to the board 110. An adhesive layer may be further disposed between the extension 145 and the board 110. For example, the coupling unit 141, the body 143, and the extension 145 may be integrally formed as one body, but the embodiment is not limited thereto.

According to the embodiment, a distance l from the beam emitting surface of the semiconductor device 130 to the first opening 153 of the module housing 140 may be several tens of micrometers to several hundreds of micrometers. In other words, the distance l from the beam emitting surface of the light emitting aperture 130a to the first opening 153 of the module housing 140 may be several tens of micrometers to several hundreds of micrometers.

The distance l from the beam emitting surface of the semiconductor device 130 to the first opening 153 of the module housing 140 can be determined by the diameter of the beam emitting surface of the light emitting aperture 130a, the divergence angle of the beam emitted from the light emitting aperture 130a, and a diameter of a core of the optical cable configured to receive the beam emitted from the semiconductor device 130 and be disposed in the through hole 151.

The distance l from the beam emitting surface of the semiconductor device 130 to the first opening 153 of the module housing 140 can be determined so that the beam emitted from the light emitting aperture 130a may be incident on the core of the optical cable.

The distance l from the beam emitting surface of the semiconductor device 130 to the first opening 153 of the module housing 140 will be described in more detail later with reference to FIGS. 5 and 6.

As described above, the optical transmission module 100 according to the embodiment can control a mechanical alignment error within a few micrometers between the board 110, the submount 120, the semiconductor device 130, and the module housing 140. That is, in the optical transmission module 100 according to the embodiment, the alignment error between the central axis of the through hole 151 provided in the module housing 140 and the central axis of the beam emitting surface of the semiconductor device 130 can be controlled within several micrometers. The distance l from the beam emitting surface of the semiconductor device 130 to the opening 153 of the module housing 140 is controlled to be a certain distance or less so that the beam emitted from the semiconductor device 130 can be provided without loss to the core of the optical cable configured to be coupled to the opening 153.

Therefore, according to the optical transmission module 100 of the embodiment, the optical alignment between the semiconductor device 130 and the core of the optical cable can be performed only by coupling the optical cable to the through hole 151. That is, the optical transmission module 100 according to the embodiment can provide a kind of self-alignment effect by coupling between the semiconductor device 130 and the core of the optical cable.

In the case of a conventional optical transmission module, an additional optical means such as a lens, a prism, and a reflecting mirror is required for optical alignment between a semiconductor device emitting a beam and a core of an optical cable receiving the beam. Accordingly, in the case of the conventional optical transmission module, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission module 100 of the embodiment, the optical alignment between the semiconductor device 130 that emits the beam and the optical cable 130 can be completed by simply coupling the optical cable to the optical transmission module 100.

Accordingly, the optical transmission module 100 according to the embodiment is advantageous in that the optical transmission module 100 can be provided with a small size, can easily provide optical alignment, can reduce manufacturing cost, and can improve productivity.

In the actual product application step, the optical transmission module 100 described above may be supplied as one component or may be provided in the form of an optical transmission apparatus in which an optical cable is coupled to the optical transmission module 100.

An optical transmission apparatus according to an embodiment will now be described with reference to FIG. 5. FIG. 5 is a view explaining an optical transmission apparatus according to an embodiment. Referring to FIG. 5, in describing the optical transmission apparatus according to the embodiment, description overlapping with those described with reference to FIGS. 1 to 4 may be omitted.

The optical transmission apparatus 900 according to the embodiment may comprise the optical transmission module 100 and an optical cable 800 as shown in FIG. 5. The optical cable 800 may be coupled to the optical transmission module 100. The optical cable 800 may be coupled to the optical transmission module 100 to receive a beam provided from the optical transmission module 100.

For example, the optical cable 800 may comprise a core 810 and a cladding 820. The cladding 820 may be disposed around the core 810. The optical cable 800 and the optical transmission module 100 may be coupled so that a beam emitted from the optical transmission module 100 may be incident on the core 810.

According to the embodiment, in the describing the optical cable 800, only the core 810 and the cladding 820 disposed around the core 810 are shown in FIG. 5. However, as is known, the optical cable 800 may further comprise a protective layer disposed around the cladding 820. That is, according to the embodiment, when the optical cable 800 is coupled to the optical transmission module 100, the outer circumferential surface of the cladding 820 may be arranged to be in contact with and coupled to the optical transmission module 100. In addition, when the optical cable 800 is coupled to the optical transmission module 100, the protective layer disposed around the cladding 820 may be arranged to be in contact with and coupled to the optical transmission module 100

The optical transmission module 100 according to the embodiment may comprise a board 110, a submount 120, a semiconductor device 130, and a module housing 140, as shown in FIG. 5. The module housing 140 may comprise a coupling unit 141, a body 143, and an extension 145.

As an example, the submount 120 may be disposed on the board 110. The semiconductor device 130 may be disposed on the submount 120.

According to the embodiment, the semiconductor device 130 may be electrically connected to the submount 120. The optical transmission module shown in FIG. 5 explains an example in which the semiconductor device 130 is electrically coupled to the submount 120 by a flip chip bonding method. The submount 120 may be electrically connected to the board 110.

The submount 120 may comprise a circuit electrically connected to the semiconductor device 130. In addition, the submount 120 may comprise a circuit electrically connected to the board 110.

The board 110 may comprise a circuit that provides an electrical signal to the submount 120. The board 110 may provide an external signal to the submount 120. As described above, the driving of the semiconductor device 130 can be controlled by the electrical connection between the board 110, the submount 120, and the semiconductor device 130.

The plurality of semiconductor devices 130 may be disposed on the submount 120, for example, by a flip chip bonding method. According to such a flip chip bonding method, the process error can be controlled within a few micrometers. For example, according to the embodiment, the coupling process error between the semiconductor device 130 and the submount 120 can be managed within 5 micrometers.

The body 143 may be coupled to the board 110. The body 143 may be disposed on a first surface of the board 110. A surface of the body 143 may be disposed on a first side of the board 110 on which the submount 120 is disposed. For example, a first adhesive layer 160 may be disposed between the body 143 and the board 110. The first adhesive layer 160 may couple the board 110 and the body 143.

Meanwhile, the body 143 may be coupled to the submount 120 and the board 110. The submount 120 may comprise a first surface on which the semiconductor device 130 is disposed. The submount 120 may comprise a second surface extending from the first surface toward the board 110. The body 143 may be coupled to the submount 120. The body 143 may be coupled to the second surface of the submount 120. For example, the body 143 and the submount 120 may be physically coupled. Also, the body 143 and the submount 120 may be coupled by an adhesive layer disposed therebetween.

According to the embodiment, the coupling unit 141 may comprise a through hole 151, a first opening 153, and a second opening 155. The through hole 151 may be formed through the coupling unit 141. The coupling unit 141 may comprise a plurality of through holes 151.

The first opening 153 may be disposed to face and arranged in alignment with a beam emitting surface of the semiconductor device 130. The first opening 153 may be disposed to face and arranged in alignment with the beam emitting surface of the light emitting aperture 130a. For example, the first opening 153 may be formed to have a diameter larger than a diameter of the beam emitting surface of the semiconductor device 130. The first opening 153 may be formed to have a diameter larger than a diameter of the beam emitting surface of the light emitting aperture 130a.

The through hole 151 may extend from the first opening 153 and through the coupling unit 141. The second opening 155 may be connected to the through hole 151. The second opening 155 may be formed on an outer surface of the coupling unit 141. For example, a diameter of the through hole 151 may be the same as the diameter of the first opening 153. A diameter of the second opening 155 may be the same as the diameter of the first opening 153.

The optical transmission module 100 according to the embodiment may comprise a plurality of semiconductor devices 130 and the coupling unit 141 may comprise a plurality of through holes 151 corresponding to the plurality of semiconductor devices 130.

According to the embodiment, a distance l from the beam emitting surface of the semiconductor device 130 to the first opening 153 of the module housing 140 may be several tens of micrometers to several hundreds of micrometers. In other words, the distance l from the beam emitting surface of the light emitting aperture 130a to the first opening 153 of the module housing 140 may be several tens of micrometers to several hundreds of micrometers.

The optical transmission apparatus 900 according to the embodiment may comprise the optical cable 800 coupled to the through hole 151 as shown in FIG. 5. For example, the core 810 of the optical cable 800 may be arranged in alignment with the first opening 153. A beam incident surface of the core 810 may be arranged in alignment with an inner surface of the coupling unit 141 that provides the first opening 153. The distance l from the beam emitting surface of the light emitting aperture 130a to the first opening 153 and the distance l from the beam emitting surface of the light emitting aperture 130a to the beam incident surface of the core 810 may be the same.

The beam incident surface of the core 810 may be disposed parallel to the beam emitting surface of the semiconductor device 130. The beam incident surface of the core 810 may be disposed parallel to the beam emitting surface of the light emitting aperture 130a. The distance l from the beam emitting surface of the semiconductor device 130 to the beam incident surface of the core 810 may be several tens of micrometers to several hundreds of micrometers. In other words, the distance l from the beam emitting surface of the light emitting aperture 130a to the beam incident surface of the core 810 may be several tens of micrometers to several hundreds of micrometers.

According to the optical transmission apparatus 900 of the embodiment, since the beam incident surface of the core 810 and the beam emitting surface of the light emitting aperture 130a are arranged in parallel with each other, an additional optical means such as a reflecting mirror or a prism for reflecting the beam emitted from the light emitting aperture 130a toward in a direction in which the core 810 is positioned is not needed.

In addition, according to the optical transmission apparatus 900 of the embodiment, since the distance l from the beam emitting surface of the light emitting aperture 130a to the beam incident surface of the core 810 is provided with a short distance of several tens of micrometers to several hundreds of micrometers so that all of the beam emitted from the light emitting aperture 130a can be incident on the beam incident surface of the core 810, an additional optical means such as a lens for focusing beam to the core 810 is not needed.

The distance l from the beam emitting surface of the semiconductor device 130 to the first opening 153 of the module housing 140 can be determined by the diameter of the beam emitting surface of the light emitting aperture 130a, a divergence angle of the beam emitted from the light emitting aperture 130a, and the diameter of the core 810 of the optical cable 800 configured to receive the beam emitted from the semiconductor device 130 and be disposed in the through hole 151.

The distance l from the beam emitting surface of the semiconductor device 130 to the beam incident surface of the core 810 can be set such that the maximum distance may be limited so that all of the beam emitted from the light emitting aperture 130a is incident on the core 810 of the optical cable 800.

Then, the distance l from the beam emitting surface of the semiconductor device 130 to the beam incident surface of the core 810 in the optical transmission apparatus 900 according to the embodiment will be described with reference to FIG. 6. FIG. 6 is a view showing an arrangement relationship between a divergence angle of a beam emitted from a semiconductor device and an optical cable in the optical transmission apparatus according to the embodiment.

According to the embodiment, the semiconductor device 130 may comprise a light emitting aperture 130a. The beam emitted from the light emitting aperture 130a may have a circular light pattern. According to the embodiment, the diameter a of the light emitting aperture 130a may be several micrometers. For example, the diameter a of the light emitting aperture 130a may be in the range of 8 micrometers to 10 micrometers. The semiconductor device 130 may transmit a signal using a beam emitted from the light emitting aperture 130a.

The semiconductor device 130 may be formed, for example, as a vertical cavity surface emitting laser (VCSEL) semiconductor device and may emit a beam in an upward direction at an upper surface. A vertical cavity surface emitting laser (VCSEL) semiconductor device 130 can emit the beam upward in a beam divergence angle θ of, for example, about 5 degrees to about 30 degrees. The vertical cavity surface emitting laser (VCSEL) semiconductor device 130 may emit beams upward more specifically with a divergence angle θ of about 15 degrees to about 20 degrees.

For example, the core 810 may be formed with a diameter b of several tens of micrometers. For example, the diameter b of the core 810 may be in a range of 55 micrometers to 70 micrometers.

Meanwhile, as shown in FIG. 6, when the diameter a of the light emitting aperture 130a, the diameter b of the core 810, and the divergence angle θ of the light emitting aperture 130a are given, the maximum distance x for allowing all of the beam emitted from the light emitting aperture 130a to be incident on the core 810 can be calculated by [Equation 1].

$$\tan(\theta/2) = (b-a)/2x \qquad \text{[Equation 1]}$$

From the [Equation 1], when a change in the diameter a of the light emitting aperture 130a, a change in the diameter b of the core 810, and a change in the divergence angle θ of the light emitting aperture 130a are considered, the maximum distance x for allowing all of the beam emitted from the light emitting aperture 130a to be incident on the core 810 may have a value of approximately 84 micrometers to 710 micrometers. Therefore, in the optical transmission apparatus 900 according to the embodiment, the distance l from the beam emitting surface of the light emitting aperture 130a to the beam incident surface of the core 810 can be set smaller than the maximum distance x so that all of the beam emitted from the light emitting aperture 130a can be incident on the core 810.

At this time, the maximum distance x for allowing all of the beam emitted from the light emitting aperture 130a to be incident on the core 810 is calculated in the following variation ranges.

The diameter a of the light emitting aperture 130a: 8 micrometers to 10 micrometers The diameter b of the core 810: 55 Micrometers to 70 micrometers The divergence angle θ of the light emitting aperture 130a: 5 degrees to 30 degrees That is, when the diameter a of the light emitting aperture 130a is 10 micrometers, the diameter b of the core 810 is 55 micrometers, and the divergence angle of the light emitting aperture 130a is 30 degrees, the maximum distance x for allowing the beam emitted from the light emitting aperture 130a to be incident on the core 810 may be calculated to be approximately 84 micrometers.

In addition, when the diameter a of the light emitting aperture 130a is 8 micrometers, the diameter b of the core 810 is 70 micrometers, and the divergence angle θ of the light emitting aperture 130a is 5 degrees, the maximum distance x for allowing all of the beam emitted from the light emitting aperture 130a to be incident on the core 810 may be calculated to be approximately 710 micrometers.

Meanwhile, if the diameter a of the light emitting aperture 130a is set to 10 micrometers, the diameter b of the core 810 is set to 60 micrometers, and the divergence angle of the light emitting aperture 130a is set in a range of 15 degrees to 25 degrees, the maximum distance x for allowing all of the beam emitted from the light emitting aperture 130a to be incident on the core 810 can be calculated to have a value in a range of 142 micrometers to 190 micrometers.

For example, if the diameter a of the light emitting aperture 130a is 10 micrometers, the diameter b of the core 810 is 60 micrometers, and the divergence angle θ of the light emitting aperture 130a is provided with 15 degrees, the maximum distance x for allowing all of the beam emitted from the light emitting aperture 130a to be incident on the core 810 is calculated to be about 190 micrometers.

In addition, if the diameter a of the light emitting aperture 130a is 10 micrometers, the diameter b of the core 810 is 60 micrometers, and the divergence angle θ of the light emitting aperture 130a is provided with 20 degrees, the maximum distance x for allowing all of the beam emitted from the light emitting aperture 130a to be incident on the core 810 is calculated to be approximately 142 micrometers.

As described above, the optical transmission apparatus 900 according to the embodiment can control a mechanical alignment error within a few micrometers between the board 110, the submount 120, the semiconductor device 130, and the module housing 140. That is, in the optical transmission apparatus 900 according to the embodiment, the alignment error between the central axis of the through hole 151 provided in the module housing 140 and the central axis of the beam emitting surface of the semiconductor device 130 can be controlled within several micrometers. Therefore, the alignment error between the central axis of the core 810 disposed in the through hole 151 and the central axis of the beam emitting surface of the light emitting aperture 130a can be controlled within a few micrometers. The distance l from the beam emitting surface of the semiconductor device 130 to the beam incident surface of the core 810 is controlled to be a distance of several tens of micrometers to several hundreds of micrometers, so that the beam emitted from the semiconductor device 130 can be provided without loss to the beam incident surface of the core 810.

Therefore, according to the optical transmission apparatus 900 of the embodiment, the optical alignment between the semiconductor device 130 and the core 810 of the optical cable 800 can be performed only by coupling the optical cable 800 to the through hole 151. That is, the optical transmission module 900 according to the embodiment can provide a kind of self-alignment effect by coupling between the optical transmission module 100 and the core 810 of the optical cable 800.

In the case of a conventional optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 900 of the embodiment, the optical alignment between the semiconductor device 130 that provides the beam and the core 810 of the optical cable 800 can be completed by simply coupling the optical cable 800 to the optical transmission module 100.

Accordingly, the optical transmission apparatus 900 according to the embodiment is advantageous in that the optical transmission apparatus can be provided with a small size, easily provide optical alignment, reduce manufacturing cost, and improve productivity.

Meanwhile, the position of the beam incident surface of the core 810 may be partially protruded from the first opening 513 toward the semiconductor device 130 due to a process error at the time of coupling between the optical transmission module 100 and the optical cable 800, or may be inserted into the through hole 151 from the first opening 513 toward the second opening 515. At this time, the coupling between the optical transmission module 100 and the optical cable 800 may be performed through, for example, an ultraviolet curable adhesive.

Of course, according to the optical transmission apparatus of the embodiment, even in this case, by adjusting the distance from the beam emitting surface of the semiconductor device 130 to the beam incident surface of the core 810, the beam emitted from the semiconductor device 130 can be provided without loss to the beam incident surface of the core 810.

Meanwhile, the optical transmission apparatus shown in FIG. 7 may be proposed as one method for reducing the occurrence of such a process error. FIG. 7 is a view showing another example of an optical transmission module according to an embodiment and an optical transmission apparatus including the same. Referring to FIG. 7, in describing the optical transmission module and the optical transmission apparatus according to the embodiment, description overlapping with those described with reference to FIGS. 1 to 6 may be omitted.

The optical transmission apparatus 900 according to the embodiment may comprise an optical transmission module 200 and an optical cable 800, as shown in FIG. 7. The optical cable 800 may be coupled to the optical transmission module 200. The optical cable 800 may be coupled to the optical transmission module 200 to receive a beam emitted from the optical transmission module 200. For example, the optical cable 800 may comprise a core 810 and a cladding 820.

The optical transmission module 200 according to the embodiment may comprise a board 210, a submount 220, a semiconductor device 230, and a module housing 240, as shown in FIG. 7. The module housing 240 may comprise a coupling unit 241, a body 243, and an extension 245. In addition, the module housing 240 may further comprise a protrusion 242 disposed in the coupling unit 241. The position where the optical cable 800 is coupled to the coupling unit 241 can be easily determined by the protrusion 242. For example, the position of insertion of the optical cable 800 can be determined by the protrusion 242. According to the embodiment, when the optical cable 800 is coupled to the optical transmission module 200, the optical cable 800 can be inserted until the optical cable 800 is blocked by the protrusion 242, so that the arrangement position of the optical cable 800 can be clearly determined. Thus, the distance from the beam emitting surface of the semiconductor device 230 to the beam incident surface of the core 810 can be clearly determined.

As an example, the submount 220 may be disposed on the board 210. The submount 220 may be disposed on a first surface of the board 210. The semiconductor device 230 may be disposed on the submount 220. The semiconductor device 230 may be disposed on a first surface of the submount 220. For example, the first surface of the submount 220 and the first surface of the board 210 may be disposed parallel to each other.

According to the embodiment, the semiconductor device 230 may be electrically connected to the submount 220. The submount 220 may be electrically connected to the board 210.

The submount 220 may comprise a circuit electrically connected to the semiconductor device 230. In addition, the submount 220 may comprise a circuit electrically connected to the board 210.

The board 210 may comprise a circuit that provides an electrical signal to the submount 220. The board 210 may provide an external signal to the submount 220. The driving of the semiconductor device 230 can be controlled by electrical connection between the board 210, the submount 220, and the semiconductor device 230. For example, the board 210 may be formed of a printed circuit board. The board 210 may comprise at least one of a rigid printed circuit board (Rigid PCB) and a flexible printed circuit board (FPCB).

The plurality of semiconductor devices 230 may be disposed on the submount 220, for example, by a flip chip bonding method. According to such a flip chip bonding method, the process error can be controlled within a few micrometers. For example, according to the embodiment, the coupling process error between the semiconductor device 230 and the submount 220 can be managed within 5 micrometers.

The optical transmission module 200 according to the embodiment may comprise a module housing 240, as shown in FIG. 7. The module housing 240 may comprise a coupling unit 241 and a body 243. For example, the coupling unit 241 and the body 243 may be integrally formed as one body.

The coupling unit 241 may be spaced apart from the semiconductor device 220. For example, the coupling unit 241 may be disposed apart from an upper surface of the semiconductor device 220. An inner surface of the coupling unit 241 may be spaced apart from the light emitting aperture 230a of the semiconductor device 220.

The coupling unit 241 may be disposed to face the first surface of the submount 220. The inner surface of the coupling unit 241 may be disposed to face the upper surface of the submount 220. The inner surface of the coupling unit 241 may be disposed to face the upper surface of the semiconductor device 230. The inner surface of the coupling unit 241 may be disposed parallel to the first surface of the submount 220 on which the semiconductor device 230 is disposed.

The body 243 may extend from the coupling unit 241 toward the first surface of the board 210. The body 243 may be disposed around the submount 220. The body 243 may be disposed around the semiconductor device 230. The body 243 may provide a cavity C. The submount 220 may be disposed in the cavity C. The submount 220 may be disposed in the cavity C and coupled to the body 243. The semiconductor device 230 may be disposed in the cavity C. The semiconductor device 230 may be spaced apart from an inner surface of the body 243.

The body 243 may be coupled to the board 210. The body 243 may be disposed on the first surface of the board 210. A surface of the body 243 may be disposed on a first side of the board 210 on which the submount 220 is disposed. For example, a first adhesive layer 260 may be disposed between the body 243 and the board 210. The first adhesive layer 260 may couple the board 210 and the body 243.

Meanwhile, the body 243 may be coupled to the submount 220 and the board 210. The submount 220 may comprise a first surface on which the semiconductor device 230 is disposed. The submount 220 may comprise a second surface extending from the first surface toward the board 210. The body 243 may be coupled to the submount 220. The body 243 may be coupled to the second surface of the submount 220. For example, the body 243 and the submount 220 may be physically coupled. Also, the body 243 and the submount 220 may be coupled by an adhesive layer disposed therebetween.

According to the embodiment, the coupling unit 241 may comprise a protrusion 242, a through hole 251, a first opening 253, and a second opening 255. The through hole 251 may be formed through the coupling unit 241. The coupling unit 241 may comprise a plurality of through holes 251.

The first opening 253 may be disposed to face and arranged in alignment with abeam emitting surface of the semiconductor device 230. The first opening 253 may be disposed to face and arranged in alignment with the beam emitting surface of the light emitting aperture 230a. For example, the first opening 253 may be formed to have a diameter larger than a diameter of the beam emitting surface of the semiconductor device 230. The first opening 253 may be formed to have a diameter larger than a diameter of the beam emitting surface of the light emitting aperture 230a.

The through hole 251 may extend from the first opening 253 and through the coupling unit 241. The second opening 255 may be connected to the through hole 251. The second opening 155 may be formed on an outer surface of the coupling unit 241. For example, a diameter of the through hole 251 may be different from the diameter of the first opening 253 and the diameter of the second opening 255. The diameter of the first opening 253 may be defined by the protrusion 242.

The optical transmission module 200 according to the embodiment may comprise a plurality of semiconductor devices 230, and the coupling unit 241 may comprise a plurality of through holes 251 corresponding to the plurality of semiconductor devices 230.

According to the embodiment, the module housing 240 may comprise an extension 245. The extension 245 may extend from the body 243 toward the board 210. The extension 245 may extend from the body 243 in a direction perpendicular to the first surface of the board 210. For example, the extension 245 may be disposed around the board 210. The board 210 may be disposed in a space surrounded by the extension 245. Also, the extension 245 may be coupled to the board 210. An adhesive layer may be further disposed between the extension 245 and the board 210.

According to the embodiment, a distance l from the beam emitting surface of the semiconductor device 130 to the first opening 153 of the module housing 140 may be several tens of micrometers to several hundreds of micrometers. In other words, the distance l from the beam emitting surface of the light emitting aperture 130a to the first opening 153 of the module housing 140 may be several tens of micrometers to several hundreds of micrometers.

The optical transmission apparatus 900 according to the embodiment may comprise an optical cable 800 coupled to the through hole 251 as shown in FIG. 7. For example, a core 810 of the optical cable 800 may be disposed in alignment with the first opening 253. The core 810 of the optical cable 800 may be coupled and inserted through the through hole 251 to a position on which the protrusion 242 defining the first opening 253 is provided. A beam incident surface of the core 810 may be arranged at the position of the protrusion 242 that provides the first opening 253.

For example, the protrusion 242 may be protruded from a side wall of the through hole 251 toward a central axis of the through hole 251. The protrusion 242 may be disposed between the optical cable 800 and the semiconductor device 230.

The beam incident surface of the core 810 may be disposed parallel to the beam emitting surface of the semiconductor device 230. The beam incident surface of the core 810 may be disposed parallel to the beam emitting surface of the light emitting aperture 230a. The distance l from the beam emitting surface of the semiconductor device 230 to the beam incident surface of the core 810 may be several tens of micrometers to several hundreds of micrometers. In other words, the distance l from the beam emitting surface of the light emitting aperture 230a to the beam incident surface of the core 810 may be several tens of micrometers to several hundreds of micrometers.

According to the embodiment, since the beam incident surface of the core 810 and the beam emitting surface of the light emitting aperture 230a are arranged in parallel to each other, an additional optical means such as a reflecting mirror or a prism for reflecting the beam emitted from the light emitting aperture 230a toward in a direction in which the core 810 is positioned is not needed.

In addition, according to the optical transmission apparatus 900 of the embodiment, since the distance l from the beam emitting surface of the light emitting aperture 130a to the beam incident surface of the core 810 is provided with a short distance of several tens of micrometers to several hundreds of micrometers so that all of the beam emitted from the light emitting aperture 230a can be incident on the beam incident surface of the core 810, an additional optical means such as a lens for focusing beam to the core 810 is not needed.

The distance l from the beam emitting surface of the semiconductor device 230 to the beam incident surface of the core 810 can be determined by a diameter a of the beam emitting surface of the light emitting aperture 230a, a divergence angle θ of the beam emitted from the light emitting aperture 230a, and a diameter b of the core 810 of the optical cable 800 that receives the beam emitted from the semiconductor device 230 and is disposed in the through hole 251.

The distance l from the beam emitting surface of the semiconductor device 230 to the beam incident surface of the core 810 can be set such that the maximum distance may be limited so that all of the beam emitted from the light emitting aperture 230a is incident on the core 810 of the optical cable 800.

That is, as described above with reference to FIG. 6 and [Equation 1], when a change in the diameter a of the light emitting aperture 230a, a change in the diameter b of the core 810, and a change in the divergence angle θ of the light emitting aperture 230a are considered, the maximum distance x for allowing all of the beam emitted from the light emitting aperture 230a to be incident on the core 810 may have a value of approximately 84 micrometers to 710 micrometers. Therefore, in the optical transmission apparatus 900 according to the embodiment, the distance l from the beam emitting surface of the light emitting aperture 230a to the beam incident surface of the core 810 can be set smaller than the maximum distance x so that all of the beam emitted from the light emitting aperture 230a can be incident on the core 810.

Meanwhile, if the diameter a of the light emitting aperture 230a is set to 10 micrometers, the diameter b of the core 810 is set to 60 micrometers, and the divergence angle of the light emitting aperture 230a is set in a range of 15 degrees to 25 degrees, the maximum distance x for allowing all of the beam emitted from the light emitting aperture 230a to be incident on the core 810 can be calculated to have a value in a range of 142 micrometers to 190 micrometers.

As described above, the optical transmission apparatus 900 according to the embodiment can control a mechanical alignment error within a few micrometers between the board 210, the submount 220, the semiconductor device 230, and the module housing 240. That is, in the optical transmission apparatus 900 according to the embodiment, the alignment error between the central axis of the through hole 251 provided in the module housing 240 and the central axis of the beam emitting surface of the semiconductor device 230 can be controlled within several micrometers. Therefore, the alignment error between the central axis of the core 810 disposed in the through hole 251 and the central axis of the beam emitting surface of the light emitting aperture 230a can be controlled within a few micrometers. The distance l from the beam emitting surface of the semiconductor device 230 to the beam incident surface of the core 810 is controlled to be a distance of several tens of micrometers to several hundreds of micrometers, so that the beam emitted from the semiconductor device 230 can be provided without loss to the beam incident surface of the core 810.

Therefore, according to the optical transmission apparatus 900 of the embodiment, the optical alignment between the semiconductor device 230 and the core 810 of the optical cable 800 can be performed only by coupling the optical cable 800 to the through hole 251. That is, the optical transmission module 900 according to the embodiment can provide a kind of self-alignment effect by coupling between the optical transmission module 200 and the core 810 of the optical cable 800.

In the case of a conventional optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 900 of the embodiment, the optical alignment between the semiconductor device 230 that emits the beam and the core 810 of the optical cable 800 can be completed by simply coupling the optical cable 800 to the optical transmission module 200.

Accordingly, the optical transmission apparatus 900 according to the embodiment is advantageous in that the optical transmission apparatus can be provided with a small size, easily provide optical alignment, reduce manufacturing cost, and improve productivity.

Meanwhile, FIG. 8 is a view showing another example of an optical transmission module according to an embodiment and an optical transmission apparatus including the same. Referring to FIG. 8, in describing the optical transmission module and the optical transmission apparatus according to the embodiment, description overlapping with those described with reference to FIGS. 1 to 7 may be omitted.

The optical transmission apparatus 900 according to the embodiment may comprise an optical transmission module 300 and an optical cable 800 as shown in FIG. 8. The optical cable 800 may be coupled to the optical transmission module 300. The optical cable 800 may be coupled to the optical transmission module 300 to receive a beam emitted from the optical transmission module 300. For example, the optical cable 800 may comprise a core 810 and a cladding 820.

The optical transmission module 300 according to the embodiment may comprise a board 310, a submount 320, a semiconductor device 330, and a module housing 340, as shown in FIG. 8. The module housing 340 may comprise a coupling unit 341, a body 343, and an extension 345.

The coupling unit 341 may comprise a first coupling unit 341a, a second coupling unit 341b, and a protrusion 342. The coupling unit 341 may comprise the first coupling unit 341a that provides a first opening 353 and the second coupling unit 341b that is connected to the first coupling unit 341a and provides a second opening 355.

The coupling unit 341 may comprise a through hole 351. The through hole 351 may be formed in the coupling unit 341 to connect the first opening 353 and the second opening 355. The through hole 351 may comprise a first through hole 351a and a second through hole 351b. The through hole 351 may comprise the first through hole 351a formed in the first coupling unit 341a and the second through hole 351b formed in the second coupling unit 341b.

For example, a diameter of the first through hole 351a may be formed to be reduced from the first opening 353 toward a region 341f where the first and second coupling units 341a and 341b are in contact with each other. The protrusion 342 may be disposed on the region 341f where the first coupling unit 341a and the second coupling unit 341b are in contact with each other.

The second through hole 351b may be formed to have the same diameter from the region 341f where the first coupling unit 351a and the second coupling unit 351b are in contact with each other to the second opening 355. That is, the second through hole 351b may be formed to have the same diameter from the protrusion 342 to the second opening 355. In the region 341f where the first coupling unit 341a and the second coupling unit 341b are in contact with each other, the diameter of the first through hole 351a may be formed to be smaller than the diameter of the second through hole 351b. The first coupling unit 341a may protrude toward the center of the through hole 351 in the region 341f where the first coupling unit 341a and the second coupling unit 341b are in contact with each other. The protrusion 342 may be disposed to protrude toward the center of the first through hole 351a in the region 341f where the first coupling unit 341a and the second coupling unit 341b are in contact with each other.

The position where the optical cable 800 is disposed in the coupling unit 341 can be easily determined by the protrusion 342. For example, the position of insertion of the optical cable 800 can be determined by the protrusion 342. According to the embodiment, when the optical cable 800 is coupled to the optical transmission module 300, since the optical cable 800 is configured to be inserted until it is blocked by the protrusion 342 through the second through hole 351b, the coupling position of the optical cable 800 can be clearly determined. Thus, the distance from the beam emitting surface of the semiconductor device 330 to the beam incident surface of the core 810 can be clearly determined.

As an example, the submount 320 may be disposed on the board 310. The submount 320 may be disposed on a first surface of the board 310. The semiconductor device 330 may be disposed on the submount 320. The semiconductor device 330 may be disposed on a first surface of the submount 320. For example, the first surface of the submount 320 and the first surface of the board 310 may be disposed parallel to each other.

According to the embodiment, the semiconductor device 330 may be electrically connected to the submount 320. The optical transmission module 300 shown in FIG. 8 is an example in which the semiconductor device 330 is electrically coupled to the submount 320 by a flip chip bonding method. The submount 320 may be electrically connected to the board 310.

The submount 320 may comprise a circuit electrically connected to the semiconductor device 330. In addition, the submount 320 may comprise a circuit electrically connected to the board 310. The submount 320 may be formed in the form of a wafer and may be separated for application to individual devices through a cutting process such as dicing.

For example, after the semiconductor device 330 is coupled to a large submount in the form of a wafer, it may be separated into individual submounts 320 through a cutting process. At this time, a process error regarding the size of the submount 320 due to cutting of the submount 320 can be controlled within a few micrometers. For example, the process error regarding the size of the submount 320 by dicing cut on the submount 320 may be controlled at 2 micrometers to 3 micrometers. In addition, a difference in distance between the cutting line set for cutting the submount 320 and the cutting line actually cut can be controlled at 2 micrometers to 3 micrometers.

The board 310 may comprise a circuit that provides an electrical signal to the submount 320. The board 310 may provide an external signal to the submount 320. As described above, the driving of the semiconductor device 330 can be controlled by electrical connection between the board 310, the submount 320, and the semiconductor device 330. For example, the board 310 may be formed of a printed circuit board. The board 310 may comprise at least one of a rigid printed circuit board (Rigid PCB) and a flexible printed circuit board (FPCB).

The plurality of semiconductor devices 330 may be coupled to the submount 320 by, for example, a flip chip bonding method. According to such a flip chip bonding method, the process error can be controlled within a few micrometers. For example, according to the embodiment, the coupling process error between the semiconductor device 330 and the submount 320 can be managed within 5 micrometers.

The optical transmission module 300 according to the embodiment may comprise a module housing 340, as shown in FIG. 8. The module housing 340 may comprise a coupling unit 341 and a body 343. The coupling unit 341 may comprise a first coupling unit 341a and a second coupling unit 341b. For example, the coupling unit 341 and the body 343 may be integrally formed as one body.

The coupling unit 341 may be spaced apart from the semiconductor device 320. For example, the coupling unit 341 may be disposed apart from an upper surface of the semiconductor device 320. An inner surface of the coupling unit 341 may be spaced apart from the light emitting aperture 330a of the semiconductor device 320.

The coupling unit 341 may be disposed to face a first surface of the submount 320. The inner surface of the coupling unit 341 may be disposed to face the upper surface of the submount 320. The inner surface of the coupling unit 341 may be disposed to face the upper surface of the semiconductor device 330. The inner surface of the coupling unit 341 may be disposed parallel to the first surface of the submount 320 on which the semiconductor device 330 is disposed.

The body 343 may extend from the coupling unit 341 toward the first surface of the board 310. The body 343 may be disposed around the submount 320. The body 343 may be disposed around the semiconductor device 330. The body 343 may provide a cavity C. The submount 320 may be disposed in the cavity C. The submount 320 may be disposed in the cavity C and coupled to the body 343. The semiconductor device 330 may be disposed in the cavity C. The semiconductor device 330 may be spaced apart from the inner surface of the body 343.

The body 343 may be coupled to the board 310. The body 343 may be disposed on a first surface of the board 310. A surface of the body 343 may be disposed on the first surface of the board 310 on which the submount 320 is disposed. For example, a first adhesive layer 360 may be disposed between the body 343 and the board 310. The first adhesive layer 360 may couple the board 310 and the body 343.

Meanwhile, the body 343 may be coupled to the submount 320 and the board 310. The submount 320 may comprise the first surface on which the semiconductor device 330 is disposed. The submount 320 may comprise a second surface extending from the first surface toward the board 310. The body 343 may be coupled to the submount 320. The body 343 may be coupled to the second surface of the submount 320. For example, the body 343 and the submount 320 may be physically coupled. Also, the body 343 and the submount 320 may be coupled by an adhesive layer disposed therebetween.

According to the embodiment, the coupling unit 341 may comprise a protrusion 342, a first through hole 351a, a second through hole 351b, a first opening 353, and a second opening 355. The first through hole 351a may be formed through the first coupling unit 341a and the second through hole 351b may be formed through the second coupling unit 341b. The coupling unit 341 may comprise a plurality of through holes 351.

The first opening 353 may be disposed to face and arranged in alignment with the beam emitting surface of the semiconductor device 330. The first opening 353 may be disposed to face and arranged in alignment with the beam emitting surface of the light emitting aperture 330a. For example, the first opening 353 may be formed to have a diameter larger than a diameter of the beam emitting surface of the semiconductor device 330. The first opening 353 may be formed to have the diameter larger than a diameter of the beam emitting surface of the light emitting aperture 330a.

Meanwhile, the diameter of the first opening 353 may be larger than the size of the semiconductor device 330. If so provided, a portion of the semiconductor device 330 may be disposed in the first opening 353. Thus, a distance from the semiconductor device 330 to the beam incident surface of the core 810 can be reduced.

The optical transmission module 300 according to the embodiment may comprise a plurality of semiconductor devices 330 and the coupling unit 341 may comprise a plurality of through holes 351 corresponding to the plurality of semiconductor devices 330.

According to the embodiment, the module housing 340 may comprise an extension 345. The extension 345 may extend from the body 343 toward the board 310. The extension 345 may extend from the body 343 in a direction perpendicular to the first surface of the board 310. For example, the extension 345 may be disposed around the board 310. The board 310 may be disposed in a space surrounded by the extension 345. Also, the extension 345 may be coupled to the board 310. An adhesive layer may be further disposed between the extension 145 and the board 110.

The optical transmission apparatus 900 according to the embodiment may comprise the optical cable 800 coupled to the through hole 351 as shown in FIG. 8. For example, the core 810 of the optical cable 800 may be coupled to the second through hole 351b. The core 810 of the optical cable 800 may be coupled and inserted through the second through hole 351b to a position on which the protrusion 342 defining the first through hole 351a is provided. A beam incident surface of the core 810 may be arranged at the position of the protrusion 342 that provides the first through hole 351a.

The beam incident surface of the core 810 may be disposed parallel to the beam emitting surface of the semiconductor device 330. The beam incident surface of the core 810 may be disposed parallel to the beam emitting surface of the light emitting aperture 330a. The distance l from the beam emitting surface of the semiconductor device 330 to the beam incident surface of the core 810 may be several tens of micrometers to several hundreds of micrometers. In other words, the distance l from the beam emitting surface of the light emitting aperture 330a to the beam incident surface of the core 810 may be several tens of micrometers to several hundreds of micrometers.

According to the embodiment, since the beam incident surface of the core 810 and the beam emitting surface of the light emitting aperture 330a are arranged in parallel to each other, an additional optical means such as a reflecting mirror or a prism for reflecting the beam emitted from the light emitting aperture 330a toward in a direction in which the core 810 is positioned is not needed.

In addition, according to the optical transmission apparatus 900 of the embodiment, since the distance l from the beam emitting surface of the light emitting aperture 330a to the beam incident surface of the core 810 is provided with a short distance of several tens of micrometers to several hundreds of micrometers so that all of the beam emitted from the light emitting aperture 330a can be incident on the beam incident surface of the core 810, an additional optical means such as a lens for focusing beam to the core 810 is not needed.

The distance l from the beam emitting surface of the semiconductor device 330 to the beam incident surface of the core 810 can be determined by a diameter a of the beam emitting surface of the light emitting aperture 330a, a divergence angle θ of the beam emitted from the light emitting aperture 330a, a diameter b of the core 810 of the optical cable 800 that receives the beam emitted from the semiconductor device 330 and is disposed in the through hole 351.

The distance l from the beam emitting surface of the semiconductor device 330 to the beam incident surface of the core 810 can be set such that the maximum distance may be limited so that all of the beam emitted from the light emitting aperture 330a is incident on the core 810 of the optical cable 800.

That is, as described above with reference to FIG. 6 and [Equation 1], when a change in the diameter a of the light emitting aperture 330a, a change in the diameter b of the core 810, and a change in the divergence angle θ of the light emitting aperture 330a are considered, the maximum distance x for allowing all of the beam emitted from the light emitting aperture 330a to be incident on the core 810 may have a value of approximately 84 micrometers to 710 micrometer. Therefore, in the optical transmission apparatus 900 according to the embodiment, the distance l from the beam emitting surface of the light emitting aperture 330a to the beam incident surface of the core 810 can be set smaller than the maximum distance x so that all of the beam emitted from the light emitting aperture 330a can be incident on the core 810.

Meanwhile, if the diameter a of the light emitting aperture 330a is set to 10 micrometers, the diameter b of the core 810 is set to 60 micrometers, and the divergence angle of the light emitting aperture 330a is set in a range of 15 degrees to 25 degrees, the maximum distance x for allowing all of the beam emitted from the light emitting aperture 330a to be incident on the core 810 can be calculated to have a value in a range of 142 micrometers to 190 micrometers.

As described above, the optical transmission apparatus 900 according to the embodiment can control a mechanical alignment error within a few micrometers between the board 310, the submount 320, the semiconductor device 330, and the module housing 340. That is, in the optical transmission apparatus 900 according to the embodiment, the alignment error between the central axis of the through hole 351 provided in the module housing 340 and the central axis of the beam emitting surface of the semiconductor device 330 can be controlled within several micrometers. Accordingly, the alignment error between the central axis of the core 810 provided in the through hole 351 and the central axis of the beam emitting surface of the light emitting aperture 330a can be controlled within a few micrometers. The distance l from the beam emitting surface of the semiconductor device 330 to the beam incident surface of the core 810 is controlled to be a distance of several tens of micrometers to several hundreds of micrometers, so that the beam emitted from the semiconductor device 330 can be provided without loss to the beam incident surface of the core 810.

Therefore, according to the optical transmission apparatus 900 of the embodiment, the optical alignment between the semiconductor device 330 and the core 810 of the optical cable 800 can be performed only by coupling the optical cable 800 to the through hole 351. That is, the optical transmission module 900 according to the embodiment can provide a kind of self-alignment effect by coupling between the optical transmission module 300 and the core 810 of the optical cable 800.

In the case of a conventional optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 900 of the embodiment, the optical alignment between the semiconductor device 330 that emits the beam and the core 810 of the optical cable 800 can be completed by simply coupling the optical cable 800 to the optical transmission module 300.

Accordingly, the optical transmission apparatus 900 according to the embodiment is advantageous in that the optical transmission apparatus can be provided with a small size, easily provide optical alignment, reduce manufacturing cost, and improve productivity.

Meanwhile, FIG. 9 is a view showing another example of an optical transmission module according to an embodiment and an optical transmission apparatus including the same. Referring to FIG. 9, in describing the optical transmission module and the optical transmission apparatus according to the embodiment, description overlapping with those described with reference to FIGS. 1 to 8 may be omitted.

The optical transmission apparatus 900 according to the embodiment may comprise an optical transmission module 400 and an optical cable 800 as shown in FIG. 9. The optical cable 800 may be coupled to the optical transmission module 400. The optical cable 800 may be coupled to the optical transmission module 400 to receive a beam emitted from the optical transmission module 400. For example, the optical cable 800 may comprise a core 810 and a cladding 820.

The optical transmission module 400 according to the embodiment may comprise a board 410, a submount 420, a semiconductor device 430, and a module housing 440, as shown in FIG. 9. The module housing 440 may comprise a coupling unit 441, a body 443, and an extension 445.

The coupling unit 441 may comprise a first coupling unit 441a, a second coupling unit 441b, and a protrusion 442. The coupling unit 441 may comprise the first coupling unit 441a that provides a first opening 453 and the second coupling unit 441b that is connected to the first coupling unit 441a and provides a second opening 455.

The coupling unit 441 may comprise a through hole 451. The through hole 451 may be formed in the coupling unit 441 to connect the first opening 453 and the second opening 455. The through hole 451 may comprise a first through hole 451a and a second through hole 451b. The through hole 451 may comprise the first through hole 451a formed in the first coupling unit 441a and the second through hole 451b formed in the second coupling unit 441b.

For example, a diameter of the first through hole 451a may be formed to be reduced from the first opening 453 toward a region 441f where the first coupling unit 441a and the second coupling unit 441b are in contact with each other. The protrusion 442 may be disposed on the region 441f where the first coupling unit 441a and the second coupling unit 441b are in contact with each other.

The second through hole 451b may be formed to have the same diameter from the region 441f where the first and second coupling units 451a and 451b are in contact with each other to the second opening 455. That is, the second through hole 451b may be formed to have the same diameter from the protrusion 442 to the second opening 455. In the region 441f where the first coupling unit 441a and the second coupling unit 441b are in contact with each other, the diameter of the first through hole 451a may be formed to be smaller than the diameter of the second through hole 451b. The first coupling unit 441a may protrude toward the center of the through hole 451 in the region 441f where the first coupling unit 441a and the second coupling unit 441b are in contact with each other. The protrusion 442 may be disposed to protrude toward the center of the first through hole 451a in the region 441f where the first coupling unit 441a and the second coupling unit 441b are in contact with each other.

The position where the optical cable 800 is coupled to the coupling unit 441 can be easily determined by the protrusion 442. For example, the position of insertion of the optical cable 800 can be determined by the protrusion 442. According to the embodiment, when the optical cable 800 is coupled to the optical transmission module 400, since the optical cable 800 is configured to be inserted until it is blocked by the protrusion 442 through the second through hole 451b, the coupling position of the optical cable 800 can be clearly determined. Thus, the distance from the beam emitting surface of the semiconductor device 430 to the beam incident surface of the core 810 can be clearly determined.

As an example, the submount 420 may be disposed on the board 410. The submount 420 may be disposed on a first surface of the board 410. The semiconductor device 430 may be disposed on the submount 420. The semiconductor device 430 may be disposed on a first surface of the submount 420. For example, the first surface of the submount 420 and the first surface of the board 410 may be disposed parallel to each other.

According to the embodiment, the semiconductor device 430 may be electrically connected to the submount 420. The optical transmission module 400 shown in FIG. 9 is an example in which the semiconductor device 430 is electrically coupled to the submount 420 by a flip chip bonding method. The submount 420 may be electrically connected to the board 410.

The submount 420 may comprise a circuit electrically connected to the semiconductor device 430. In addition, the submount 420 may comprise a circuit electrically connected to the board 410.

The board 410 may comprise a circuit that provides an electrical signal to the submount 420. The board 410 may provide an external signal to the submount 420. As described above, the driving of the semiconductor device 430 can be controlled by electrical connection between the board 410, the submount 420, and the semiconductor device 430. For example, the board 410 may be formed of a printed circuit board. The board 410 may comprise at least one of a rigid printed circuit board (Rigid PCB) and a flexible printed circuit board (FPCB).

The plurality of semiconductor devices 430 may be disposed on the submount 420, for example, by a flip chip bonding method. According to such a flip chip bonding method, the process error can be controlled within a few micrometers. For example, according to the embodiment, the coupling process error between the semiconductor device 430 and the submount 420 can be managed within 5 micrometers.

The optical transmission module 400 according to the embodiment may comprise a module housing 440, as shown in FIG. 9. The module housing 440 may comprise a coupling unit 441 and a body 443. The coupling unit 441 may comprise a first coupling unit 441a and a second coupling unit 441b. For example, the coupling unit 441 and the body 443 may be integrally formed as one body.

The coupling unit 441 may be spaced apart from the semiconductor device 420. For example, the coupling unit 441 may be disposed apart from an upper surface of the semiconductor device 420. An inner surface of the coupling unit 441 may be spaced apart from the light emitting aperture 430a of the semiconductor device 420.

The coupling unit 441 may be disposed to face a first surface of the submount 420. The inner surface of the coupling unit 441 may be disposed to face the upper surface of the submount 420. The inner surface of the coupling unit 441 may be disposed to face the upper surface of the semiconductor device 430. The inner surface of the coupling unit 441 may be disposed parallel to the first surface of the submount 420 on which the semiconductor device 430 is disposed.

The body 443 may extend from the coupling unit 441 toward the first surface of the board 410. The body 443 may be disposed around the submount 420. The body 443 may be disposed around the semiconductor device 430. The body 443 may provide a cavity C. The submount 420 may be disposed in the cavity C. The submount 420 may be disposed in the cavity C and coupled to the body 443. The semiconductor device 430 may be disposed in the cavity C. The semiconductor device 430 may be spaced apart from the inner surface of the body 443.

The body 443 may be coupled to the board 410. The body 443 may be disposed on the first surface of the board 410. A surface of the body 443 may be disposed on the first surface of the board 410 on which the submount 420 is disposed. For example, a first adhesive layer 460 may be disposed between the body 443 and the board 410. The first adhesive layer 460 may couple the board 410 and the body 443.

For example, the first adhesive layer 460 may be provided as an ultraviolet curable adhesive layer or a thermosetting adhesive layer. When the first adhesive layer 460 is provided as a thermosetting adhesive layer, after the first adhesive layer 460 is disposed between the body 443 and the board 410, the body 443 and the board 410 can be stably coupled by heat treatment and squeezing.

At this time, when pressure is applied in the bonding process, it is necessary to discharge the air in the cavity C provided and surrounded by the body (443) to the outside. Accordingly, according to the embodiment, a third through hole 470 may be provided in the body 443. Through the third through hole 470, the inner air can be discharged to the outside in the bonding process, and it is possible to prevent the objects to be coupled from occurring the misalignment due to tilted with respect to each other.

For example, the third through hole 470 may be formed in the body 443. Accordingly, as shown in a region Q of FIG. 9, a step may be formed in a region where the body 443 providing the third through hole 470 and the coupling unit 441 are in contact with each other.

Meanwhile, the body 443 may be coupled to the submount 420 and the board 410. The submount 420 may comprise a first surface on which the semiconductor device 430 is disposed. The submount 420 may comprise a second surface extending from the first surface toward the board 410. The body 443 may be coupled to the submount 420. The body 443 may be coupled to the second surface of the submount 420. For example, the body 443 and the submount 420 may be physically coupled. Also, the body 443 and the submount 420 may be coupled by an adhesive layer disposed therebetween.

According to the embodiment, the coupling unit 441 may comprise a protrusion 442, a first through hole 451a, a second through hole 451b, a first opening 453, and a second opening 455. The first through hole 451a may be formed through the first coupling unit 441a and the second through hole 451b may be formed through the second coupling unit 441b. The coupling unit 441 may comprise a plurality of through holes 451.

The first opening 453 may be disposed to face and arranged in alignment with the beam emitting surface of the semiconductor device 430. The first opening 453 may be disposed to face and arranged in alignment with the beam emitting surface of the light emitting aperture 430a. For example, the first opening 453 may be formed to have a diameter larder than a diameter of the beam emitting surface of the semiconductor device 430. The first opening 453 may have a diameter larger than a diameter of the beam emitting surface of the light emitting aperture 430a.

Meanwhile, the diameter of the first opening 453 may be larger than the size of the semiconductor device 430. In this case, a part of the semiconductor device 430 may be disposed in the first opening 453. Accordingly, the distance from the semiconductor device 430 to the beam incident surface of the core 810 can be reduced.

The optical transmission module 400 according to the embodiment may comprise a plurality of semiconductor devices 430 and the coupling unit 441 may comprise a plurality of through holes 451 corresponding to the plurality of semiconductor devices 430.

According to the embodiment, the module housing 440 may comprise an extension 445. The extension 445 may extend from the body 443 toward the board 410. The extension 445 may extend from the body 443 in a direction perpendicular to the first surface of the board 410. For example, the extension 445 may be disposed around the board 410. The board 410 may be disposed in a space surrounded by the extension 445. Also, the extension 445 may be coupled to the board 410. An adhesive layer may further be disposed between the extension part 445 and the board 410.

The optical transmission apparatus 900 according to the embodiment may comprise the optical cable 800 coupled to the through hole 451 as shown in FIG. 9. For example, the core 810 of the optical cable 800 may be coupled to the second through hole 451b. The core 810 of the optical cable 800 may be coupled and inserted through the second through hole 451b to a position on which the protrusion 442 defining the first through hole 451a is provided. A beam incident surface of the core 810 may be arranged at the position of the protrusion 442 that provides the first through hole 451a.

The beam incident surface of the core 810 may be disposed parallel to the beam emitting surface of the semiconductor device 430. The beam incident surface of the core 810 may be disposed parallel to the beam emitting surface of the light emitting aperture 430a. The distance l from the beam emitting surface of the semiconductor device 430 to the beam incident surface of the core 810 may be several tens of micrometers to several hundreds of micrometers. In other words, the distance l from the beam emitting surface of the light emitting aperture 430a to the beam incident surface of the core 810 may be several tens of micrometers to several hundreds of micrometers.

According to the optical transmission apparatus 900 of the embodiment, since the beam incident surface of the core 810 and the beam emitting surface of the light emitting aperture 430a are arranged in parallel to each other, an additional optical means such as a reflecting mirror or a prism for reflecting the beam emitted from the light emitting aperture 430a toward in a direction in which the core 810 is positioned is not needed.

In addition, according to the optical transmission apparatus 900 of the embodiment, since the distance l from the beam emitting surface of the light emitting aperture 430a to the beam incident surface of the core 810 is provided with a short distance of several tens of micrometers to several hundreds of micrometers so that all of the beam emitted from the light emitting aperture 430a can be incident on the beam incident surface of the core 810, an additional optical means such as a lens for focusing beam to the core 810 is not needed.

The distance l from the beam emitting surface of the semiconductor device 430 to the beam incident surface of the core 810 can be determined by a diameter a of the beam emitting surface of the light emitting aperture 430a, a divergence angle θ of the beam emitted from the light emitting aperture 430a, and a diameter b of the core 810 of the optical cable 800 that receives the beam emitted from the semiconductor device 430 and is disposed in the through hole 451.

The distance l from the beam emitting surface of the semiconductor device 430 to the beam incident surface of the core 810 can be set such that the maximum distance may be limited so that all of the beam emitted from the light emitting aperture 430a is incident on the core 810 of the optical cable 800.

That is, as described above with reference to FIG. 6 and [Equation 1], when a change in the diameter a of the light emitting aperture 430a, a change in the diameter b of the core 810, and a change in the divergence angle θ of the light emitting aperture 430a are considered, the maximum distance x for allowing all of the beam emitted from the light emitting aperture 430a to be incident on the core 810 may have a value of approximately 84 micrometers to 710 micrometers. Therefore, in the optical transmission apparatus 900 according to the embodiment, the distance l from the beam emitting surface of the light emitting aperture 430a to the beam incident surface of the core 810 can be set smaller than the maximum distance x so that all of the beam emitted from the light emitting aperture 430a can be incident on the core 810.

Meanwhile, if the diameter a of the light emitting aperture 430a is set to 10 micrometers, the diameter b of the core 810 is set to 60 micrometers, and the divergence angle of the light emitting aperture 430a is set in a range of 15 degrees to 25 degrees. the maximum distance x for allowing all of the beam emitted from the light emitting aperture 430a to be incident on the core 810 can be calculated to have a value in a range of 142 micrometers to 190 micrometers.

As described above, the optical transmission apparatus 900 according to the embodiment can control a mechanical alignment error within a few micrometers between the board 410, the submount 420, the semiconductor device 430, and the module housing 440. That is, in the optical transmission apparatus 900 according to the embodiment, the alignment error between the central axis of the through hole 451 provided in the module housing 440 and the central axis of the beam emitting surface of the semiconductor device 430 can be controlled within several micrometers. Accordingly, the alignment error between the central axis of the core 810 disposed in the through hole 451 and the central axis of the beam emitting surface of the light emitting aperture 430a can be controlled within a few micrometers. The distance l from the beam emitting surface of the semiconductor device 430 to the beam incident surface of the core 810 is controlled to be a distance of several tens of micrometers to several hundreds of micrometers, so that the beam emitted from the semiconductor device 430 can be provided without loss to the beam incident surface of the core 810.

Therefore, according to the optical transmission apparatus 900 of the embodiment, the optical alignment between the semiconductor device 430 and the core 810 of the optical cable 800 can be performed only by coupling the optical cable 800 to the through hole 451. That is, the optical transmission module 900 according to the embodiment can provide a kind of self-alignment effect by coupling between the optical transmission module 400 and the core 810 of the optical cable 800.

In the case of a conventional optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 900 of the embodiment, the optical alignment between the semiconductor device 430 that emits the beam and the core 810 of the optical cable 800 can be completed by simply coupling the optical cable 800 to the optical transmission module 400.

Accordingly, the optical transmission apparatus 900 according to the embodiment is advantageous in that the optical transmission apparatus can be provided with a small size, easily provide optical alignment, reduce manufacturing cost, and improve productivity.

Meanwhile, FIG. 10 is a view showing another example of an optical transmission module according to an embodiment and an optical transmission apparatus including the same. Referring to FIG. 10, in describing the optical transmission module and the optical transmission apparatus according to an embodiment, description overlapping with those described with reference to FIGS. 1 to 9 may be omitted.

The optical transmission apparatus 900 according to the embodiment may comprise an optical transmission module 500 and an optical cable 800 as shown in FIG. 10. The optical cable 800 may be coupled to the optical transmission module 500. The optical cable 800 may be coupled to the optical transmission module 500 to receive a beam emitted from the optical transmission module 500. For example, the optical cable 800 may comprise a core 810 and a cladding 820.

The optical transmission module 500 according to the embodiment may comprise a board 510, a submount 520, a semiconductor device 530, and a module housing 540, as shown in FIG. 10. The module housing 540 may comprise a coupling unit 541, a body 543, and an extension 545.

The coupling unit 541 may comprise a first coupling unit 541*a*, a second coupling unit 541*b*, and a protrusion 542. The coupling unit 541 may comprise the first coupling unit 541*a* that provides a first opening 553 and the second coupling unit 541*b* that is connected to the first coupling unit 541*a* and provides a second opening 555.

The coupling unit 541 may comprise a through hole 551. The through hole 551 may be formed in the coupling unit 541 to connect the first opening 553 and the second opening 555. The through hole 551 may comprise a first through hole 551*a* and a second through hole 551*b*. The through hole 551 may comprise the first through hole 551*a* formed in the first coupling unit 541*a* and the second through hole 551*b* formed in the second coupling unit 541*b*.

For example, a diameter of the first through hole 551*a* may be formed to be reduced from the first opening 553 toward a region where the first and second coupling units 341*a* and 341*b* are in contact with each other. The protrusion 542 may be disposed on the region where the first coupling unit 541*a* and the second coupling unit 541*b* are in contact with each other.

The second through hole 551*b* may be formed to have the same diameter from the region where the first coupling unit 551*a* and the second coupling unit 551*b* are in contact with each other to the second opening 555. That is, the second through hole 551*b* may be formed to have the same diameter from the protrusion 542 to the second opening 555. In the region where the first coupling unit 541*a* and the second coupling unit 541*b* are in contact with each other, the diameter of the first through hole 551*a* may be formed to be smaller than the diameter of the second through hole 551*b*. The first coupling unit 541*a* may protrude toward the center of the through hole 551 in the region where the first coupling unit 541*a* and the second coupling unit 541*b* are in contact with each other. The protrusion 542 may be disposed to protrude toward the center of the first through hole 551*a* in the region where the first coupling unit 541*a* and the second coupling unit 541*b* are in contact with each other.

The position where the optical cable 800 is coupled to the coupling unit 541 can be easily determined by the protrusion 542. For example, the position of insertion of the optical cable 800 can be determined by the protrusion 542. According to the embodiment, when the optical cable 800 is coupled to the optical transmission module 500, since the optical cable 800 is configured to be inserted until it is blocked by the protrusion 542 through the second through hole 551*b*, the coupling position of the optical cable 800 can be clearly determined. Accordingly, the distance from the beam emitting surface of the semiconductor device 530 to the beam incident surface of the core 810 can be clearly determined.

As an example, the submount 520 may be disposed on the board 510. The submount 520 may be disposed on a first surface of the board 510. The semiconductor device 530 may be disposed on the submount 520. The semiconductor device 530 may be disposed on a first surface of the submount 520. For example, the first surface of the submount 520 and the first surface of the board 510 may be disposed parallel to each other.

According to the embodiment, the semiconductor device 530 may be electrically connected to the submount 520. The optical transmission module 500 shown in FIG. 10 is an example in which the semiconductor device 530 is electrically coupled to the submount 520 by a flip chip bonding method. The submount 520 may be electrically connected to the board 510.

The submount 520 may comprise a circuit electrically connected to the semiconductor device 530. In addition, the submount 520 may comprise a circuit electrically connected to the board 510.

The board 510 may comprise a circuit that provides an electrical signal to the submount 520. The board 510 may provide an external signal to the submount 520. As described above, the driving of the semiconductor device 530 can be controlled by the electrical connection between the board 510, the submount 520, and the semiconductor device 530. For example, the board 510 may be formed of a printed circuit board. The board 510 may comprise at least one of a rigid printed circuit board (Rigid PCB) and a flexible printed circuit board (FPCB).

The optical transmission module 500 according to the embodiment may further comprise a sub-board 580 and a support 590 as shown in FIG. 10. The module housing 540 may be coupled to the support 590. For example, the module housing 540 may be coupled to the support 590 through a second adhesive layer 563. The sub-board 580 may be electrically connected to the support 580. For example, the sub-board 580 may be formed of a printed circuit board and may be bonded to the support 580 by a bonding process using a solder 565 or the like. The sub-board 580 may be electrically connected to the board 510. For example, the sub-board 580 may be electrically connected to the board 580 via a flexible board 585. According to the embodiment, the board 510, the sub-board 580, and the support 590 may be provided as a rigid printed circuit board.

The plurality of semiconductor devices 530 may be disposed on the submount 520, for example, by a flip chip bonding method. According to such a flip chip bonding method, the process error can be controlled within a few micrometers. For example, according to the embodiment, the coupling process error between the semiconductor device 530 and the submount 520 can be managed within 5 micrometers.

The optical transmission module 500 according to the embodiment may comprise a module housing 540, as shown in FIG. 10. The module housing 540 may comprise a coupling unit 541 and a body 543. The coupling unit 541 may comprise a first coupling unit 541*a* and a second coupling unit 541*b*. For example, the coupling unit 541 and the body 543 may be integrally formed as one body.

The coupling unit 541 may be disposed apart from the semiconductor device 520. For example, the coupling unit 541 may be disposed apart from an upper surface of the semiconductor device 520. An inner surface of the coupling unit 541 may be spaced apart from the light emitting aperture 530a of the semiconductor device 520.

The coupling unit 541 may be disposed to face a first surface of the submount 520. The inner surface of the coupling unit 541 may be disposed to face the upper surface of the submount 520. The inner surface of the coupling unit 541 may be disposed to face the upper surface of the semiconductor device 530. The inner surface of the coupling unit 541 may be disposed parallel to the first surface of the submount 520 on which the semiconductor device 530 is disposed.

The body 543 may extend from the coupling unit 541 toward the first surface of the board 510. The body 543 may be disposed around the submount 520. The body 543 may be provided in the arrangement of the semiconductor device 530. The body 543 may provide a cavity C. The submount 520 may be disposed in the cavity C. The submount 520 may be disposed in the cavity C and coupled to the body 543. The semiconductor device 530 may be disposed in the cavity C. The semiconductor device 530 may be spaced apart from the inner surface of the body 543.

The body 543 may be coupled to the board 510. The body 543 may be disposed on a first surface of the board 510. A surface of the body 543 may be disposed on the first surface of the board 510 on which the submount 520 is disposed. For example, a first adhesive layer 560 may be disposed between the body 543 and the board 510. The first adhesive layer 560 may couple the board 510 and the body 543. For example, the first adhesive layer 460 may be provided as an ultraviolet curable adhesive layer or a thermosetting adhesive layer.

Meanwhile, the body 543 may be coupled to the submount 520 and the board 510. The submount 520 may comprise the first surface on which the semiconductor device 530 is disposed. The submount 520 may comprise a second surface extending from the first surface toward the board 510. The body 543 may be coupled to the submount 520. The body 543 may be coupled to the second surface of the submount 520. For example, the body 543 and the submount 520 may be physically coupled. Also, the body 543 and the submount 520 may be coupled by an adhesive layer disposed therebetween.

According to the embodiment, the coupling unit 541 may comprise a protrusion 542, a first through hole 551a, a second through hole 551b, a first opening 553, and a second opening 555. The first through hole 551a may be formed through the first coupling unit 541a and the second through hole 551b may be formed through the second coupling unit 541b. The coupling unit 541 may comprise a plurality of through holes 551.

The first opening 553 may be disposed to face and arranged in alignment with the beam emitting surface of the semiconductor device 530. The first opening 553 may be disposed to face and arranged in alignment with the beam emitting surface of the light emitting aperture 530a. For example, the first opening 553 may be formed to have a diameter larger than a diameter of the beam emitting surface of the semiconductor device 530. The first opening 553 may have the diameter larger than a diameter of the beam emitting surface of the light emitting aperture 530a.

Meanwhile, the diameter of the first opening 553 may be larger than the size of the semiconductor device 530. If so provided, a portion of the semiconductor device 530 may be disposed in the first opening 553. Accordingly, a distance from the semiconductor device 530 to the beam incident surface of the core 810 can be reduced.

The optical transmission module 500 according to the embodiment may comprise a plurality of semiconductor devices 530 and the coupling unit 541 may comprise a plurality of through holes 551 corresponding to the plurality of semiconductor devices 530.

The optical transmission apparatus 900 according to the embodiment may comprise the optical cable 800 coupled to the through hole 551 as shown in FIG. 10. For example, the core 810 of the optical cable 800 may be coupled to the second through hole 551b. The core 810 of the optical cable 800 may be coupled and inserted through the second through hole 551b to a position on which the protrusion 542 defining the first through hole 551a is provided. A beam incident surface of the core 810 may be arranged at the position of the protrusion 542 that provides the first through hole 551a.

The beam incident surface of the core 810 may be disposed parallel to the beam emitting surface of the semiconductor device 530. The beam incident surface of the core 810 may be disposed parallel to the beam emitting surface of the light emitting aperture 530a. The distance l from the beam emitting surface of the semiconductor device 530 to the beam incident surface of the core 810 may be several tens of micrometers to several hundreds of micrometers. In other words, the distance l from the beam emitting surface of the light emitting aperture 530a to the beam incident surface of the core 810 may be several tens of micrometers to several hundreds of micrometers.

According to the embodiment, since the beam incident surface of the core 810 and the beam emitting surface of the light emitting aperture 530a are arranged in parallel to each other, an additional optical means such as a reflecting mirror or a prism for reflecting the beam emitted from the light emitting aperture 530a toward in a direction in which the core 810 is positioned is not needed.

In addition, according to the optical transmission apparatus 900 of the embodiment, since the distance l from the beam emitting surface of the light emitting aperture 530a to the beam incident surface of the core 810 is provided with a short distance of several tens of micrometers to several hundreds of micrometers so that all of the beam emitted from the light emitting aperture 530a can be incident on the beam incident surface of the core 810, an additional optical means such as a lens for focusing beam to the core 810 is not needed.

The distance l from the beam emitting surface of the semiconductor device 530 to the beam incident surface of the core 810 can be determined by a diameter a of the beam emitting surface of the light emitting aperture 530a, a divergence angle θ of the beam emitted from the light emitting aperture 530a, a diameter b of the core 810 of the optical cable 800 that receives the beam emitted from the semiconductor device 530 and is disposed in the through hole 551.

The distance l from the beam emitting surface of the semiconductor device 530 to the beam incident surface of the core 810 can be set such that the maximum distance may be limited so that all of the beam emitted from the light emitting aperture 530a is incident on the core 810 of the optical cable 800.

That is, as described above with reference to FIG. 6 and [Equation 1], when a change in the diameter a of the light emitting aperture 530a, a change in the diameter b of the core 810, and a change in the divergence angle θ of the light emitting aperture 330a are considered, the maximum distance x for allowing all of the beam emitted from the light emitting aperture 530a to be incident on the core 810 may have a value of approximately 84 micrometers to 710 micrometers. Therefore, in the optical transmission apparatus 900 according to the embodiment, the distance l from the beam emitting surface of the light emitting aperture 530a to the beam incident surface of the core 810 can be set smaller than the maximum distance x, so that all of the beam emitted from the light emitting aperture 530a can be incident on the core 810.

Meanwhile, if the diameter a of the light emitting aperture 530a is set to 10 micrometers, the diameter b of the core 810 is set to 60 micrometers, and the divergence angle of the light emitting aperture 530a is set in a range of 15 degrees to 25 degrees, the maximum distance x for allowing all of the beam emitted from the light emitting aperture 530a to be incident on the core 810 can be calculated to have a value in a range of 142 micrometers to 190 micrometers.

As described above, the optical transmission apparatus 900 according to the embodiment can control a mechanical alignment error within a few micrometers between the board 510, the submount 520, the semiconductor device 530, and the module housing 540. That is, in the optical transmission apparatus 900 according to the embodiment, the alignment error between the central axis of the through hole 551 provided in the module housing 540 and the central axis of the beam emitting surface of the semiconductor device 530 can be controlled within several micrometers. Therefore, the alignment error between the central axis of the core 810 disposed in the through hole 551 and the central axis of the beam emitting surface of the light emitting aperture 530a can be controlled within a few micrometers. The distance l from the beam emitting surface of the semiconductor device 530 to the beam incident surface of the core 810 is controlled to be a distance of several tens of micrometers to several hundreds of micrometers, so that the beam emitted from the semiconductor device 530 can be provided without loss to the beam incident surface of the core 810.

Therefore, according to the optical transmission apparatus 900 of the embodiment, the optical alignment between the semiconductor device 530 and the core 810 of the optical cable 800 can be performed only by coupling the optical cable 800 to the through hole 551. That is, the optical transmission module 900 according to the embodiment can provide a kind of self-alignment effect by coupling between the optical transmission module 500 and the core 810 of the optical cable 800.

In the case of a conventional optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 900 of the embodiment, the optical alignment between the semiconductor device 530 that emits the beam and the core 810 of the optical cable 800 can be completed by simply coupling the optical cable 800 to the optical transmission module 500.

Accordingly, the optical transmission apparatus 900 according to the embodiment is advantageous in that the optical transmission apparatus can be provided with a small size, easily provide optical alignment, reduce manufacturing cost, and improve productivity.

Meanwhile, FIG. 11 is a view showing another example of an optical transmission module according to an embodiment and an optical transmission apparatus including the same. Referring to FIG. 11, in describing the optical transmission module and the optical transmission apparatus according to the embodiment, description overlapping with those described with reference to FIGS. 1 to 10 may be omitted.

The optical transmission apparatus 900 according to the embodiment may comprise an optical transmission module 600 and an optical cable 800 as shown in FIG. 11. The optical cable 800 may be coupled to the optical transmission module 600. The optical cable 800 may be coupled to the optical transmission module 600 to receive a beam emitted from the optical transmission module 600. For example, the optical cable 800 may comprise a core 810 and a cladding 820.

The optical transmission module 600 according to the embodiment may comprise a board 610, a submount 620, a semiconductor device 630, and a module housing 640, as shown in FIG. 11. The module housing 640 may comprise a coupling unit 641, a body 643, and an extension 645.

For example, the submount 620 may be disposed on the board 610. The semiconductor device 630 may be disposed on the submount 620. According to the embodiment, the semiconductor device 630 may be electrically connected to the submount 620. The submount 620 may be electrically connected to the board 610.

The submount 620 may comprise a circuit electrically connected to the semiconductor device 630. In addition, the submount 620 may comprise a circuit electrically connected to the board 610. The board 610 may comprise a circuit that provides an electrical signal to the submount 620. The board 610 may provide an external signal to the submount 620.

The plurality of semiconductor devices 630 may be coupled to the submount 620 by wire bonding, for example. The semiconductor device 630 may be disposed on the submount 620 by a die paste 635 and may be electrically connected to the submount 620 by wires 633a and 633b.

The body 643 may be coupled to the board 610. A surface of the body 643 may be disposed on a first surface of the board 610 on which the submount 620 is disposed. For example, a first adhesive layer 660 may be disposed between the body 643 and the board 610. The first adhesive layer 660 may couple the board 610 and the body 643.

According to the embodiment, the first openings 653 may be disposed to face and arranged in alignment with the beam emitting surface of the semiconductor device 630. The first opening 653 may be disposed to face and arranged in alignment with the beam emitting surface of the light emitting aperture 630a. For example, the first opening 653 may be formed to have a diameter larger than a diameter of the beam emitting surface of the semiconductor device 630. The first opening 653 may have the diameter larger than a diameter of the beam emitting surface of the light emitting aperture 630a.

The distance l from the beam emitting surface of the semiconductor device 630 to the first opening 653 of the module housing 640 may be several tens of micrometers to several hundreds of micrometers. In other words, the distance l from the beam emitting surface of the light emitting aperture 630a to the first opening 653 of the module housing 640 may be several tens of micrometers to several hundreds of micrometers.

The optical transmission apparatus 900 according to the embodiment may comprise the optical cable 800 coupled to the through hole 651 as shown in FIG. 11. For example, the core 810 of the optical cable 800 may be disposed and arranged in alignment with the first opening 653.

The beam incident surface of the core 810 may be disposed parallel to the beam emitting surface of the semiconductor device 630. The beam incident surface of the core 810 may be disposed parallel to the beam emitting surface of the light emitting aperture 630a. The distance l from the beam emitting surface of the semiconductor device 630 to the beam incident surface of the core 810 may be several tens of micrometers to several hundreds of micrometers. In other words, the distance l from the beam emitting surface of the light emitting aperture 630a to the beam incident surface of the core 810 may be several tens of micrometers to several hundreds of micrometers.

According to the optical transmission apparatus 99 of the embodiment, since the beam incident surface of the core 810 and the beam emitting surface of the light emitting aperture 630a are arranged in parallel to each other, an additional optical means such as a reflecting mirror or a prism for reflecting the beam emitted from the light emitting aperture 630a toward in a direction in which the core 810 is positioned is not needed.

In addition, according to the optical transmission apparatus 900 of the embodiment, since the distance l from the beam emitting surface of the light emitting aperture 630a to the beam incident surface of the core 810 is provided with a short distance of several tens of micrometers to several hundreds of micrometers so that all of the beam emitted from the light emitting aperture 630a can be incident on the beam incident surface of the core 810, an additional optical means such as a lens for focusing beam to the core 810 is not needed.

The distance l from the beam emitting surface of the semiconductor device 630 to the beam incident surface of the core 810 can be set such that the maximum distance may be limited so that all of the beam emitted from the light emitting aperture 630a is incident on the core 810 of the optical cable 800.

That is, as described above with reference to FIG. 6 and [Equation 1], when a change in the diameter a of the light emitting aperture 630a, a change in the diameter b of the core 810, and a change in the divergence angle θ of the light emitting aperture 430a are considered, the maximum distance x for allowing all of the beam emitted from the light emitting aperture 630a to be incident on the core 810 may have a value of approximately 84 micrometers to 710 micrometers. Therefore, in the optical transmission apparatus 900 according to the embodiment, the distance l from the beam emitting surface of the light emitting aperture 630a to the beam incident surface of the core 810 can be set smaller than the maximum distance x so that all of the beam emitted from the light emitting aperture 630a can be incident on the core 810.

Meanwhile, if the diameter a of the light emitting aperture 630a is set to 10 micrometers, the diameter b of the core 810 is set to 60 micrometers, and the divergence angle of the light emitting aperture 630a is set in a range of 15 degrees to 25 degrees, the maximum distance x for allowing all of the beam emitted from the light emitting aperture 630a to be incident on the core 810 can be calculated to have a value in a range of 142 micrometers to 190 micrometers.

As described above, the optical transmission apparatus 900 according to the embodiment can control a mechanical alignment error within a few micrometers between the board 610, the submount 620, the semiconductor device 630, and the module housing 640. That is, in the optical transmission apparatus 900 according to the embodiment, the alignment error between the central axis of the through hole 651 provided in the module housing 640 and the central axis of the beam emitting surface of the semiconductor device 630 can be controlled within several micrometers. Accordingly, the alignment error between the central axis of the core 810 disposed in the through hole 651 and the central axis of the beam emitting surface of the light emitting aperture 630a can be controlled within a few micrometers. The distance l from the beam emitting surface of the semiconductor device 630 to the beam incident surface of the core 810 is controlled to be a distance of several tens of micrometers to several hundreds of micrometers, so that the beam emitted from the semiconductor device 630 can be provided without loss to the beam incident surface of the core 810.

Therefore, according to the optical transmission apparatus 900 of the embodiment, the optical alignment between the semiconductor device 630 and the core 810 of the optical cable 800 can be performed only by coupling the optical cable 800 to the through hole 651. That is, the optical transmission module 900 according to the embodiment can provide a kind of self-alignment effect by coupling between the optical transmission module 600 and the core 810 of the optical cable 800.

In the case of a conventional optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 900 of the embodiment, the optical alignment between the semiconductor device 630 that emits the beam and the core 810 of the optical cable 800 can be completed by simply coupling the optical cable 800 to the optical transmission module 600.

Accordingly, the optical transmission apparatus 900 according to the embodiment is advantageous in that the optical transmission apparatus can be provided with a small size, easily provide optical alignment, reduce manufacturing cost, and improve productivity.

Meanwhile, FIG. 12 is a view showing another example of an optical transmission module according to an embodiment and an optical transmission apparatus including the same. The optical transmission module and the optical transmission apparatus according to the embodiment will be described with reference to FIG. 12, and description overlapping with those described with reference to FIGS. 1 to 11 may be omitted.

The optical transmission apparatus 900 according to the embodiment may comprise an optical transmission module 700 and an optical cable 800 as shown in FIG. 12. The optical cable 800 may be coupled to the optical transmission module 700. The optical cable 800 may be coupled to the optical transmission module 700 to receive a beam emitted from the optical transmission module 600. For example, the optical cable 800 may comprise a core 810 and a cladding 820.

The optical transmission module 700 according to the embodiment may comprise a board 710, a submount 720, a semiconductor device 730, and a module housing 740, as shown in FIG. 12. The module housing 740 may comprise a coupling unit 741, a body 743, and an extension 745.

For example, the submount 720 may be disposed on the board 710. The semiconductor device 730 may be disposed on the submount 720. According to the embodiment, the semiconductor device 730 may be electrically connected to the submount 720. The submount 720 may be electrically connected to the board 710.

The submount 720 may comprise a circuit electrically connected to the semiconductor device 730. In addition, the submount 720 may comprise a circuit electrically connected to the board 710. The board 710 may comprise a circuit that provides an electrical signal to the submount 720. The board 710 may provide an external signal to the submount 720.

The plurality of semiconductor devices 730 may be coupled to the submount 720 by, for example, a die bonding method and a wire bonding method. The semiconductor device 730 may be electrically connected to the submount 620 by a die paste 735 and may be electrically connected to the submount 720 by a wire 733a.

The body 743 may be coupled to the board 710. A surface of the body 743 may be disposed on a first side of the board 710 on which the submount 720 is disposed. For example, a first adhesive layer 760 may be disposed between the body 743 and the board 710. The first adhesive layer 760 may couple the board 710 and the body 743.

According to the embodiment, the first opening 753 may be disposed to face and arranged in alignment with the beam emitting surface of the semiconductor device 730. The first opening 753 may be disposed to face and arranged in alignment with the beam emitting surface of the light emitting aperture 730a. For example, the first opening 753 may be formed to have a diameter larger than a diameter of the beam emitting surface of the semiconductor device 730. The first opening 753 may be formed to have the diameter larger than a diameter of the beam emitting surface of the light emitting aperture 730a.

The distance l from the beam emitting surface of the semiconductor device 730 to the first opening 753 of the module housing 740 may be several tens of micrometers to several hundreds of micrometers. In other words, the distance l from the beam emitting surface of the light emitting aperture 730a to the first opening 753 of the module housing 740 may be several tens of micrometers to several hundreds of micrometers.

The optical transmission apparatus 900 according to the embodiment may comprise the optical cable 800 coupled to the through hole 751 as shown in FIG. 12. For example, the core 810 of the optical cable 800 may be disposed and aligned with the first opening 753.

The beam incident surface of the core 810 may be disposed parallel to the beam emitting surface of the semiconductor device 730. The beam incident surface of the core 810 may be disposed parallel to the beam emitting surface of the light emitting aperture 730a. The distance l from the beam emitting surface of the semiconductor device 730 to the beam incident surface of the core 810 may be several tens of micrometers to several hundreds of micrometers. In other words, the distance l from the beam emitting surface of the light emitting aperture 730a to the beam incident surface of the core 810 may be several tens of micrometers to several hundreds of micrometers.

According to the embodiment, since the beam incident surface of the core 810 and the beam emitting surface of the light emitting aperture 730a are arranged in parallel to each other, an additional optical means such as a reflecting mirror or a prism for reflecting the beam emitted from the light emitting aperture 730a toward in a direction in which the core 810 is positioned is not needed.

In addition, according to the optical transmission apparatus 900 of the embodiment, since the distance l from the beam emitting surface of the light emitting aperture 730a to the beam incident surface of the core 810 is provided with a short distance of several tens of micrometers to several hundreds of micrometers so that all of the beam emitted from the light emitting aperture 730a can be incident on the beam incident surface of the core 810, an additional optical means such as a lens for focusing beam to the core 810 is not needed.

The distance l from the beam emitting surface of the semiconductor device 730 to the beam incident surface of the core 810 can be set such that the maximum distance may be limited so that all of the beam emitted from the light emitting aperture 730a is incident on the core 810 of the optical cable 800.

That is, as described above with reference to FIG. 6 and [Equation 1], when a change in the diameter a of the light emitting aperture 730a, a change in the diameter b of the core 810, and a change in the divergence angle θ of the light emitting aperture 730a are considered, the maximum distance x for allowing all of the beam emitted from the light emitting aperture 730a to be incident on the core 810 may have a value of approximately 84 micrometers to 710 micrometers. Therefore, in the optical transmission apparatus 900 according to the embodiment, the distance l from the beam emitting surface of the light emitting aperture 730a to the beam incident surface of the core 810 can be set smaller than the maximum distance x, so that all of the beam emitted from the light emitting aperture 730a can be incident on the core 810.

Meanwhile, if the diameter a of the light emitting aperture 730a is set to 10 micrometers, the diameter b of the core 810 is set to 60 micrometers, and the divergence angle of the light emitting aperture 730a is set in a range of 15 degrees to 25 degrees, the maximum distance x for allowing all of the beam emitted from the light emitting aperture 730a to be incident on the core 810 can be calculated to have a value in a range of 142 micrometers to 190 micrometers.

As described above, the optical transmission apparatus 900 according to the embodiment can control a mechanical alignment error within a few micrometers between the board 710, the submount 720, the semiconductor device 730, and the module housing 740. That is, in the optical transmission apparatus 900 according to the embodiment, the alignment error between the central axis of the through hole 751 provided in the module housing 740 and the central axis of the beam emitting surface of the semiconductor device 730 can be controlled within several micrometers. Accordingly, the alignment error between the central axis of the core 810 disposed in the through hole 751 and the central axis of the beam emitting surface of the light emitting aperture 730a can be controlled within a few micrometers. The distance l from the beam emitting surface of the semiconductor device 730 to the beam incident surface of the core 810 is controlled to be a distance of several tens of micrometers to several hundreds of micrometers, so that the beam emitted from the semiconductor device 730 can be provided without loss to the beam incident surface of the core 810.

Therefore, according to the optical transmission apparatus 900 of the embodiment, the optical alignment between the semiconductor device 730 and the core 810 of the optical cable 800 can be performed only by coupling the optical cable 800 to the through hole 751. That is, the optical transmission module 900 according to the embodiment can provide a kind of self-alignment effect by coupling between the optical transmission module 700 and the core 810 of the optical cable 800.

In the case of a conventional optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 900 of the embodiment, the optical alignment between the semiconductor device 730 that emits the beam and the core 810 of the optical cable 800 can be completed by simply coupling the optical cable 800 to the optical transmission module 700.

Accordingly, the optical transmission apparatus 900 according to the embodiment is advantageous in that the optical transmission apparatus can be provided with a small size, easily provide optical alignment, reduce manufacturing cost, and improve productivity.

Meanwhile, the embodiments described above with reference to FIGS. 1 to 12 have been described as the optical transmission module comprises a semiconductor device providing a beam, so that the explanation has been developed from the standpoint of the optical transmission module and the optical transmission apparatus for providing an optical signal. However, the optical transmission module described above may be implemented to comprise a semiconductor device of a light receiving device rather than a light emitting device. That is, the semiconductor device can be realized as a light receiving device such as a photodiode, so that, according to an embodiment, an optical transmission module and an optical transmission apparatus for receiving an optical signal can be provided.

Next, another example of an optical transmission module according to an embodiment will be described, and descriptions overlapping with those described above may be omitted.

FIG. 13a is a cross-sectional view showing an optical transmission module 2200 according to an embodiment. The optical transmission module 2200 according to the embodiment may comprise a submount 2205, a semiconductor device 2100, and an optical cable 2250.

The submount 2205 may comprise an electrode portion 2230 (see FIG. 14b) on a first surface thereof. For example, the submount 2205 may comprise a first electrode portion 2231 and a second electrode portion 2232 on the first surface thereof, and may be electrically connected to the semiconductor device 2100.

The semiconductor device 2100 may be a semiconductor light emitting device. For example, the semiconductor device 2100 may be a surface emitting laser. For example, the semiconductor device 2100 may be one of a vertical cavity surface emitting laser (VCSEL), a horizontal resonator type laser (diffraction grating type), or a bent resonator type (curved waveguide type). Hereinafter, the case where the semiconductor device 2100 of the embodiment is a vertical cavity surface emitting laser (VCSEL) is described, but the embodiment is not limited thereto.

The semiconductor device 2100 may comprise at least one of a board 2105, a light emitting structure 2110, a first magnetic material layer 2131, and an electrode 2120. The electrode 2120 may comprise a first electrode 2121 and a second electrode 2122, electrically connected to the first electrode portion 2231 and the second electrode portion 2232 of the submount, respectively.

The optical cable 2250 may comprise a core 2251 and a cladding 2252, and may comprise a third magnetic material layer 2253 at an end of the cladding 2252. A first coupling layer 2220 may be provided between the optical cable 2250 and the submount 2205.

The semiconductor device 2100 may comprise a light emitting region LE that is an emitting region of induced emitted light from the light emitting structure 2110, and the emitted light may be emitted with a predetermined divergence angle θ and incident on a core of the optical cable 2250. Regarding a distance D between the light emitting area LE and the core of the optical cable, the working distance D can be controlled so that the size of the light emitting beam is equal to or less than the size of the core of the optical cable in order to obtain high optical coupling efficiency.

FIG. 13b is a conceptual view explaining self-alignment and self-attachment in an optical transmission module according to a first embodiment.

One of the technical problems of the embodiments is to provide a semiconductor device, an optical transmission module, and an optical assembly capable of self-alignment between an optical cable and a semiconductor light emitting device.

In addition, one of the technical problems of the embodiments is to provide a semiconductor device, an optical transmission module, and an optical assembly capable of self-alignment and self-attachment between an optical cable and a semiconductor light emitting device.

Referring to FIG. 13b, in the optical transmission module 2200 according to the embodiment, the optical cable 2250 can be self-aligned to the guide hole 2210 of the submount 2205 (see FIG. 14a) by the magnetic force M between the first magnetic material layer 2131 disposed on the semiconductor device 2100 and the third magnetic material layer 2131 disposed on the end of the optical cable 2250, so that the semiconductor device, the optical transmission module, and the optical assembly having a technical effect capable of self-alignment between the optical cable and the semiconductor light emitting device can be provided as shown in FIG. 13a.

According to the embodiment, the optical cable can be not only self-aligned by the magnetic force, but also self-attached by the magnetic force, so that the semiconductor device, the optical transmission module, and the optical assembly having a technical effect capable of self-alignment between the optical cable and the semiconductor light emitting device can be provided.

Hereinafter, a semiconductor device capable of self-alignment and self-attachment between an optical cable and a semiconductor light emitting device and an optical transmission module comprising the semiconductor device will be described in detail with reference to FIGS. 14a to 19b.

FIGS. 14a to 14d are views explaining a coupling of the submount 2205 and the semiconductor device 2100 in the optical transmission module according to the first embodiment.

Referring to FIG. 14a, the submount 2205 may comprise a guide hole 2210, and in a bottom surface of the submount 2205, first and second recesses R1 and R2 may be provided.

The submount 2205 may be formed of a material having a high heat dissipation efficiency so that heat generated from the semiconductor device 2100 can be dissipated effectively to maintain thermal and electrical characteristics. For example, the submount 2205 may be formed as a single layer or a multilayer including at least one or more materials such as Si, AlN, Cu, or BeO having excellent thermal conductivity, and the submount 2205 may be a material having excellent electrical conductivity or an insulator material.

FIG. 14a shows a case where the submount 2205 is made of a nonconductive material, however, when the submount is a conductor, an insulating film (not shown) can be interposed in order to prevent electrical short between the first electrode portion 2231 and the second electrode portion 2232. For example, when the submount 2205 is a conductor, an insulating film can be formed on the inner surfaces of the first and second recesses R 1 and R 2, thereby prevent electrical short between the first electrode portion 2231 and the second electrode portion 2232, but it is not limited thereto.

In the embodiment, the guide hole 2210 of the submount 2205 may comprise a first guide hole 2211 having a first width W1 and a second guide hole 2212 having a second width W2 greater than the first width W1. The first guide hole 2211 or the second guide hole 2212 may be formed through a wet etching or dry etching process with respect to the submount 2205.

The second guide hole 2212 is a region where the optical cable 2250 is configured to be inserted (see FIG. 13a), and the second width W2 may be equal to or greater than a width of the optical cable 2250. An adhesive material (not shown) may be interposed between the optical cable 2250 and the second guide hole 2212 when the second width W2 of the second guide hole 2212 is greater than the width of the optical cable 2250.

The first guide hole 2211 may be a path through which the light source emitted from the semiconductor device 2100 moves to the optical cable 2250, and the first width W1 of the first guide hole 2211 may be larger than the width of the core 2251 of the optical cable 2250.

In the embodiment, the first adhesive material layer 2220 may be provided under the second guide hole 2212 of the submount 2205 to add an additional coupling force in addition to the coupling force by the magnetic force so that it is possible to improve the coupling force between the optical cable 2250 and the submount 2205.

For example, the first adhesive material layer 2220 may be a pressure sensitive adhesive, a chemically reactive adhesive material, or a thermosetting adhesive.

For example, the first adhesive material layer 2220 may be a pressure sensitive adhesive, and when pressure is generated due to the self-attachment between the optical cable 2250 and the submount 2205 by the magnetic force, according to the pressure sensitive adhesive, a strong additional coupling force between the optical cable 2250 and the submount 2205 can be generated to strongly couple the optical cable 2250 to the submount 2205.

In the embodiment, the pressure sensitive adhesive can exhibit a high adhesive force value and can support a weight of several kilograms per contact area of 1 cm$^2$ even at a high temperature, therefore, in addition to the self-attachment between the optical cable 2250 and the submount 2205 by the magnetic force, a strong additional coupling force by the pressure sensitive adhesive can be generated between the optical cable 2250 and the submount 2205 so that the optical cable 2250 can be strongly coupled to the submount 2205 in a self-aligned state. The pressure sensitive adhesive may be a polymer. For example, the pressure sensitive adhesive may be an acrylate based polymer, but is not limited thereto.

Also, the first adhesive material layer 2220 may be an adhesive material through a chemical reaction. For example, the first adhesive material layer 2220 may comprise at least one of a polyester resin, a polyol, and an acrylic polymer.

Also, the first adhesive material layer 2220 may be a thermosetting adhesive. For example, the first adhesive material layer 2220 may be an ultraviolet (UV) light curable adhesive, and may comprise at least one of epoxy, urethane, or polyimide.

In the embodiment, the submount 2205 may comprise first and second recesses R 1 and R 2 on its bottom surface. For example, the first and second recesses R 1 and R 2 may be formed on a bottom surface of the submount 2205 through a wet or dry etching process, and as shown in FIG. 14b, in a following process, the first electrode portion 2231 and the second electrode portion 2232 may be formed on the first and second recesses R1 and R2, respectively, to form the electrode portion 2230.

The electrode portion 2230 may function as a lead electrode for applying power to the semiconductor device 2100. In the embodiment, the electrode portion 2230 is provided on the submount 2205 and the semiconductor device 2100 is mounted on the submount 2205 as a flip chip type, so that there is a technical effect that the size of the light emitting transmission module can be remarkably reduced.

The electrode portion 2230 may be formed of at least one of Cu, Ag, Ni, Cr, Ti, Al, Rh, Pd, Ir, Ru, Mg, Zn, Pt, Au, Hf, and those alloys, and may be formed as a single layer or multiple layers.

Next, as shown in FIGS. 14c and 14d, the semiconductor device 2100 can be mounted on the electrode portion 2230 of the submount 2205. For example, the first electrode 2121 and the second electrode 2122 of the semiconductor device may be die-bonded on the first electrode portion 2231 and the second electrode portion 2232, respectively.

For example, the first electrode 2121 and the second electrode 2122 of the semiconductor device 2100 may be electrically connected to the first electrode portion 2231 and the second electrode portion 2232 through a low melting point metal or a metal alloy, respectively. For example, the electrode 2120 may be die-bonded on the electrode portion 2230 using a low melting metal such as In, Sn, Au—Sn, Ag—Sn, and the like, but it is not limited thereto.

Next, FIG. 15 is a plan view showing the semiconductor device in the optical transmission module according to the first embodiment, FIG. 16 is a sectional view taken along line of the semiconductor device in the optical transmission module shown in FIG. 15, FIG. 17 is a sectional view taken along line II-IP of the semiconductor device in the optical transmission module shown in FIG. 15.

Referring to FIG. 15, the first electrode 2121 and the second electrode 2122 may be provided on the light emitting structure 2110 (see FIG. 16), an insulating layer 2150 may be provided on the light emitting structure 2110, the first magnetic material layer 2131 may be disposed on the insulating layer 2150.

The first electrode 2121 may comprise a first pad electrode 2121a, a first connection electrode 2121b, and a first circular electrode 2121c, and the second electrode 2122 may comprise a second pad electrode 2122a, a second connection electrode 2122b, and a second circular electrode 2122c, but it is not limited thereto.

According to the embodiment, since the first magnetic material layer 2131 is provided on the semiconductor device 2100, an attraction force with the third magnetic material layer 2253 of the optical cable due to the magnetic force is generated in the subsequent process, therefore, the optical cable can be not only self-aligned by the magnetic force, but also self-attached by the magnetic force, so that the semiconductor device, the optical transmission module, and the optical assembly having a technical effect capable of self-alignment and self-attachment between the optical cable and the semiconductor light emitting device can be provided.

Hereinafter, the technical characteristics of the semiconductor device 2100 according to the embodiment will be described in more detail with reference to FIGS. 16 and 17.

With reference to FIG. 15 together, the semiconductor device 2100 according to the embodiment may comprise a light emitting structure 2110 including a first semiconductor layer 2112, an active layer 2114, and a second semiconductor layer 2116, a first electrode 2121 electrically connected to the first semiconductor layer 2112, a second electrode 2122 electrically connected to the second semiconductor layer 2116, and an insulating layer 2150 disposed on the light emitting structure 2110, and comprise a first magnetic material layer 2131 disposed on the insulating layer 2150.

The semiconductor device 2100 according to the embodiment may comprise a substrate 2105, the substrate 2105 may have excellent heat dissipation characteristics and may be a conductive substrate or a nonconductive substrate. For example, the substrate 2105 may be provided of a material selected from a group including copper (Cu), gold (Au), nickel (Ni), molybdenum (Mo), copper-tungsten (Cu—W), and carrier wafer such as Si, Ge, AlN, GaAs, ZnO, SiC, and the like, but it is not limited thereto.

In the embodiment, the light emitting structure 2110 may comprise a first semiconductor layer 2112, an active layer 2114, an aperture layer 2118, and a second semiconductor layer 2116. The light emitting structure 2110 may be grown as a plurality of compound semiconductor layers. For example, the light emitting structure 2110 may be formed using an electron beam evaporator, a physical vapor deposition (PVD), a chemical vapor deposition (CVD), a plasma laser deposition (PLD), a dual-type thermal evaporator, sputtering, metal organic chemical vapor deposition (MOCVD), or the like.

The first semiconductor layer 2112 may be provided as at least one of Group III-V or Group II-VI compound semiconductors doped with a first conductivity type dopant. For example, the first semiconductor layer 2112 may be one of a group including GaAs, GaAl, InP, InAs, and GaP. The first semiconductor layer 2112 may be provided with a semiconductor material having a composition formula of, for example, $Al_xGa_{1-x}As$ ($0<x<1$)/$Al_yGa_{1-y}As$ ($0<y<1$) ($y<x$). The first semiconductor layer 2112 may be an n-type semiconductor layer doped with an n-type dopant that is the first conductivity type dopant such as Si, Ge, Sn, Se, or Te. The first semiconductor layer 2112 may be a Distributed Bragg Reflector (DBR) having a thickness of λ/4n by alternately arranging different semiconductor layers. Also, the first semiconductor layer 2112 may be a DBR using a dielectric multilayer film such as $TiO_2/SiO_2$ and the like.

The active layer 2114 may be provided by at least one of Group III-V or Group II-VI compound semiconductors. For example, the active layer 2114 may be one of a group including GaAs, GaAl, InP, InAs, and GaP. When the active layer 2114 is implemented as a multi-well structure, the active layer 2114 may comprise alternately arranged a plurality of well layers and a plurality of barrier layers. The plurality of well layers may be provided as a semiconductor material having a composition formula of $In_pGa_{1-p}As$ ($0≤p≤1$), for example. The barrier layer may be disposed of a semiconductor material having a composition formula of, for example, $In_qGa_{1-q}As$ ($0≤q<p$).

The aperture layer 2118 may be disposed on the active layer 2114. The aperture layer 2118 may comprise a circular opening at its central portion. The aperture layer 2118 may comprise a function of restricting current movement so as to concentrate a current to the center of the active layer 2114. That is, the aperture layer 2118 may adjust the resonance wavelength and adjust the angle of beam emitted from the active layer 2114 in the vertical direction. The aperture layer 2118 may comprise an insulating material such as $SiO_2$ or $Al_2O_3$. Also, the aperture layer 2118 may have a higher band gap than the active layer 2114 and the first and second semiconductor layers 2112 and 2116.

The second semiconductor layer 2116 may be provided as at least one of Group III-V or Group II-VI compound semiconductors doped with a dopant of the second conductivity type. For example, the second semiconductor layer 2116 may be one of a group including GaAs, GaAl, InP, InAs, and GaP. The second semiconductor layer 2116 may be formed of a semiconductor material having a composition formula of, for example, $Al_xGa_{1-x}As$ ($0<x<1$)/$Al_yGa_{1-y}As$ ($0<y<1$) ($y<x$). The second semiconductor layer 2116 may be a p-type semiconductor layer having a p-type dopant that is the second conductivity type dopant such as Mg, Zn, Ca, Sr, Ba, or the like. The second semiconductor layer 2116 may be a DBR having a thickness of λ/4n by alternately arranging different semiconductor layers. The second semiconductor layer 2116 may be a DBR using a dielectric multilayer film such as $TiO_2/SiO_2$.

The second semiconductor layer 2116 may have a reflectance lower than that of the first semiconductor layer 2112. For example, the first and second semiconductor layers 2112 and 2116 can form a resonance cavity in the vertical direction by a reflectance of 90% or more. At this time, light may be emitted to the outside through the light emitting region LE of the second semiconductor layer 2116, which is lower than the reflectance of the first semiconductor layer 2112.

In the embodiment, the first semiconductor layer 2112 may be electrically connected to the first electrode 2121 and the second semiconductor layer 2116 may be electrically connected to the second electrode 2122.

For example, referring to FIGS. 16 and 17, the first semiconductor layer 2112 may be electrically connected to the first circular electrode 2121c through the first connection electrode 2121b of the first electrode, and the second semiconductor layer 2116 may be electrically connected to the second circular electrode 2122c through the second connection electrode 2122b of the second electrode.

Next, the semiconductor device 2100 of the embodiment may comprise the insulating layer 2150 on the light emitting structure 2110. For example, in the embodiment, the insulating layer 2150 may be formed of a single layer or a plurality of layers of oxide such as of $SiO_2$, $Si_xO_y$, $Al_2O_3$, $TiO_2$, and the like, and nitride such as $Si_3N_4$, $Si_xN_y$, $SiO_xN_y$, AlN and the like.

Next, the embodiment may comprise a first magnetic material layer 2131 disposed on the insulating layer 2150 on the light emitting structure 2110, since the first magnetic material layer 2131 is provided on the semiconductor device 2100, an attraction force with the third magnetic material layer 2253 of the optical cable due to the magnetic force is generated, therefore, the optical cable can be not only self-aligned to a guide hole of the submount, but also self-attached by the magnetic force, so that the semiconductor device, the optical transmission module, and the optical assembly having a technical effect capable of self-alignment and self-attachment between the optical cable and the semiconductor light emitting device can be provided.

The first magnetic material layer 2131 formed on the insulating layer 2150 in the embodiment may be a ferromagnetic material, but it is not limited thereto. For example, in the embodiment, the first magnetic material layer 2131 may be formed as a single layer or a multilayer including at least one of Ni, Co, and Fe, and may be formed by using plating, E-beam, sputter, etc., and selective deposition can be performed by a photolithography method.

Meanwhile, in the embodiment, the third magnetic material layer 2253 formed at one end of the optical cable 2250 may be a permanent magnet, but it is not limited thereto. For example, when the first magnetic material layer 2131 is a permanent magnet, the third magnetic material layer 2253 may be a ferromagnetic material. Further, both the first magnetic material layer 2131 and the third magnetic material layer 2253 may be permanent magnets.

When the third magnetic material layer 2253 is a permanent magnet material, it may be ferrite such as $MnFe_2O_4$. If the third magnetic material layer 2253 is a permanent magnet material, it may be made of tungsten steel, chromium steel, KS steel or the like as the hardened magnet, and MK steel, alunico (alloy of Aluminum-Nickel-Cobalt-Copper), a new KS steel, a cunife (alloy of Copper-Nickel-Iron), and the like, but it is not limited thereto.

Accordingly, in the embodiment, since an attraction force due to the magnetic force is generated between the first magnetic material layer 2131 on the semiconductor device 2100 and the third magnetic material layer 2253 of the optical cable, therefore, the optical cable can be not only self-aligned to a guide hole of the submount, but also self-attached by the magnetic force, so that the semiconductor device, the optical transmission module, and the optical assembly having a technical effect capable of self-alignment and self-attachment between the optical cable and the semiconductor light emitting device can be provided.

Next, FIG. 18 is another example of a sectional view taken along line II-IP in the optical transmission module shown in FIG. 15. For example, it is a modified embodiment of the semiconductor device shown in FIG. 17.

According to the embodiment, it may further comprise a second magnetic material layer 2132 disposed on the first electrode 2121 or the second electrode 2122. For example, the semiconductor device shown in FIG. 18 may comprise a second magnetic material layer 2132 disposed on the first extended electrode 2121b of the first electrode and a second magnetic material layer 2132 disposed on the second extended electrode 2122b.

The second magnetic material layer 2132 may comprise a ferromagnetic material, but it is not limited thereto. For example, the second magnetic material layer 2132 may be formed of a single layer or a multilayer including at least one of Ni, Co, and Fe, and may be formed of using plating, E-beam, sputter, or the like.

The second magnetic material layer 2132 may be formed in contact with the first electrode 2121 or the second electrode 2122, and may be processed continuously in the process of the first electrode 2121 and the second electrode 2122, so that the efficiency of the process can be maximized.

For example, when the width of the first extended electrode 2121b of the first electrode or the second extended electrode 2122b of the second electrode is formed to be wide and the second magnetic material layer 2132 is formed on the first extended electrode 2121b or the second extended electrode 2122b, an attraction force, according to the magnetic force between the second magnetic material layer 2132 and the third magnetic material layer 2253 of the optical cable, allows that the optical transmission module, and the optical assembly having a technical effect capable of self-alignment and self-attachment between the optical cable and the semiconductor light emitting device can be provided.

The semiconductor device shown in FIG. 18 can be realized by only the second magnetic material layer 2132 without the first magnetic material layer 2131, separately from the semiconductor device shown in FIG. 17, and it can be realized to comprise both the first magnetic material layer 2131 and the second magnetic material layer 2132.

Next, FIGS. 19a and 19b are conceptual views explaining self-alignment and self-attachment in an optical transmission module according to an embodiment.

In the embodiment, the optical cable 2250 may comprise a core 2251, a cladding 2252, and a third magnetic material layer 2253. The optical waveguide structure in the core 2251 can be realized by setting the refractive index of the core 2251 to be larger than the refractive index of the cladding 2252.

For example, the core 2251 may be formed of a synthetic resin such as silica glass, compound glass, or transparent plastic, and the cladding 2252 may be formed of a synthetic resin such as silica glass, compound glass, or transparent plastic with low refractive index than that of the core 2251.

In the embodiment, the third magnetic material layer 2253 formed at one end of the optical cable 2250 may be a permanent magnet, but it is not limited thereto, and may be a ferromagnetic material.

When the third magnetic material layer 2253 is a permanent magnet material, it may be ferrite such as $MnFe_2O_4$. Also, when the third magnetic material layer 2253 is a permanent magnet material, it may be made of tungsten steel, chromium steel, KS steel or the like as the hardened magnet, and MK steel, alunico (alloy of Aluminum-Nickel-Cobalt-Copper), a new KS steel, a cunife (alloy of Copper-Nickel-Iron), and the like, but it is not limited thereto.

The third magnetic material layer 2253 may be adhered to the cladding 2252 of the optical cable 2250 using an adhesive material. For example, the third magnetic material layer 2253 may be adhered onto the cladding 2252 of the optical cable 2250 using at least one of a pressure sensitive adhesive, a chemical reaction adhesive material, and a thermosetting adhesive.

Referring to FIG. 19a, in the optical transmission module 2200 of the embodiment, an attraction force, according to the magnetic force M between the first magnetic material layer 2131 disposed on the semiconductor device 2100 and the third magnetic material layer 2253 disposed on the end of the optical cable 2250, allows that the optical cable 2250 can be self-aligned to the guide hole of the submount 2205, therefore, the semiconductor device, the optical transmission module, and the optical assembly having a technical effect capable of self-alignment between the optical cable and the semiconductor light emitting device as shown in FIG. 19b can be provided.

In addition, according to the embodiment, the optical cable can be not only self-aligned by the magnetic force, but also self-attached by the magnetic force, so that the semiconductor device, the optical transmission module, and the optical assembly having a technical effect capable of self-alignment and self-attachment between the optical cable and the semiconductor light emitting device can be provided.

Further, in the embodiment, when the submount 2205 comprises the first adhesive material layer 2220 inside the guide hole, an additional coupling force can be improved by the adhesive material layer. For example, the first adhesive material layer 2220 may be a pressure sensitive adhesive, a chemically reactive adhesive material, or a thermosetting adhesive.

For example, the first adhesive material layer 2220 may be a pressure sensitive adhesive, and when pressure is generated due to the self-attachment between the optical cable 2250 and the submount 2205 by the magnetic force, according to the pressure sensitive adhesive, a strong additional coupling force between the optical cable 2250 and the submount 2205 can be generated to strongly couple the optical cable 2250 to the submount 2205. The pressure sensitive adhesive may be a polymer. For example, the pressure sensitive adhesive may be an acrylate based polymer, but it is not limited thereto.

In the embodiment, the pressure sensitive adhesive can exhibit a high adhesive force value and can support a weight of several kilograms per contact area of 1 $cm^2$ even at a high temperature, therefore, in addition to the self-attachment between the optical cable 2250 and the submount 2205 by the magnetic force, a strong additional coupling force by the pressure sensitive adhesive can be generated between the optical cable 2250 and the submount 2205 so that the optical cable 2250 can be strongly coupled to the submount 2205 in a self-aligned state.

Next, FIG. 20 is a sectional view showing another example of an optical cable 2250 in an optical transmission module according to an embodiment.

The optical cable 2250 in the optical transmission module according to the embodiment can form a magnetic body by a plating method or the like after forming the core 2251 and the cladding 2252 with the third magnetic material layer 2255, further the magnetic body can be formed into a permanent magnet by permanent magnetization through an external magnetic field. The optical cable 2250 may form a buffer layer 2256 outside the third magnetic material layer 2255 and the buffer layer 2256 may be formed of a polymer film or the like, but it is not limited thereto.

Next, FIG. 21 is a sectional view showing another example of an optical transmission module 2202 according to an embodiment, and FIG. 22 is a conceptual view explaining a self-alignment and a self-attachment in an optical transmission module 2202 according to an second embodiment.

In describing the optical transmission module with reference to FIG. 21 and FIG. 22, the description overlapping with those described above may be omitted.

The optical transmission module 2202 according to the embodiment may comprise a submount 2205 having a guide hole 2210, a semiconductor device 2100 disposed on the submount 2205, an optical cable 2250 disposed in the guide hole of the submount 2205, a fourth magnetic material layer 2260 disposed on a side of the guide hole 2210 of the submount, and a fifth magnetic material layer 2253 disposed on an end of the optical cable 2250.

In the embodiment, the fourth magnetic material layer 2260 and the fifth magnetic material layer 2253 each may be a permanent magnet or a ferromagnetic. For example, both the fourth magnetic material layer 2260 and the fifth magnetic material layer 2253 may be permanent magnets, and if either the fourth magnetic material layer 2260 or the fifth magnetic material layer 2253 is a ferromagnetic, the remainder may be a permanent magnet.

Accordingly, as shown in FIG. 22, the embodiment may comprise a fourth magnetic material layer 2260 under the second guide hole 2212 of the submount (see FIG. 14a), and an attraction force, according to the magnetic force M between the fourth magnetic material layer 2260 and the fifth magnetic material layer 2253 disposed on an end of the optical cable 2250, allows that the optical cable 2250 can be self-aligned to the guide hole of the submount 2205, therefore, the semiconductor device, the optical transmission module, and the optical assembly having a technical effect capable of self-alignment between the optical cable and the semiconductor light emitting device as shown in FIG. 21 can be provided.

In addition, according to the embodiment, not only the optical cable is self-aligned by the magnetic force, but also the optical cable is self-attached by the magnetic force so that the semiconductor device, the optical transmission module, and the optical assembly having a technical effect capable of self-alignment between the optical cable and the semiconductor light emitting device and self-attachment between the optical cable and the submount can be provided.

The optical transmission module according to the embodiment may further implement a optical assembly together with a light receiving device and the like.

Next, a semiconductor device according to an embodiment will be described with reference to FIGS. 23 to 25. FIG. 23 is a plan view showing a semiconductor device according to an embodiment, FIG. 24 is a sectional view taken along line A-A of the semiconductor device shown in FIG. 23, and FIG. 25 is a view showing a shape in which a guide unit is removed from the semiconductor device shown in FIG. 23.

The semiconductor device 3400 according to the embodiment may comprise the light emitting structure 3100 and a guide unit 3200 as shown in FIGS. 23 to 25. The guide unit 3200 may be disposed on the light emitting structure 3100. The guide unit 3200 may be disposed on an upper surface of the light emitting structure 3100.

The light emitting structure 3100 according to the embodiment may comprise a first conductivity type DBR layer 3110, an active layer 3115, and a second conductivity type DBR layer 3120. The active layer 3115 may be disposed between the first conductivity type DBR layer 3110 and the second conductivity type DBR layer 3120. For example, the active layer 3115 may be disposed on the second conductivity type DBR layer 3120, and the first conductivity type DBR layer 3110 may be disposed on the active layer 3115.

The light emitting structure 3100 may comprise an aperture layer 3117. The aperture layer 3117 may be disposed on the active layer 3115. The aperture layer 3115 may comprise a function of restricting current movement so as to concentrate a current to a center of the active layer 3115. The aperture layer 3117 may adjust a resonance wavelength and adjust a beam angle emitted from the active layer 3115 in a vertical direction. The semiconductor device 3400 according to the embodiment may be a vertical cavity surface emitting laser (VCSEL) semiconductor device. A detailed example of a vertical cavity surface emitting laser (VCSEL) semiconductor device will be described later.

The semiconductor device 3400 according to the embodiment may comprise an insulating layer 3140 disposed on the light emitting structure 3100 as shown in FIGS. 23 to 25. The insulating layer 3140 may be disposed on a side surface and an upper surface of the first conductivity type DBR layer 3110. The insulating layer 3140 may expose a part of the upper surface of the first conductivity type DBR layer 3110. The insulating layer 3140 may be disposed on the second conductivity type DBR layer 3120. The insulating layer 3140 may expose a part of an upper surface of the second conductivity type DBR layer 3120.

In addition, the semiconductor device 3400 may further comprise a substrate 3105 disposed under the light emitting structure 3100. The substrate 3105 may be disposed under the second conductivity type DBR layer 3120. For example, the substrate 3105 may be a growth substrate on which the light emitting structure 3100 can be grown.

The semiconductor device 3400 according to the embodiment may comprise a first electrode 3150 and a second electrode 3160. The first electrode 3150 may be disposed on the light emitting structure 3100. The first electrode 3150 may be disposed on the insulating layer 3140. The first electrode 3150 may be electrically connected to the first conductivity type DBR layer 3110. For example, a portion of the first electrode 3150 may be disposed in contact with an upper surface of the first conductivity type DBR layer 3110. A portion of the first electrode 3150 may be disposed in a ring shape on an upper surface of the first conductivity type DBR layer 3110.

The second electrode 3160 may be disposed on the light emitting structure 3100. The second electrode 3160 may be disposed on the insulating layer 3140. The second electrode 3160 may be electrically connected to the second conductivity type DBR layer 3120. For example, a portion of the second electrode 3150 may be disposed in contact with an upper surface of the second conductivity type DBR layer 3120.

The semiconductor device 3400 according to the embodiment may comprise a light emitting aperture 3130 that emits light in a direction perpendicular to an upper surface of the light emitting structure 3100. For example, the light emitting aperture 3130 may be defined as a region where light is emitted upward from the upper surface of the light emitting structure 3100.

The guide unit 3200 according to the embodiment may comprise a through hole TH1. The through hole TH1 may be provided larger than a diameter of the light emitting aperture 3130. The through hole TH1 may be provided on the light emitting aperture 3130. The through hole TH1 may expose a part of an upper surface of the light emitting structure 3100. The through hole TH1 may be larger than a width of the first conductivity type DBR layer 3110. The through hole TH1 may be provided with a diameter larger than a width of the active layer 3115.

According to the embodiment, the diameter of the light emitting aperture 3130 may be from several micrometers to several tens of micrometers. For example, the diameter of the light emitting aperture 3130 may be from 8 micrometers to 10 micrometers. In addition, the diameter of the through hole TH1 provided in the guide unit 3200 may be several tens of micrometers to several hundreds of micrometers. For example, the diameter of the through hole TH1 may be 100 micrometers to 200 micrometers. Further, a thickness of the guide unit 3200 may be several micrometers to several hundreds of micrometers. For example, the guide unit 3200 may be provided in the thickness of 1 micrometer to 500 micrometers.

The size and function of the through hole TH1 provided in the guide unit 3200 will be described with reference to FIG. 26, which is a view showing the optical transmission module and the optical transmission apparatus according to the embodiment.

The guide unit 3200 may be disposed on the first electrode 3150. The guide unit 3200 may be disposed on the insulating layer 3140. The guide unit 3200 may be disposed in contact with an upper surface of the first electrode 3150. The guide unit 3200 may be disposed in contact with an upper surface of the second electrode 3160.

The guide unit 3200 according to the embodiment may comprise a first opening H1 as shown in FIG. 23. The first opening H1 may expose a first electrode pad 3155 connected to the first electrode 3150. The first electrode pad 3155 may be connected to the first electrode 3150 and disposed on the insulating layer 3140, for example. A portion of the insulating layer 3140 disposed around the first electrode pad 3155 may be exposed by the first opening H1. For example, a wire may be bonded to the first electrode pad 3155 through a wire bonding method. Power may be applied to the first electrode pad 3155 from outside through a wire. At this time, since the first electrode pad 3155 is exposed in the upward direction and the lateral direction by the first opening H1, the wire connection through the wire bonding can be easily performed to the first electrode pad 3155.

Further, the guide unit 3200 may comprise a second opening H2. The second opening H2 may expose a second electrode pad 3165 connected to the second electrode 3160. The second electrode pad 3165 may be connected to the second electrode 3160 and disposed on the insulating layer 3140, for example. A portion of the insulating layer 3140 disposed around the second electrode pad 3165 may be exposed by the second opening H2. For example, a wire may be bonded to the second electrode pad 3165 through a wire bonding method. Power may be applied to the second electrode pad 3165 from outside through a wire. At this time, since the second electrode pad 3165 is exposed in the upward direction and the lateral direction by the second opening H2, the wire connection through the wire bonding can be easily performed to the second electrode pad 3165.

The guide unit 3200 may be provided as an insulating material. For example, the guide unit 3200 may be provided in at least one selected from a group including an epoxy molding compound (EMC), a black epoxy molding compound (BLACK EMC), and a polyimide.

Then, an optical transmission module and an optical transmission apparatus to which the semiconductor device according to the embodiment is applied will be described with reference to FIG. 26. FIG. 26 is a view showing an optical transmission apparatus according to an embodiment. In describing the optical transmission module and the optical transmission apparatus according to the embodiment with reference to FIG. 26, description overlapping with those described above may be omitted.

The optical transmission module 3700 according to the embodiment may comprise a circuit board 3300 and a semiconductor device 3400 as shown in FIG. 26. The semiconductor device 3400 may be disposed on the circuit board 3300. The semiconductor device 3400 may be electrically connected to the circuit board 3300. The semiconductor device 3400 may be electrically connected to the circuit board 3300 by a flip chip bonding method, a die bonding method, a wire bonding method, or the like. For example, the semiconductor device 3400 may be a vertical cavity surface emitting laser (VCSEL) semiconductor device.

The semiconductor device 3400 according to the embodiment may comprise a light emitting structure 3100, a first electrode 3150, a second electrode 3160, and a guide unit 3200 as shown in FIG. 26.

The light emitting structure 3100 may comprise a first conductivity type DBR layer 3110, an active layer 3115, and a second conductivity type DBR layer 3120, as described above. The circuit board 3300 may be electrically connected to the first conductivity type DBR layer 3110 and the second conductivity type DBR layer 3120. The circuit board 3300 may be electrically connected to the first conductivity type DBR layer 3110 through the first electrode 3150. The circuit board 3300 may be electrically connected to the second conductivity type DBR layer 3120 through the second electrode 3160.

The circuit board 3300 may comprise a circuit to provide an electrical signal to the semiconductor device 3400. The circuit board 3300 may provide a signal provided from the outside to the semiconductor device 3400. In this way, the driving of the semiconductor device 3400 can be controlled by the electrical connection between the circuit board 3300 and the semiconductor device 3400. For example, the circuit board 3300 may comprise at least one of a rigid printed circuit board (Rigid PCB) and a flexible printed circuit board (FPCB).

According to the embodiment, the guide unit 3200 may be disposed on the light emitting structure 3100. The guide unit 3200 may be disposed on an upper surface of the light emitting structure 3100. The light emitting structure 3100 may comprise a light emitting aperture 3130 that emits light in a direction perpendicular to the upper surface of the light emitting structure 3100. For example, the light emitting aperture 3130 may be defined as a region where light is emitted upward from the upper surface of the light emitting structure 3100.

The guide unit 3200 according to the embodiment may comprise a through hole TH1. The through hole TH1 may be provided larger than a diameter of the light emitting aperture 3130. The through hole (TH1) may be provided on the light emitting aperture (3130). The through hole TH1 may expose a part of the upper surface of the light emitting structure 3100. The through hole TH1 may be larger than a width of the first conductivity type DBR layer 3110. The through hole TH1 may be provided with a diameter larger than a width of the active layer 3115.

According to the embodiment, the diameter of the light emitting aperture 3130 may be several micrometers to several tens of micrometers. For example, the diameter of the light emitting aperture 3130 may be 8 micrometers to 10 micrometers. In addition, the diameter of the through hole TH1 provided in the guide unit 3200 may be several tens of micrometers to several hundreds of micrometers. For example, the diameter of the through hole TH1 may be 100 micrometers to 200 micrometers. Further, a thickness of the guide unit 3200 may be several micrometers to several hundreds of micrometers. For example, the guide unit 3200 may be provided in the thickness of 1 micrometer to 500 micrometers.

The diameter of the through hole TH1 of the guide unit 3200 may be determined according to the size of the optical cable 3800 to be coupled to the through hole TH1. The thickness of the guide unit 3200 may be set to a thickness sufficient to support the optical cable 3800 to be coupled to the through hole TH1. If the thickness of the guide unit 3200 is thinner than 1 micrometer, it may be weak to support the optical cable 3800, and if the thickness of the guide unit 3200 is greater than 500 micrometers, there is a disadvantage that the size of the optical transmission module 3700 may be increased.

On the other hand, in the actual product supply step, the semiconductor device 3400 or the optical transmission module 3700 described above may be supplied as one component. The product may also be supplied in the form of the optical transmission apparatus 3900 in which the optical cable 3800 is coupled to the optical transmission module 3700.

The optical transmission apparatus 3900 according to the embodiment may comprise the optical transmission module 3700 and the optical cable 3800 as shown in FIG. 26. The optical cable 3800 may be coupled to the optical transmission module 3700. The optical cable 3800 may be coupled to the optical transmission module 3700 to receive a beam provided from the optical transmission module 3700.

For example, the optical cable 3800 may comprise a core 3810 and a cladding 3820. The cladding 3820 may be disposed around the core 3810. The optical cable 3800 and the optical transmission module 3700 can be coupled so that a beam emitted from the optical transmission module 3700 can be incident on the core 3810.

According the embodiment, in the describing the optical cable 3800, only the core 3810 and the cladding 3820 disposed around the core 3810 are shown in FIG. 26. However, as is known, the optical cable 3800 may further comprise a protective layer disposed around the cladding 3820. That is, according to the embodiment, when the optical cable 3800 is coupled to the optical transmission module 3700, the outer circumferential surface of the cladding 3820 may be arranged to be in contact with and coupled to the optical transmission module 3700. In addition, when the optical cable 3800 is coupled to the optical transmission module 3700, the protective layer disposed around the cladding 3820 may be arranged to be inserted and coupled to the optical transmission module 3700.

According to the embodiment, the optical cable 3800 may be coupled to the guide unit 3200 of the optical transmission module 3700. A portion of the optical cable 3800 may be disposed in the through hole TH1 of the guide unit 3200. The optical transmission apparatus 3900 according to the embodiment may comprise the optical cable 3800 coupled to the through hole TH1 as shown in FIG. 26. For example, the core 3810 of the optical cable 3800 may be disposed on and in alignment with the light emitting aperture 3130 of the semiconductor device 3400. The diameter of the core 3810 may be greater than the diameter of the light emitting aperture 3130 of the light emitting structure 3110. For example, the optical cable 3800 may be coupled to the guide unit 3200 by an adhesive layer. The adhesive layer may be provided between an inner circumferential surface of the guide unit 3200 and an outer circumferential surface of the optical cable 3800. The adhesive layer may be selected from a group including, for example, an ultraviolet curable adhesive layer, and a thermosetting adhesive layer.

According to the embodiment, the guide unit 3200 may be formed of a material capable of supporting the optical cable 3800 in coupling with the optical cable 3800. On the other hand, in FIG. 26, the optical transmission apparatus 3900 including one optical cable 3800 is shown.

However, the optical transmission apparatus 3900 according to the embodiment may comprise a plurality of optical cables 3800. For example, the optical transmission apparatus 3900 according to the embodiment may be provided to comprise four channels. In the case where the optical transmission apparatus 3900 according to the embodiment has four channels, four semiconductor devices 3400 may be provided, and an additional guide unit 3200 may be provided for each semiconductor device 3400. At this time, in order to prevent cross-talk between the plurality of channels, the guide unit 3200 may be formed of a black epoxy molding compound.

The beam incident surface of the core 3810 may be disposed parallel to the beam emitting surface of the semiconductor device 3400. The beam incident surface of the core 3810 may be disposed parallel to the beam emitting surface of the light emitting aperture 3130. The distance l from the beam emitting surface of the semiconductor device 3400 to the beam incident surface of the core 3810 may be several micrometers to several tens of micrometers. For example, the distance l from the beam emitting surface of the semiconductor device 3400 to the beam incident surface of the core 3810 may be provided to be not more than ten micrometers. In other words, the distance l from the beam emitting surface of the light emitting aperture 3130 to the beam incident surface of the core 3810 may be several micrometers to several tens of micrometers.

According to the optical transmission apparatus 3900 of the embodiment, since the beam incident surface of the core 3810 and the beam emitting surface of the light emitting aperture 3130 are arranged in parallel with each other, an additional optical means such as a reflecting mirror or a prism for reflecting the beam emitted from the light emitting aperture 3130a toward in a direction in which the core 3810 is positioned is not needed.

In addition, according to the optical transmission apparatus 3900 of the embodiment, since the distance l from the beam emitting surface of the light emitting aperture 3130a to the beam incident surface of the core 3810 is provided with a short distance of several micrometers to several tens of micrometers so that all of the beam emitted from the light emitting aperture 3130a can be incident on the beam incident surface of the core 3810, an additional optical means such as a lens for focusing beam to the core 3810 is not needed.

The distance l from the beam emitting surface of the semiconductor device 3400 to the beam incident surface of the core 3810 can be determined by the diameter of the beam emitting surface of the light emitting aperture 3130, a divergence angle of the beam emitted from the light emitting aperture 3130, and the diameter of the core 3810 of the optical cable 3800 configured to be disposed in the through hole TH1 of the guide unit 3200 and receive the beam emitted from the semiconductor device 3400.

The distance l from the beam emitting surface of the semiconductor device 3400 to the beam incident surface of the core 3810 can be set such that the maximum distance may be limited so that all of the beam emitted from the light emitting aperture 3130 is incident on the core 3810 of the optical cable 3800.

Then, the distance l from the beam emitting surface of the semiconductor device 3400 to the beam incident surface of the core 3810 in the optical transmission apparatus 3900 according to the embodiment will be described with reference to FIG. 27. FIG. 27 is a view showing an arrangement relationship between a divergence angle of a beam emitted from a semiconductor device and an optical cable in the optical transmission apparatus according to the embodiment.

According to the embodiment, the semiconductor device 3400 may comprise a light emitting aperture 3130. The beam emitted from the light emitting aperture 3130 may have a circular light pattern. According to the embodiment, the diameter a of the light emitting aperture 3130 may be several micrometers. For example, the diameter a of the light emitting aperture 3130 may be in a range of 8 micrometers to 10 micrometers. The semiconductor device 3400 may transmit a signal using a beam emitted from the light emitting aperture 3130.

The semiconductor device 3400 may be provided as a vertical cavity surface emitting laser (VCSEL) semiconductor device, for example, and may emit a beam in an upward direction at an upper surface. A vertical cavity surface emitting laser (VCSEL) semiconductor device 3400 may emit the beam upward in a beam divergence angle $\theta$ of, for example, about 5 degrees to about 30 degrees. The vertical cavity surface emitting laser (VCSEL) semiconductor device 3400 may emit beams upward more specifically with divergence angle $\theta$ of about 15 degrees to about 20 degrees.

For example, the core 3810 may be formed with a diameter b of several tens of micrometers. For example, the diameter b of the core 3810 may be formed to be in a range of 55 micrometers to 70 micrometers.

Meanwhile, as shown in FIG. 27, when the diameter a of the light emitting aperture 3130, the diameter b of the core 3810, and the divergence angle $\theta$ of the light emitting aperture 3130 are given, the maximum distance x for allowing all of the beam emitted from the light emitting aperture 3130 to be incident on the core 3810 can be calculated as described above with reference to [Equation 1].

That is, when the diameter a of the light emitting aperture 3130 is 10 micrometers, the diameter b of the core 3810 is 55 micrometers, and the divergence angle $\theta$ of the light emitting aperture 3130 is 30 degrees, the maximum distance x for allowing all of the beam emitted from the light emitting aperture 3130 to be incident on the core 3810 may be calculated to be approximately 84 micrometers.

in addition, when the diameter a of the light emitting aperture 3130 is 8 micrometers, the diameter b of the core 3810 is 70 micrometers, and the divergence angle $\theta$ of the light emitting aperture 3130 is 5 degrees, the maximum distance x for allowing all of the beam emitted from the light emitting aperture 3130 to be incident on the core 3810 may be calculated to be approximately 710 micrometers.

Meanwhile, if the diameter a of the light emitting aperture 3130 is set to 10 micrometers, the diameter b of the core 3810 is set to 60 micrometers, and the divergence angle of the light emitting aperture 3130 is set in a range of 15 degrees to 25 degrees, the maximum distance x for allowing all of the beam emitted from the light emitting aperture 3130 to be incident on the core 3810 can be calculated to have a value in a range of 142 micrometers to 190 micrometers.

For example, if the diameter a of the light emitting aperture 3130 is 10 micrometers, the diameter b of the core 3810 is 60 micrometers, the divergence angle $\theta$ of the light emitting aperture 3130 is provided with 15 degrees, the maximum distance x for allowing all of the beam emitted from the light emitting aperture 3130 to be incident on the core 3810 is calculated to be about 190 micrometers.

In addition, if the diameter a of the light emitting aperture 3130 is 10 micrometers, the diameter b of the core 3810 is 60 micrometers, and the divergence angle $\theta$ of the light emitting aperture 3130 is provided with 20 degrees, the maximum distance x for allowing all of the beam emitted from the light emitting aperture 3130 to be incident on the core 3810 is calculated to be about 142 micrometers.

As describe above, according to the optical transmission apparatus 3900 of the embodiment, the distance l from the light emitting surface of the light emitting aperture 3130 to the beam incident surface of the core 3810 can be set smaller than the maximum distance x calculated according to [Equation 1]. Accordingly, all of the beam emitted from the light emitting aperture 3130 can be incident on the core 3810 without loss.

In addition, according to the embodiment, the guide unit 3200 can be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without less to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

In the case of conventional optical transmission modules and optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission module and optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 3900 of the embodiment, the optical alignment between the semiconductor device 3400 that provides the beam and the core 3810 of the optical cable 3800 can be completed by simply coupling the optical cable 3800 to the optical transmission module 3700. That is, by simply coupling the optical cable 3800 to the guide unit 3200 of the semiconductor device 3400, the optical alignment between the light emitting aperture 3130 and the core 3810 can be completed.

Accordingly, the optical transmission apparatus 3900 according to the embodiment has advantages of being small in size, easily providing optical alignment, reducing manufacturing cost, and improving productivity.

Hereinafter, a method of manufacturing a semiconductor device according to an embodiment will be described with reference to FIGS. 28 to 31. FIGS. 28 to 31 are views explaining the method of manufacturing the semiconductor device according to the embodiment. Referring to FIGS. 28 to 31, in describing the method of manufacturing the semiconductor device according to the embodiment, description overlapping with those described above may be omitted.

In describing the method of manufacturing the semiconductor device according to the embodiment with reference to FIGS. 28 to 31, the method of forming a board 3105, a light emitting structure 3100, an insulating layer 3140, a first electrode 3150, and a second electrode 3160 are well known, so that the description will be made mainly on the formation process of the guide unit 3200.

First, according to the method of manufacturing the semiconductor device of the embodiment, as shown in FIG. 28, a photoresist film 3250 may be formed on the structure that is formed of the board 3105, the light emitting structure 3100, the insulating layer 3140, the first electrode 3150, the second electrode 3160. For example, the photoresist film 3250 may be formed through a photolithography process.

The photoresist film 3250 may comprise an opening provided in a region where the guide unit 3200 is to be formed later. The photoresist film 3250 may be formed to have a thickness of several micrometers to several hundreds of micrometers. The thickness of the photoresist film 3250 may be formed corresponding to the thickness of the guide unit 3200 to be formed later. The photoresist film 3250 may be formed to have a thickness of 1 micrometer to 500 micrometers, for example.

Then, as shown in FIG. 29, a temporary guide unit 3200a may be formed on the photoresist film 3250. The temporary guide unit 3200a may be formed at an upper portion of the photoresist film 3250 and at an opening provided by the photoresist film 3250. The temporary guide unit 3200a may be formed of an insulating material. For example, the temporary guide unit 3200a may be provided as at least one selected from a group including an epoxy molding compound (EMC), a black epoxy molding compound (BLACK EMC), and a polyimide.

Next, as shown in FIG. 30, an upper surface of the temporary guide unit 3200a may be polished to form a guide unit 3200 and the upper surface of the photoresist film 3250 may be exposed. For example, the polishing process may be performed such that the guide unit 3200 has a thickness of 1 micrometer to 500 micrometers.

Then, as shown in FIG. 31, the guide unit 3200 may be formed on the light emitting structure 3100 through removal of the photoresist film 3250. The light emitting aperture 3130 of the light emitting structure 3100 may be exposed through the through hole TH1 of the guide unit 3200.

As described above, according to the embodiment, the guide unit 3200 may be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

Meanwhile, FIG. 32 is a view showing another example of a semiconductor device according to an embodiment. In describing another example of the semiconductor device according to the embodiment with reference to FIG. 32, description overlapping with those described above may be omitted.

The semiconductor device according to the embodiment may comprise a light emitting structure 3100 and a guide unit 3200 as shown in FIG. 32. The guide unit 3200 may be disposed on the light emitting structure 3100. The guide unit 3200 may be disposed on an upper surface of the light emitting structure 3100.

The light emitting structure 3100 according to the embodiment may comprise a first conductivity type DBR layer, an active layer 3115, and a second conductivity type DBR layer 3120. The active layer 3115 may be disposed between the first conductivity type DBR layer 3110 and the second conductivity type DBR layer 3120. The light emitting structure 3100 may comprise an aperture layer 3117. The aperture layer 3117 may be disposed on the active layer 3115. The aperture layer 3115 may comprise a function of restricting current movement so as to concentrate a current to the center of the active layer 3115.

The semiconductor device according to the embodiment may comprise a first electrode 3150 and a second electrode 3160. The first electrode 3150 may be disposed on the light emitting structure 3100. The first electrode 3150 may be disposed on the insulating layer 3140. The first electrode 3150 may be electrically connected to the first conductivity type DBR layer 3110. For example, a portion of the first electrode 3150 may be disposed in contact with an upper surface of the first conductivity type DBR layer 3110. A portion of the first electrode 3150 may be disposed in a ring shape on the upper surface of the first conductivity type DBR layer 3110.

The second electrode 3160 may be disposed on the light emitting structure 3100. The second electrode 3160 may be disposed on the insulating layer 3140. The second electrode 3160 may be electrically connected to the second conductivity type DBR layer 3120. For example, a portion of the second electrode 3150 may be disposed in contact with an upper surface of the second conductivity type DBR layer 3120.

The semiconductor device according to the embodiment may comprise a light emitting aperture 3130 that emits light in a direction perpendicular to the upper surface of the light emitting structure 3100. For example, the light emitting aperture 3130 may be defined as a region where light is emitted upward from the upper surface of the light emitting structure 3100.

The guide unit 3200 may comprise a first guide unit 3210 and a second guide unit 3220. The second guide unit 3220 may be disposed on the first guide unit 3210. The first guide unit 3210 may be provided with a first thickness. For example, the first guide unit 3210 may be provided in a thickness of several micrometers. The second guide unit 3220 may be provided with a second thickness. The second guide unit 3220 may be provided with a second thickness that is thicker than the first thickness. For example, the second guide unit 3220 may be provided in a thickness of several micrometers to several hundreds of micrometers.

The first guide unit 3210 may comprise a first through hole TH11 having a first diameter. The second guide unit 3220 may comprise a second through hole TH12 having a second diameter. The second guide unit 3220 may comprise a second through hole TH12 having a second diameter larger than the first diameter. Accordingly, a part of an upper surface of the first guide unit 3210 can be exposed by the second through hole TH12. The first through hole TH11, which has the first diameter, of the first guide unit 3210 may be provided larger than the diameter of the light emitting aperture 3130 of the light emitting structure 3100. The first through hole TH11 may be provided on the light emitting aperture 3130. The first through hole TH11 may expose a part of an upper surface of the light emitting structure 3100. The first through hole TH11 may be provided larger than a width of the first conductivity type DBR layer 3110. The first through hole TH11 may be provided with a diameter larger than a width of the active layer 3115.

According to the embodiment, the diameter of the light emitting aperture 3130 may be provided with several micrometers to several tens of micrometers. For example, the diameter of the light emitting aperture 3130 may be provided with 8 micrometers to 10 micrometers. The diameter of the first through hole TH11 provided in the first guide unit 3200 may be several tens of micrometers to several hundreds of micrometers. For example, the diameter of the first through hole TH11 may be provided with 100 micrometers to 200 micrometers.

The first guide unit 3210 may be disposed on the first electrode 3150. The first guide unit 3210 may be disposed on the insulating layer 3140. The first guide unit 3210 may be disposed in contact with an upper surface of the first electrode 3150. The first guide unit 3210 may be disposed in contact with an upper surface of the second electrode 3160.

The guide unit 3200 may be provided as an insulating material. For example, the guide unit 3200 may be provided in at least one selected from a group including an epoxy molding compound (EMC), a black epoxy compound (BLACK EMC), and a polyimide.

For example, the first guide unit 3210 and the second guide unit 3220 may be formed of the same material. In addition, according to the embodiment, the first guide unit 3210 and the second guide unit 3220 may be formed of different materials. For example, the first guide unit 3210 may be formed of polyimide, and the second guide unit 3220 may be formed of a black epoxy molding compound.

Then, an optical transmission module and an optical transmission apparatus to which the semiconductor device according to the embodiment is applied will be described with reference to FIG. 33. FIG. 33 is a view showing another example of the optical transmission apparatus according to the embodiment. In describing the optical transmission module and the optical transmission apparatus according to the embodiment with reference to FIG. 33, description overlapping with those described above may be omitted.

The optical transmission module 3700 according to the embodiment may comprise a circuit board 3300 and a semiconductor device 3400 as shown in FIG. 33. The semiconductor device 3400 may be disposed on the circuit board 3300. The semiconductor device 3400 may be electrically connected to the circuit board 3300.

The semiconductor device 3400 according to the embodiment may comprise a light emitting structure 3100, a first electrode 3150, a second electrode 3160, and a guide unit 3200 as shown in FIG. 33. The guide unit 3200 may comprise a first guide unit 3210 and a second guide unit 3220.

The light emitting structure 3100 may comprise a first conductivity type DBR layer 3110, an active layer 3115, and a second conductivity type DBR layer 3120, as described above. The circuit board 3300 may be electrically connected to the first conductivity type DBR layer 3110 and the second conductivity type DBR layer 3120. The circuit board 3300 may be electrically connected to the first conductivity type DBR layer 3110 through the first electrode 3150. The circuit board 3300 may be electrically connected to the second conductivity type DBR layer 3120 through the second electrode 3160.

The circuit board 3300 may comprise a circuit to provide an electrical signal to the semiconductor device 3400. The circuit board 3300 may provide a signal provided from the outside to the semiconductor device 3400. In this way, the driving of the semiconductor device 3400 can be controlled by the electrical connection between the circuit board 3300 and the semiconductor device 3400. For example, the circuit board 3300 may comprise at least one of a rigid printed circuit board (Rigid PCB) and a flexible printed circuit board (FPCB).

The semiconductor device 3400 according to the embodiment may comprise a light emitting aperture 3130 that emits light in a direction perpendicular to an upper surface of the light emitting structure 3100. For example, the light emitting aperture 3130 may be defined as a region where light is emitted upward from the upper surface of the light emitting structure 3100.

The guide unit 3200 may comprise a first guide unit 3210 and a second guide unit 3220. The second guide unit 3220 may be disposed on the first guide unit 3210. The first guide unit 3210 may be provided with a first thickness. For example, the first guide unit 3210 may be provided in a thickness of several micrometers. The second guide unit 3220 may be provided with a second thickness. The second guide unit 3220 may be provided with a second thickness that is thicker than the first thickness. For example, the second guide unit 3220 may be provided in a thickness of several micrometers to several hundreds of micrometers.

The first guide unit 3210 may comprise a first through hole TH11 having a first diameter. The second guide unit 3220 may comprise a second through hole TH12 having a second diameter. The second guide unit 3220 may comprise a second through hole TH12 having a second diameter larger than the first diameter. Accordingly, a part of an upper surface of the first guide unit 3210 can be exposed by the second through hole TH12. The first through hole TH11, which has the first diameter, of the first guide unit 3210 may be provided larger than the diameter of the light emitting aperture 3130 of the light emitting structure 3100. The first through hole TH11 may be provided on the light emitting aperture 3130. The first through hole TH11 may expose a part of an upper surface of the light emitting structure 3100. The first through hole TH11 may be larger than a width of the first conductivity type DBR layer 3110. The first through hole TH11 may be provided with a diameter larger than a width of the active layer 3115.

According to the embodiment, the diameter of the light emitting aperture 3130 may be provided with several micrometers to several tens of micrometers. For example, the diameter of the light emitting aperture 3130 may be provided with 8 micrometers to 10 micrometers. In addition, the diameter of the first through hole TH11 provided in the first guide unit 3200 may be provided with several tens of micrometers to several hundreds of micrometers. For example, the diameter of the first through hole TH11 may be provided with 100 micrometers to 200 micrometers.

The first guide unit 3210 may be disposed on the first electrode 3150. The first guide unit 3210 may be disposed on the insulating layer 3140. The first guide unit 3210 may be disposed in contact with an upper surface of the first electrode 3150. The first guide unit 3210 may be disposed in contact with an upper surface of the second electrode 3160.

On the other hand, in the actual product supply step, the semiconductor device 3400 or the optical transmission module 3700 described above may be supplied as one component. In addition, the product may also be supplied in the form of an optical transmission apparatus 3900 in which the optical cable 3800 is coupled to the optical transmission module 3700.

The optical transmission apparatus 3900 according to the embodiment may comprise the optical transmission module 3700 and the optical cable 3800 as shown in FIG. 33. The optical cable 3800 may be coupled to the optical transmission module 3700. The optical cable 3800 may be coupled to the optical transmission module 3700 to receive a beam provided from the optical transmission module 3700.

For example, the optical cable 3800 may comprise a core 3810 and a cladding 3820. The cladding 3820 may be disposed around the core 3810. The optical cable 3800 and the optical transmission module 3700 may be coupled so that a beam emitted from the optical transmission module 3700 can be incident on the core 3810.

According to the embodiment, the optical cable 3800 may be coupled to the guide unit 3200 of the optical transmission module 3700. A portion of the optical cable 3800 may be disposed in the second through hole TH12 of the second guide unit 3220. The optical transmission apparatus 3900 according to the embodiment may comprise the optical cable 3800 coupled to the second through hole TH12 as shown in FIG. 33. In addition, the optical cable 3800 can be supported by an upper surface of the first guide unit 3210.

When the optical cable 3800 is coupled to the guide unit 3200, the coupling position of the optical cable 3800 can be determined by the first guide unit 3210. The position where the optical cable 3800 is coupled to the guide unit 3200 can be easily determined by the first guide unit 3210. According to the embodiment, when the optical cable 3800 is coupled to the guide unit 3200, the optical cable 3800 can be inserted until the optical cable 3800 is blocked by the upper surface of the first guide unit 3210, so that the arrangement position of the optical cable 3800 can be clearly determined. Thus, the distance from the light emitting surface of the semiconductor device 3400 to the beam incident surface of the core 3810 can be clearly determined.

For example, the core 3810 of the optical cable 3800 may be disposed on and arranged in alignment with the light emitting aperture 3130 of the semiconductor device 3400. The diameter of the core 3810 may be greater than the diameter of the light emitting aperture 3130 of the light emitting structure 3110. For example, the optical cable 3800 may be coupled to the guide unit 3200 by an adhesive layer. The adhesive layer may be provided between an inner circumferential surface of the second guide unit 3220 and an outer circumferential surface of the optical cable 3800. The adhesive layer may be selected from a group including, for example, an ultraviolet curable adhesive layer and a thermosetting adhesive layer.

The beam incident surface of the core 3810 may be disposed parallel to the beam emitting surface of the semiconductor device 3400. The beam incident surface of the core 3810 may be disposed parallel to the beam emitting surface of the light emitting aperture 3130. The distance l from the beam emitting surface of the semiconductor device 3400 to the beam incident surface of the core 3810 may be several micrometers to several tens of micrometers. For example, the distance l from the beam emitting surface of the semiconductor device 3400 to the beam incident surface of the core 3810 may be provided to be not more than ten micrometers. In other words, the distance l from the beam emitting surface of the light emitting aperture 3130 to the beam incident surface of the core 3810 may be several micrometers to several tens of micrometers.

According to the optical transmission apparatus 3900 of the embodiment, since the beam incident surface of the core 3810 and the beam emitting surface of the light emitting aperture 3130 are disposed in parallel with each other, an additional optical means such as a reflecting mirror or a prism for reflecting the beam emitted from the light emitting aperture 3130 toward in a direction in which the core 3810 is positioned is not needed.

In addition, according to the optical transmission apparatus 3900 of the embodiment, since the distance l from the beam emitting surface of the light emitting aperture 3130 to the beam incident surface of the core 3810 is provided with a short distance of several micrometers to several tens of micrometers so that all of the beam emitted from the light emitting aperture 3130 can be incident on the beam incident surface of the core 3810, an additional optical means such as a lens for focusing beam to the core 3810 is not needed.

The distance l from the beam emitting surface of the semiconductor device 3400 to the beam incident surface of the core 3810 can be determined by the diameter of the beam emitting surface of the light emitting aperture 3130, the divergence angle of the beam emitted from the light emitting aperture 3130, and the diameter of the core 3810 of the optical cable 3800 which is disposed in the second through hole TH12 of the guide unit 3200 and configured to receive the beam emitted from the semiconductor device 3400.

The distance l from the beam emitting surface of the semiconductor device 3400 to the beam incident surface of the core 3810 can be set such that the maximum distance may be limited so that all of the beam emitted from the light emitting aperture 3130 is incident on the core 3810 of the optical cable 3800.

As described above, according to the optical transmission apparatus 3900 of the embodiment, the distance l from the light emitting surface of the light emitting aperture 3130 to the beam incident surface of the core 3810 can be set smaller than the maximum distance x calculated according to [Equation 1]. Accordingly, all of the beam emitted from the light emitting aperture 3130 can be incident on the core 3810 without loss.

In addition, according to the embodiment, the guide unit 3200 may be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

In the case of conventional optical transmission modules and optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission module and optical transmission apparatus, there is a disadvantage that the manufacturing cost is increased due to the use of the additional optical means such as a lens, a prism, and a reflecting mirror, and there is a disadvantage that the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 3900 according to the embodiment, the optical alignment between the semiconductor device 3400 that provides the beam and the core 3810 of the optical cable 3800 can be completed by simply coupling the optical cable 3800 to the optical transmission module 3700. That is, by simply coupling the optical cable 3800 to the guide unit 3200 of the semiconductor device 3400, the optical alignment between the light emitting aperture 3130 and the core 3810 can be completed.

Accordingly, the optical transmission apparatus 3900 according to the embodiment has advantages of being small in size, easily providing optical alignment, reducing manufacturing cost, and improving productivity.

Then, the method of manufacturing the semiconductor device shown in FIG. 32 will now be described with reference to FIGS. 34 to 38. FIGS. 34 to 38 are views explaining another example of a method of manufacturing the semiconductor device according to an embodiment. In describing the method of manufacturing the semiconductor device according to the embodiment with reference to FIGS. 34 to 38, description overlapping with those described above may be omitted.

The method of manufacturing the semiconductor device shown in FIGS. 34 to 38 is an example in which the first guide unit 3210 and the second guide 3220 are formed of different materials in forming the guide unit 3200 according to the embodiment.

In describing the method of manufacturing the semiconductor device according to the embodiment with reference to FIGS. 34 to 38, the method of forming a board 3105, a light emitting structure 3100, an insulating layer 3140, a first electrode 3150, and a second electrode 3160 are well known, so that the description will be made mainly on the formation process of the guide unit 3200.

First, according to the method of manufacturing the semiconductor device of the embodiment, as shown in FIG. 34, a first guide unit 3210 may be formed on the structure that is formed of the board 3105, the light emitting structure 3100, the insulating layer 3140, the first electrode 3150, and the second electrode 3160. The first guide unit 3210 may be formed to comprise a first through hole TH11.

The first through hole TH11 may expose a part of an upper surface of the light emitting structure 3100. The first through hole TH11 may be larger than a width of the first conductivity type DBR layer 3110. The first through hole TH11 may be provided with a diameter larger than a width of the active layer 3115. The diameter of the first through hole TH11 may be several tens of micrometers to several hundreds of micrometers. For example, the diameter of the first through hole TH11 may be 100 micrometers to 200 micrometers.

The first guide unit 3210 may be formed, for example, through a photolithography process. The first guide unit 3210 may have a thickness of several micrometers. The first guide unit may be formed to have a thickness of, for example, 1 micrometer to 10 micrometers. For example, the first guide unit 3210 may be formed of a material selected from a group including an epoxy molding compound, a black epoxy molding compound, and a polyimide. In the case where the first guide unit 3210 is formed of polyimide, since the polyimide has a photosensitive function, patterning can be performed on the polyimide through a photolithography process without using an additional photoresist film, so that there is an advantage that the process can be easy.

Next, as shown in FIG. 35, a photoresist film 3250 may be formed on the first guide unit 3210. For example, the photoresist film 3250 may be formed through a photolithography process.

The photoresist film 3250 may comprise an opening provided in a region where the second guide unit 3220 is to be formed later. The photoresist film 3250 may be formed to have a thickness of several micrometers to several hundreds of micrometers. The thickness of the photoresist film 3250 may correspond to the thickness of the second guide unit 3220 to be formed later. The photoresist film 3250 may be formed to have a thickness of 1 micrometer to 600 micrometers, for example.

Then, as shown in FIG. 36, a temporary second guide unit 3220a may be formed on the photoresist film 3250. The temporary second guide unit 3220a may be formed at an upper portion of the photoresist film 3250 and at an opening provided by the photoresist film 3250. The temporary second guide unit 3220a may be formed of an insulating material. For example, the temporary second guide unit 3220a may be provided in at least one selected from a group including an epoxy molding compound, a black epoxy molding compound, and a polyimide.

Next, as shown in FIG. 37, an upper surface of the temporary second guide unit 3220a may be polished to form a second guide unit 3220 and the upper surface of the photoresist film 3250 may be exposed. For example, the polishing process may be performed such that the thickness of the second guide unit 3220 is 1 micrometer to 500 micrometers. When the second guide unit 3220 is formed of a black epoxy molding compound, there is an advantage that cross-talk between neighboring channels can be effectively prevented.

Then, as shown in FIG. 38, the guide unit 3200 may be formed on the light emitting structure 3100 through removal of the photoresist film 3250. The guide unit 3200 may comprise the first guide unit 3210 and the second guide unit 3220. The guide unit 3200 may comprise the first guide unit 3210 providing a first through hole TH11 and the second guide unit 3220 providing a second through hole TH12. The light emitting aperture 3130 of the light emitting structure 3100 may be exposed through the first through hole TH11 of the first guide unit 3210. In addition, the light emitting aperture 3130 of the light emitting structure 3100 and a part of an upper surface of the first guide unit 3210 may be exposed through the second through hole TH12 of the second guide unit 3220.

As described above, according to the embodiment, the guide unit 3200 can be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

Next, another example of a method of manufacturing the semiconductor device shown in FIG. 32 will be described with reference to FIGS. 39 to 46. FIGS. 39 to 46 are views explaining another example of the method of manufacturing the semiconductor device according to the embodiment. In describing the method of manufacturing the semiconductor device according to the embodiment with reference to FIGS. 39 to 46, description overlapping with those described above may be omitted.

In describing the method of manufacturing the semiconductor device according to the embodiment with reference to FIGS. 39 to 46, the method of forming a board 3105, a light emitting structure 3100, an insulating layer 3140, a first electrode 3150, and a second electrode 3160 are well known, so that the description will be made mainly on the formation process of the guide unit 3200.

First, according to the method of manufacturing the semiconductor device of the embodiment, as shown in FIG. 39, a first photoresist film 3245 may be formed on the structure that is formed of the board 3105, the light emitting structure 3100, the insulating layer 3140, the first electrode 3150, and the second electrode 3160. For example, the first photoresist film 3245 may be formed through a photolithography process.

The first photoresist film 3245 may comprise an opening provided in a region where the first guide unit 3210 is to be formed later. The first photoresist film 3245 may be formed to have a thickness of several micrometers to several hundreds of micrometers. The thickness of the first photoresist film 3245 may be formed corresponding to the thickness of the first guide unit 3210 to be formed later. The first photoresist film 3245 may be formed to have a thickness of several micrometers to several tens of micrometers, for example.

Then, as shown in FIG. 40, a temporary first guide unit 3210a may be formed on the first photoresist film 3245. The temporary first guide unit 3210a may be formed at an upper portion of the first photoresist film 3245 and at an opening provided by the first photoresist film 3245. The temporary first guide unit 3210a may be formed of an insulating material. For example, the temporary first guide unit 3210a may be provided in at least one selected from a group including an epoxy molding compound, a black epoxy molding compound, and a polyimide.

Next, as shown in FIG. 41, an upper surface of the temporary first guide unit 3210a may be polished to form a first guide unit 3210, and the upper surface of the first photoresist film 3245 may be exposed. For example, the polishing process may be performed such that the thickness of the first guide unit 3210 is several micrometers to several tens of micrometers. Accordingly, the first guide unit 3210 providing a first through hole TH11 may be formed.

The first through hole TH11 may expose a part of an upper surface of the light emitting structure 3100. The first through hole TH11 may be larger than a width of the first conductivity type DBR layer 3110. The first through hole TH11 may be provided with a diameter larger than a width of the active layer 3115. The diameter of the first through hole TH11 may be several tens of micrometers to several hundreds of micrometers. For example, the diameter of the first through hole TH11 may be 100 micrometers to 200 micrometers.

Then, as shown in FIG. 43, a second photoresist film 3255 may be formed on the first guide unit 3210. For example, the second photoresist film 3255 may be formed through a photolithography process.

The second photoresist film 3255 may comprise an opening provided in a region where the second guide unit 3220 is to be formed later. The second photoresist film 3255 may be formed to have a thickness of several micrometers to several hundreds of micrometers. The thickness of the second photoresist film 3255 may correspond to the thickness of the second guide unit 3220 to be formed later. The second photoresist film 3255 may be formed to have a thickness of several micrometers to several hundreds of micrometers. For example, the second photoresist film 3255 may be formed to have a thickness of 1 micrometer to 600 micrometers.

Then, as shown in FIG. 44, a temporary second guide unit 3220a may be formed on the second photoresist film 3255. The temporary second guide unit 3220a may be formed at an upper portion of the second photoresist film 3255 and at an opening provided by the second photoresist film 3255. The temporary second guide unit 3220a may be formed of an insulating material. For example, the temporary second guide unit 3220a may be provided in at least one selected from a group including an epoxy molding compound, a black epoxy molding compound, and a polyimide.

Next, as shown in FIG. 45, an upper surface of the temporary second guide unit 3220a may be polished to form a second guide unit 3220, and the upper surface of the second photoresist film 3255 may be exposed. The polishing process may be performed such that the thickness of the second guide unit 3220 is several micrometers to several hundreds of micrometers. For example, the polishing process may be performed such that the thickness of the second guide unit 3220 is 1 micrometer to 500 micrometers.

Then, as shown in FIG. 46, the guide unit 3200 may be formed on the light emitting structure 3100 through removal of the second photoresist film 3255. The guide unit 3200 may comprise the first guide unit 3210 and the second guide unit 3220. The guide unit 3200 may comprise the first guide unit 3210 providing a first through hole TH11 and the second guide unit 3220 providing a second through hole TH12. The light emitting aperture 3130 of the light emitting structure 3100 may be exposed through the first through hole TH11 of the first guide unit 3210. The light emitting aperture 3130 of the light emitting structure 3100 and a part of an upper surface of the first guide unit 3210 may be exposed through the second through hole TH12 of the second guide unit 3220.

Meanwhile, according to the embodiment, when the first guide unit 3210 and the second guide unit 3220 are formed of black epoxy molding compound, there is an advantage that cross-talk between neighboring channels can be effectively prevented.

As described above, according to the embodiment, the guide unit 3200 can be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within a few micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

Meanwhile, FIG. 47 shows another example of an optical transmission apparatus according to an embodiment. Referring to FIG. 47, in describing the semiconductor device, the optical transmission module, and the optical transmission apparatus according to the embodiment, description overlapping with those described above may be omitted.

The optical transmission apparatus 3900 according to the embodiment may comprise an optical transmission module 3700 and an optical cable 3800 as shown in FIG. 47. The optical cable 3800 may comprise a core 3810 and a cladding 3820 disposed around the core 3810.

The optical transmission module 3700 according to the embodiment may comprise a circuit board 3300 and a semiconductor device 3400 as shown in FIG. 47. The semiconductor device 3400 may be disposed on the circuit board 3300. The semiconductor device 3400 may be electrically connected to the circuit board 3300.

The semiconductor device 3400 according to the embodiment may comprise a light emitting structure 3100, a first electrode 3150, a second electrode 3160, a guide unit 3200, and a support 3230 as shown in FIG. 47.

The light emitting structure 3100 may comprise a first conductivity type DBR layer 3110, an active layer 3115, and a second conductivity type DBR layer 3120. The circuit board 3300 may be electrically connected to the first conductivity type DBR layer 3110 and the second conductivity type DBR layer 3120. The circuit board 3300 may be electrically connected to the first conductivity type DBR layer 3110 through the first electrode 3150. The circuit board 3300 may be electrically connected to the second conductivity type DBR layer 3120 through the second electrode 3160.

The circuit board 3300 may comprise a circuit to provide an electrical signal to the semiconductor device 3400. The circuit board 3300 may provide a signal provided from the outside to the semiconductor device 3400. In this way, the driving of the semiconductor device 3400 can be controlled by the electrical connection between the circuit board 3300 and the semiconductor device 3400.

According to the embodiment, the guide unit 3200 may be disposed on the light emitting structure 3100. The guide unit 3200 may be disposed on an upper surface of the light emitting structure 3100. The light emitting structure 3100 may comprise a light emitting aperture 3130 that emits light in a direction perpendicular to the upper surface of the light emitting structure 3100. For example, the light emitting aperture 3130 may be defined as a region where light is emitted upward from the upper surface of the light emitting structure 3100.

The guide unit 3200 according to the embodiment may comprise a through hole TH1. The through hole TH1 may be provided larger than a diameter of the light emitting aperture 3130. The through hole TH1 may be provided on the light emitting aperture 3130. The through hole TH1 may expose a part of an upper surface of the light emitting structure 3100. The through hole TH1 may be larger than a width of the first conductivity type DBR layer 3110. The through hole TH1 may be provided with a diameter larger than a width of the active layer 3115.

According to the embodiment, the diameter of the light emitting aperture 3130 may be provided with several micrometers to several tens of micrometers. In addition, the diameter of the through hole TH1 provided in the guide unit 3200 may be provided with several tens of micrometers to several hundreds of micrometers. Further, the thickness of the guide unit 3200 may be provided with several micrometers to several hundreds of micrometers.

The support 3230 according to the embodiment may be disposed on the light emitting structure 3100. The support 3230 may be disposed on the light emitting structure 3100 so as to form a closed loop. The support 3230 may be disposed on the first electrode 3150. For example, the support 3230 may be disposed on the first electrode 3150 so ad to form a closed loop.

The support 3230 may be provided larger than the diameter of the light emitting aperture 3130. The support 3230 may be disposed on the light emitting structure 3100 to have a closed loop larger than the diameter of the light emitting aperture 3130. The support 3230 may be provided smaller than the diameter of the through hole TH1. The support 3230 may be disposed on the light emitting structure 3100 so as to have a closed loop smaller than the diameter of the through hole TH1.

According to the embodiment, the optical cable 3800 may be coupled to the guide unit 3200 of the optical transmission module 3700. A portion of the optical cable 3800 may be disposed in the through hole TH1 of the guide unit 3200. The optical transmission apparatus 3900 according to the embodiment may comprise the optical cable 3800 coupled to the through hole TH1 as shown in FIG. 47. For example, the core 3810 of the optical cable 3800 may be disposed on and arranged in alignment with the light emitting aperture 3130 of the semiconductor device 3400. The diameter of the core 3810 may be greater than the diameter of the light emitting aperture 3130 of the light emitting structure 3110. For example, the optical cable 3800 may be coupled to the guide unit 3200 by an adhesive layer. The adhesive layer may be provided between an inner circumferential surface of the guide unit 3200 and an outer circumferential surface of the optical cable 3800. The adhesive layer may be selected from a group including, for example, an ultraviolet curable adhesive layer and a thermosetting adhesive layer.

Meanwhile, the support 3230 can support the optical cable 3800. The support 3230 may support a lower surface of the core 3810 or a lower surface of the cladding 3820. An adhesive layer may be used in the process of coupling the optical cable 3800 to the guide unit 3200, and the adhesive layer may flow down along an inner wall of the guide unit 3200. At this time, a barrier is formed between the inner wall of the guide unit 3200 and the light emitting aperture 3130 by the support 3230 so that the adhesive layer can be prevented from flowing into the light emitting aperture 3130. Accordingly, it is possible to prevent the beam from being affected by the adhesive layer when emitting the beam from the light emitting aperture 3130.

The support 3230 may be disposed on the first electrode 3150. The support 3230 may be disposed on the insulating layer 3140. The support 3230 may be disposed in contact with an upper surface of the first electrode 3150. The support 3230 may be provided with a thickness of several micrometers, for example. The support 3230 may be formed of an insulating material. Further, the support 3230 may be formed of a metal.

When the optical cable 3800 is coupled to the guide unit 3200, the coupling position of the optical cable 3800 can be determined by the support 3230. The position where the optical cable 3800 is coupled to the guide unit 3200 can be easily determined by the support 3230. According the embodiment, when the optical cable 3800 is coupled to the guide unit 3210, the optical cable 3800 can be inserted until the optical cable 3800 is blocked by the upper surface of the support 3230, so that the arrangement position of the optical cable 3800 can be clearly determined. Thus, the distance from the light emitting surface of the semiconductor device 3400 to the beam incident surface of the core 3810 can be clearly determined. In addition, the degree of parallelism between the beam incident surface of the core 3810 and the light emitting surface of the semiconductor device 3400 can be uniformly maintained by the support 3230.

For example, the core 3810 of the optical cable 3800 may be disposed on and arranged in alignment with the light emitting aperture 3130 of the semiconductor device 3400. The diameter of the core 3810 may be greater than the diameter of the light emitting aperture 3130 of the light emitting structure 3110. For example, the optical cable 3800 may be coupled to the guide unit 3200 by an adhesive layer. The adhesive layer may be provided between an inner circumferential surface of the guide unit 3200 and an outer circumferential surface of the optical cable 3800. The adhesive layer may be selected from a group including, for example, an ultraviolet curable adhesive layer and a thermosetting adhesive layer. It is possible to prevent the adhesive layer from flowing into a region of the light emitting aperture 3130 by the support 3230.

The beam incident surface of the core 3810 may be disposed parallel to the beam emitting surface of the semiconductor device 3400. The beam incident surface of the core 3810 may be disposed parallel to the beam emitting surface of the light emitting aperture 3130. The distance l from the beam emitting surface of the semiconductor device 3400 to the beam incident surface of the core 3810 may be several micrometers to several tens of micrometers. For example, the distance l from the beam emitting surface of the semiconductor device 3400 to the beam incident surface of the core 3810 may be provided to be not more than ten micrometers. In other words, the distance l from the beam emitting surface of the light emitting aperture 3130 to the beam incident surface of the core 3810 may be several micrometers to several tens of micrometers.

According to the optical transmission apparatus 3900 of the embodiment, since the beam incident surface of the core 3810 and the beam emitting surface of the light emitting aperture 3130 are disposed in parallel to each other, an additional optical means such as a reflecting mirror or a prism for reflecting the beam emitted from the light emitting aperture 3130 toward in a direction in which the core 3810 is positioned is not needed.

In addition, according to the optical transmission apparatus 3900 of the embodiment, since the distance l from the beam emitting surface of the light emitting aperture 3130 to the beam incident surface of the core 3810 is provided with a short distance of several micrometers to several tens of micrometers so that all of the beam emitted from the light emitting aperture 3130 can be incident on the beam incident surface of the core 3810, an additional optical means such as a lens for focusing beam to the core 3810 is not needed.

The distance l from the beam emitting surface of the semiconductor device 3400 to the beam incident surface of the core 3810 can be determined by the diameter of the beam emitting surface of the light emitting aperture 3130, the divergence angle of the beam emitted from the light emitting aperture 3130, and the diameter of the core 3810 of the optical cable 3800 which is disposed in the second through hole TH12 of the guide unit 3200 and configured to receive the beam emitted from the semiconductor device 3400.

The distance l from the beam emitting surface of the semiconductor device 3400 to the beam incident surface of the core 3810 can be set such that the maximum distance may be limited so that all of the beam emitted from the light emitting aperture 3130 is incident on the core 3810 of the optical cable 3800.

As described above, according to the optical transmission apparatus 3900 of the embodiment, the distance l from the light emitting surface of the light emitting aperture 3130 to the beam incident surface of the core 3810 can be set smaller than the maximum distance x calculated according to [Equation 1]. Accordingly, all of the beam emitted from the light emitting aperture 3130 can be incident on the core 3810 without loss.

In addition, according to the embodiment, the guide unit 3200 may be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

In the case of conventional optical transmission modules and optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission module and optical transmission apparatus, there is a disadvantage that the manufacturing cost is increased due to the use of the additional optical means such as a lens, a prism, and a reflecting mirror, and the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 3900 according to the embodiment, the optical alignment between the semiconductor device 3400 that provides the beam and the core 3810 of the optical cable 3800 can be completed by simply coupling the optical cable 3800 to the optical transmission module 3700. That is, by simply coupling the optical cable 3800 to the guide unit 3200 of the semiconductor device 3400, the optical alignment between the light emitting aperture 3130 and the core 3810 can be completed.

Accordingly, the optical transmission apparatus 3900 according to the embodiment has advantages of being small in size, easily providing optical alignment, reducing manufacturing cost, and improving productivity.

Meanwhile, FIG. 48 is a view showing still another example of an optical transmission apparatus according to an embodiment. Referring to FIG. 48, in describing the semiconductor device, the optical transmission module, and the optical transmission apparatus according to the embodiment, description overlapping with those described above may be omitted.

The optical transmission apparatus 3900 according to the embodiment may comprise an optical transmission module 3700 and an optical cable 3800, as shown in FIG. 48. The optical cable 3800 may comprise a core 3810 and a cladding 3820 disposed around the core 3810.

The optical transmission module 3700 according to the embodiment may comprise a circuit board 3300 and a semiconductor device 3400 as shown in FIG. 48. The semiconductor device 3400 may be disposed on the circuit board 3300. The semiconductor device 3400 may be electrically connected to the circuit board 3300.

The semiconductor device 3400 according to the embodiment may comprise a light emitting structure 3100, a first electrode 3150, a second electrode 3160, and a guide unit 3200 as shown in FIG. 48.

The light emitting structure 3100 may comprise a first conductivity type DBR layer 3110, an active layer 3115, and a second conductivity type DBR layer 3120. The circuit board 3300 may be electrically connected to the first conductivity type DBR layer 3110 and the second conductivity type DBR layer 3120. The circuit board 3300 may be electrically connected to the first conductivity type DBR layer 3110 through the first electrode 3150. The circuit board 3300 may be electrically connected to the second conductivity type DBR layer 3120 through the second electrode 3160.

The circuit board 3300 may comprise a circuit to provide an electrical signal to the semiconductor device 3400. The circuit board 3300 may provide a signal provided from the outside to the semiconductor device 3400. In this way, the driving of the semiconductor device 3400 can be controlled by the electrical connection between the circuit board 3300 and the semiconductor device 3400.

According to the embodiment, the guide unit 3200 may be disposed on the light emitting structure 3100. The guide unit 3200 may be disposed on an upper surface of the light emitting structure 3100. The light emitting structure 3100 may comprise a light emitting aperture 3130 that emits light in a direction perpendicular to the upper surface of the light emitting structure 3100. For example, the light emitting aperture 3130 may be defined as a region where light is emitted upward from the upper surface of the light emitting structure 3100.

The guide unit 3200 according to the embodiment may comprise a through hole TH1. A diameter of an upper region of the through hole TH1 may be larger than a diameter of a lower region of the through hole TH1. The diameter of the through hole TH1 may be provided to be reduced from the upper region toward the lower region. The diameter of the upper region of the through hole TH1 is larger than the diameter of the lower region so that the optical cable 3800 can be easily coupled to the guide unit 3200. For example, the diameter of the upper region of the through hole TH1 may be larger than a diameter of the optical cable 3800.

The lower region of the through hole TH1 may be provided larger than a diameter of the light emitting aperture 3130. The lower region of the through hole TH1 may be provided on the light emitting aperture 3130. The lower region of the through hole TH1 may expose a part of the upper surface of the light emitting structure 3100. The lower region of the through hole TH1 may be provided larger than a width of the first conductivity type DBR layer 3110. The lower region of the through hole TH1 may be provided with a diameter larger than a width of the active layer 3115.

According to the embodiment, the diameter of the light emitting aperture 3130 may be provided with several micrometers to several tens of micrometers. In addition, the diameter of the lower region of the through hole TH1 provided in the guide unit 3200 may be provided with several tens of micrometers to several hundreds of micrometers. Further, the thickness of the guide unit 3200 may be provided with several micrometers to several hundreds of micrometers.

According to the embodiment, the optical cable 3800 may be coupled to the guide unit 3200 of the optical transmission module 3700. A portion of the optical cable 3800 may be disposed in the through hole TH1 of the guide unit 3200. The optical transmission apparatus 3900 according to the embodiment may comprise the optical cable 3800 coupled to the through hole TH1 as shown in FIG. 48. For example, the core 3810 of the optical cable 3800 may be disposed on and arranged in alignment with the light emitting aperture 3130 of the semiconductor device 3400. The diameter of the core 3810 may be greater than the diameter of the light emitting aperture 3130 of the light emitting structure 3110. For example, the optical cable 3800 may be coupled to the guide unit 3200 by an adhesive layer. The adhesive layer may be provided between an inner circumferential surface of the guide unit 3200 and an outer circumferential surface of the optical cable 3800. The adhesive layer may be selected from a group including, for example, an ultraviolet curable adhesive layer and a thermosetting adhesive layer.

The beam incident surface of the core 3810 may be disposed parallel to the beam emitting surface of the semiconductor device 3400. The beam incident surface of the core 3810 may be disposed parallel to the beam emitting surface of the light emitting aperture 3130. The distance l from the beam emitting surface of the semiconductor device 3400 to the beam incident surface of the core 3810 may be several micrometers to several tens of micrometers. For example, the distance l from the beam emitting surface of the semiconductor device 3400 to the beam incident surface of the core 3810 may be provided to be not more than ten micrometers. In other words, the distance l from the beam emitting surface of the light emitting aperture 3130 to the beam incident surface of the core 3810 may be several micrometers to several tens of micrometers.

According to the optical transmission apparatus 3900 of the embodiment, since the beam incident surface of the core 3810 and the beam emitting surface of the light emitting aperture 3130 are disposed in parallel to each other, an additional optical means such as a reflecting mirror or a prism for reflecting the beam emitted from the light emitting aperture 3130 toward in a direction in which the core 3810 is positioned is not needed.

In addition, according to the optical transmission apparatus 3900 of the embodiment, since the distance l from the beam emitting surface of the light emitting aperture 3130 to the beam incident surface of the core 3810 is provided with a short distance of several micrometers to several tens of micrometers so that all of the beam emitted from the light emitting aperture 3130 can be incident on the beam incident surface of the core 3810, an additional optical means such as a lens for focusing beam to the core 3810 is not needed.

The distance l from the beam emitting surface of the semiconductor device 3400 to the beam incident surface of the core 3810 can be determined by the diameter of the beam emitting surface of the light emitting aperture 3130, the divergence angle of the beam emitted from the light emitting aperture 3130, and the diameter of the core 3810 of the optical cable 3800 that is disposed in the through hole TH1 of the guide unit 3200 and configured to receive the beam emitted from the semiconductor device 3400.

The distance l from the beam emitting surface of the semiconductor device 3400 to the beam incident surface of the core 3810 can be set such that the maximum distance may be limited so that all of the beam emitted from the light emitting aperture 3130 is incident on the core 3810 of the optical cable 3800.

As described above, according to the optical transmission apparatus 3900 of the embodiment, the distance l from the light emitting surface of the light emitting aperture 3130 to the beam incident surface of the core 3810 can be set smaller than the maximum distance x calculated according to [Equation 1]. Accordingly, all of the beam emitted from the light emitting aperture 3130 can be incident on the core 3810 without loss.

In addition, according to the embodiment, the guide unit 3200 may be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment con control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

In the case of conventional optical transmission modules and optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission module and optical transmission apparatus, there is a disadvantage that the manufacturing cost is increased due to the use of the additional optical means such as a lens, a prism, and a reflecting mirror, and the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 3900 according to the embodiment, the optical alignment between the semiconductor device 3400 that provides the beam and the core 3810 of the optical cable 3800 can be completed by simply coupling the optical cable 3800 to the optical transmission module 3700. That is, by simply coupling the optical cable 3800 to the guide unit 3200 of the semiconductor device 3400, the optical alignment between the light emitting aperture 3130 and the core 3810 can be completed.

Accordingly, the optical transmission apparatus 3900 according to the embodiment has advantages of being small in size, easily providing optical alignment, reducing manufacturing cost, and improving productivity.

Meanwhile, FIG. 49 is a view showing still another example of an optical transmission apparatus according to an embodiment. In describing the optical transmission apparatus according to the embodiment with reference to FIG. 49, description overlapping with those described above may be omitted.

The optical transmission apparatus 3900 according to the embodiment may comprise an optical transmission module 3700 and an optical cable 3800 as shown in FIG. 49. The optical cable 3800 may comprise a core 3810 and a cladding 3820 disposed around the core 3810.

The optical transmission module 3700 according to the embodiment may comprise a circuit board 3300 and a semiconductor device 3400 as shown in FIG. 49. The semiconductor device 3400 may be disposed on the circuit board 3300. The semiconductor device 3400 may be electrically connected to the circuit board 3300.

The semiconductor device 3400 according to the embodiment may comprise a light emitting structure 3100, a first electrode 3150, a second electrode 3160, and a guide unit 3200 as shown in FIG. 49.

The light emitting structure 3100 may comprise a first conductivity type DBR layer 3110, an active layer 3115, and a second conductivity type DBR layer 3120. The circuit board 3300 may be electrically connected to the first conductivity type DBR layer 3110 and the second conductivity type DBR layer 3120. The circuit board 3300 may be electrically connected to the first conductivity type DBR layer 3110 through the first electrode 3150. The circuit board 3300 may be electrically connected to the second conductivity type DBR layer 3120 through the second electrode 3160.

The circuit board 3300 may comprise a circuit to provide an electrical signal to the semiconductor device 3400. The circuit board 3300 may provide a signal provided from the outside to the semiconductor device 3400. In this way, the driving of the semiconductor device 3400 can be controlled by the electrical connection between the circuit board 3300 and the semiconductor device 3400.

According to the embodiment, the guide unit 3200 may be disposed on the light emitting structure 3100. The guide unit 3200 may be disposed on an upper surface of the light emitting structure 3100. The light emitting structure 3100 may comprise a light emitting aperture 3130 that emits light in a direction perpendicular to the upper surface of the light emitting structure 3100. For example, the light emitting aperture 3130 may be defined as a region where light is emitted upward from the upper surface of the light emitting structure 3100.

The guide unit 3200 according to the embodiment may comprise a through hole TH1. A diameter of an upper region of the through hole TH1 may be smaller than a diameter of a lower region of the through hole TH1. The diameter of the through hole TH1 may be provided to be increased from the upper region toward the lower region. The diameter of the upper region of the through hole TH1 is smaller than the diameter of the lower region so that a space can be provided between an inner peripheral surface of the lower region of the through hole TH1 and an outer peripheral surface of the optical cable 3800. For example, the diameter of the lower region of the through hole TH1 may be larger than the diameter of the optical cable 3800.

The lower region of the through hole TH1 may be provided larger than a diameter of the light emitting aperture 3130. The lower region of the through hole TH1 may be provided on the light emitting aperture 3130. The lower region of the through hole TH1 may expose a part of the upper surface of the light emitting structure 3100. The lower region of the through hole TH1 may be provided larger than a width of the first conductivity type DBR layer 3110. The lower region of the through hole TH1 may be provided with a diameter larger than a width of the active layer 3115.

According to the embodiment, the diameter of the light emitting aperture 3130 may be provided with several micrometers to several tens of micrometers. In addition, the diameter of the lower region of the through hole TH1 provided in the guide unit 3200 may be provided with several tens of micrometers to several hundreds of micrometers. Further, the thickness of the guide unit 3200 may be provided with several micrometers to several hundreds of micrometers.

According to the embodiment, the optical cable 3800 may be coupled to the guide unit 3200 of the optical transmission module 3700. A portion of the optical cable 3800 may be disposed in the through hole TH1 of the guide unit 3200. The optical transmission apparatus 3900 according to the embodiment may comprise the optical cable 3800 coupled to the through hole TH1 as shown in FIG. 49. For example, the core 3810 of the optical cable 3800 may be disposed on and arranged in alignment with the light emitting aperture 3130 of the semiconductor device 3400. The diameter of the core 3810 may be greater than the diameter of the light emitting aperture 3130 of the light emitting structure 3110. For example, the optical cable 3800 may be coupled to the guide unit 3200 by an adhesive layer. The adhesive layer may be provided between an inner circumferential surface of the guide unit 3200 and an outer circumferential surface of the optical cable 3800. The adhesive layer may be selected from a group including, for example, an ultraviolet curable adhesive layer and a thermosetting adhesive layer. At this time, in the process of coupling the optical cable 3800 to the guide unit 3200, there may occur a case where the adhesive layer may flow down along an inner wall of the guide unit 3200. At this time, since a space is provided between the inner peripheral surface of the lower region of the through hole TH1 and the outer peripheral surface of the optical cable 3800, the adhesive layer can be prevented from flowing into the light emitting aperture 3130. Accordingly, it is possible to prevent the beam being affected by the adhesive layer when emitting the beam from the light emitting aperture 3130.

The beam incident surface of the core 3810 may be disposed parallel to the beam emitting surface of the semiconductor device 3400. The beam incident surface of the core 3810 may be disposed parallel to the beam emitting surface of the light emitting aperture 3130. The distance l from the beam emitting surface of the semiconductor device 3400 to the beam incident surface of the core 3810 may be several micrometers to several tens of micrometers. For example, the distance l from the beam emitting surface of the semiconductor device 3400 to the beam incident surface of the core 3810 may be provided to be not more than ten micrometers. In other words, the distance l from the beam emitting surface of the light emitting aperture 3130 to the beam incident surface of the core 3810 may be several micrometers to several tens of micrometers.

According to the optical transmission apparatus 3900 of the embodiment, since the beam incident surface of the core 3810 and the beam emitting surface of the light emitting aperture 3130 are disposed in parallel to each other, an additional optical means such as a reflecting mirror or a prism for reflecting the beam emitted from the light emitting aperture 3130 toward in a direction in which the core 3810 is positioned is not needed.

In addition, according to the optical transmission apparatus 3900 of the embodiment, since the distance l from the beam emitting surface of the light emitting aperture 3130 to the beam incident surface of the core 3810 is provided with a short distance of several micrometers to several tens of micrometers so that all of the beam emitted from the light emitting aperture 3130 can be incident on the beam incident surface of the core 3810, an additional optical means such as a lens for focusing beam to the core 3810 is not needed.

The distance l from the beam emitting surface of the semiconductor device 3400 to the beam incident surface of the core 3810 can be determined by the diameter of the beam emitting surface of the light emitting aperture 3130, the divergence angle of the beam emitted from the light emitting aperture 3130, and the diameter of the core 3810 of the optical cable 3800 which is disposed in the second through hole TH12 of the guide unit 3200 and configured to receive the beam emitted from the semiconductor device 3400.

The distance l from the beam emitting surface of the semiconductor device 3400 to the beam incident surface of the core 3810 can be set such that the maximum distance may be limited so that all of the beam emitted from the light emitting aperture 3130 is incident on the core 3810 of the optical cable 3800.

As described above, according to the optical transmission apparatus 3900 of the embodiment, the distance l from the light emitting surface of the light emitting aperture 3130 to the beam incident surface of the core 3810 can be set smaller than the maximum distance x calculated according to [Equation 1]. Accordingly, all of the beam emitted from the light emitting aperture 3130 can be incident on the core 3810 without loss.

In addition, according to the embodiment, the guide unit 3200 may be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

In the case of conventional optical transmission modules and optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission module and optical transmission apparatus, there is a disadvantage that the manufacturing cost is increased due to the use of the additional optical means such as a lens, a prism, and a reflecting mirror, and the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 3900 according to the embodiment, the optical alignment between the semiconductor device 3400 that provides the beam and the core 3810 of the optical cable 3800 can be completed by simply coupling the optical cable 3800 to the optical transmission module 3700. That is, by simply coupling the optical cable 3800 to the guide unit 3200 of the semiconductor device 3400, the optical alignment between the light emitting aperture 3130 and the core 3810 can be completed.

Accordingly, the optical transmission apparatus 3900 according to the embodiment has advantages of being small in size, easily providing optical alignment, reducing manufacturing cost, and improving productivity.

Meanwhile, FIG. 50 is a view showing still another example of an optical transmission apparatus according to an embodiment. Referring to FIG. 50, in describing the semiconductor device, the optical transmission module, and the optical transmission apparatus according to the embodiment, description overlapping with those described above may be omitted.

The optical transmission apparatus 3900 according to the embodiment may comprise an optical transmission module 3700 and an optical cable 3800 as shown in FIG. 50. The optical cable 3800 may comprise a core 3810 and a cladding 3820 disposed around the core 3810. The optical cable 3800 may be coupled to the optical transmission module 3700. The optical cable 3800 may be coupled to the optical transmission module 3700 to receive a beam emitted from the optical transmission module 3700.

The optical transmission module 3700 according to the embodiment may comprise a circuit board 3300 and a semiconductor device 3400, as shown in FIG. 50. The semiconductor device 3400 may be disposed on the circuit board 3300. The semiconductor device 3400 may be electrically connected to the circuit board 3300.

The semiconductor device 3400 according to the embodiment may be any one of the semiconductor devices according to the embodiment described with reference to FIGS. 1 to 49. For example, the semiconductor device 3400 according to the embodiment may comprise the light emitting structure 3100, the first electrode 3150, the second electrode 3160, and the guide unit 3200, as shown in FIG. 50.

The light emitting structure 3100 may comprise a first conductivity type DBR layer 3110, an active layer 3115, and a second conductivity type DBR layer 3120. The circuit board 3300 may be electrically connected to the first conductivity type DBR layer 3110 and the second conductivity type DBR layer 3120. The circuit board 3300 may be electrically connected to the first conductivity type DBR layer 3110 through the first electrode 3150. The circuit board 3300 may be electrically connected to the second conductivity type DBR layer 3120 through the second electrode 3160.

The circuit board 3300 may comprise a circuit to provide an electrical signal to the semiconductor device 3400. The circuit board 3300 may provide a signal provided from the outside to the semiconductor device 3400. In this way, the driving of the semiconductor device 3400 can be controlled by the electrical connection between the circuit board 3300 and the semiconductor device 3400.

The optical transmission apparatus 3900 according to the embodiment may further comprise a main board 3320 disposed under the circuit board 3300 and the optical cable 3800. The circuit board 3300 may be supported by the main board 3320. For example, a side of the circuit board 3300 may be supported by the main board 3320. The main board 3320 and the circuit board 3300 may be electrically connected to each other. An electrical signal may be supplied to the circuit board 3300 from the main board 3320. For example, a signal supplied from the main board 3320 may be transmitted to the circuit board 3300 through the flexible board 3310. For example, the flexible board 3310 may be electrically connected to the circuit board 3300 through an anisotropic conductive film (ACF). In addition, the flexible board 3310 may be electrically connected to the main board 3320 through an anisotropic conductive film (ACF).

Meanwhile, the optical transmission apparatus 3900 according to the embodiment may further comprise a cable support 3330 disposed between the optical cable 3800 and the main board 3320. The cable support 3330 can support the optical cable 3800. Thus, according to the embodiment, the optical cable 3800 coupled to the optical transmission module 3700 can be stably disposed on the main board 3320.

According to the embodiment, the optical cable 3800 may be coupled to the guide unit 3200 of the optical transmission module 3700. For example, the core 3810 of the optical cable 3800 may be disposed on and arranged in alignment with the light emitting aperture 3130 of the semiconductor device 3400. The diameter of the core 3810 may be greater than the diameter of the light emitting aperture 3130 of the light emitting structure 3110. For example, the optical cable 3800 may be coupled to the guide unit 3200 by an adhesive layer.

According to the optical transmission apparatus 3900 of the embodiment, since the beam incident surface of the core 3810 and the beam emitting surface of the light emitting aperture 3130 are disposed in parallel to each other, an additional optical means such as a reflecting mirror or a prism for reflecting the beam emitted from the light emitting aperture 3130 toward in a direction in which the core 3810 is positioned is not needed.

In addition, according to the optical transmission apparatus 3900 of the embodiment, since the distance l from the beam emitting surface of the light emitting aperture 3130 to the beam incident surface of the core 3810 is provided with a short distance of several micrometers to several tens of micrometers so that all of the beam emitted from the light emitting aperture 3130 can be incident on the beam incident surface of the core 3810, an additional optical means such as a lens for focusing beam to the core 3810 is not needed.

According to the optical transmission apparatus 3900 of the embodiment, the distance l from the light emitting surface of the light emitting aperture 3130 to the beam incident surface of the core 3810 can be set smaller than the maximum distance x calculated according to [Equation 1]. Accordingly, all of the beam emitted from the light emitting aperture 3130 can be incident on the core 3810 without loss.

In addition, according to the embodiment, the guide unit 3200 may be formed through a photolithography process or the like, and a process error in alignment can be managed within a few micrometers. For example, the photolithography process error can be managed at a level of 1 micrometer to 3 micrometers.

As described above, the optical transmission apparatus 3900 according to the embodiment can control a mechanical alignment error within a few micrometers between the semiconductor device 3400 and the core 3810 of the optical cable 3800. That is, in the optical transmission apparatus 3900 according to the embodiment, the alignment error between the central axis of the guide unit 3200 provided in the optical transmission module 3700 and the central axis of the beam emitting surface of the light emitting aperture 3130 can be controlled within several micrometers. Therefore, the alignment error between the central axis of the core 3810 disposed in the guide unit 3200 and the central axis of the beam emitting surface of the light emitting aperture 3130 can be controlled within a few micrometers. The distance l from the beam emitting surface of the semiconductor device 3400 to the beam incident surface of the core 3810 is controlled to be equal to or less than a distance of several tens of micrometers, so that the beam emitted from the semiconductor device 3400 can be provided without loss to the beam incident surface of the core 3810.

Therefore, according to the optical transmission apparatus 3900 of the embodiment, the optical alignment between the semiconductor device 3400 and the core 3810 of the optical cable 3800 can be performed only by coupling the optical cable 3800 to the guide unit 3200. That is, the optical transmission apparatus 3900 according to the embodiment can provide a kind of self-alignment effect by coupling between the optical transmission module 3700 and the core 3810 of the optical cable 3800.

In the case of conventional optical transmission modules and optical transmission apparatus, an additional optical means such as a lens, a prism, and a reflecting mirror is required for optical alignment between a semiconductor device emitting a beam and a core of an optical cable receiving the beam. Accordingly, in the case of the conventional optical transmission module and optical transmission apparatus, there is a disadvantage that the manufacturing cost is increased due to the use of the additional optical means such as a lens, a prism, and a reflecting mirror, and the total size of the module must be large. Further, since a procedure for performing optical alignment between the semiconductor device and the core through the optical means must be accompanied, there is a disadvantage that the manufacturing process takes much time and the productivity is lowered.

However, as described above, according to the optical transmission apparatus 3900 according to the embodiment, the optical alignment between the semiconductor device 3400 that provides the beam and the core 3810 of the optical cable 3800 can be completed by simply coupling the optical cable 3800 to the optical transmission module 3700. That is, by simply coupling the optical cable 3800 to the guide unit 3200 of the semiconductor device 3400, the optical alignment between the light emitting aperture 3130 and the core 3810 can be completed.

Accordingly, the optical transmission apparatus 3900 according to the embodiment has advantages of being small in size, easily providing optical alignment, reducing manufacturing cost, and improving productivity.

Meanwhile, FIG. 51 is a view showing another example of an optical transmission module according to an embodiment. Referring to FIG. 51, in the description of the optical transmission module according to the embodiment, description overlapping with those described above may be omitted.

The optical transmission module 3700 shown in FIG. 51 shows a case in which the optical transmission module 3700 is applied to an optical transmission apparatus having four channels. In the case where the optical transmission module 3700 according to the embodiment has four channels, four semiconductor devices 3410, 3420, 3430, and 3440 may be disposed on the circuit board 3300. For example, the semiconductor devices 3410, 3420, 3430, and 3440 may be any of the semiconductor devices described with reference to FIGS. 1 to 49.

The number of semiconductor devices arranged on the circuit board 3300 may be arranged to correspond to the number of channels. The number of semiconductor devices arranged on the circuit board 3300 may be three or less, or five or more, corresponding to the number of channels. For example, when the optical transmission module 3700 is applied to an optical transmission apparatus having eight channels, eight semiconductor devices may be arranged on the circuit board 3300. The plurality of semiconductor devices 3410, 3420, 3430, and 3440 may be arranged on the circuit board 3300 and may comprise, for example, an m*n matrix form arranged in a first direction and in a second direction perpendicular to the first direction. In addition, the plurality of semiconductor devices 3410, 3420, 3430, and 3440 may be arranged in one direction.

Meanwhile, the embodiments described above have been described as the optical transmission module comprises a semiconductor device providing a beam, so that the explanation has been developed from the standpoint of the optical transmission module and the optical transmission apparatus for providing an optical signal. However, the optical transmission module described above may be implemented to comprise a semiconductor device of a light receiving device rather than a light emitting device. That is, the semiconductor device can be realized as a light receiving device such as a photodiode, so that, according to an embodiment, an optical transmission module and an optical transmission apparatus for receiving an optical signal can be provided.

Then, an example of a semiconductor device applied to the optical transmission module and the optical transmission apparatus according to an embodiment will be described with reference to FIGS. 52 and 53. FIG. FIG. 52 is a plan view showing a semiconductor device according to an embodiment, and FIG. 53 is a sectional view taken along line E-E of the semiconductor device shown in FIG. 52.

The semiconductor device 1100 according to the embodiment may be a vertical cavity surface emitting laser (VCSEL) semiconductor device, as shown in FIGS. 52 and 53.

The semiconductor device 1100 may comprise a light emitting structure 1110, a first electrode 1120, and a second electrode 1160.

The first electrode 1120 may comprise an adhesive layer 1121, a substrate 1123, and a first conductive layer 1125.

The adhesive layer 1121 may comprise a material capable of eutectic bonding. For example, the adhesive layer 1121 may comprise at least one of AuSn, NiSn, and InAu.

The substrate 1123 may be provided as a conductive substrate. The substrate 1123 may comprise at least one selected from conductive materials including copper, gold, nickel, molybdenum, copper-tungsten, a carrier wafer such as Si, Ge, AlN, SiC, and the like. As another example, the substrate 1123 may be provided as a conductive sheet.

Meanwhile, when the substrate 1123 is provided as a suitable carrier wafer such as GaAs, the light emitting structure 3110 may be grown on the substrate 1123. In such a case, the adhesive layer 1121 may be omitted.

The first conductive layer 1125 may be disposed under the substrate 1123. The first conductive layer 1125 may be selected from among Ti, Ru, Rh, Ir, Mg, Zn, Al, In, Ta, Pd, Co, Ni, Si, Ge, Ag, Au, and their alloys, and may be provided as a single layer or a multilayer.

The light emitting structure 1110 may be disposed on the first electrode 1120 and comprise a first semiconductor layer 1111, an active layer 1113, an aperture layer 1114, and a second semiconductor layer 1115. The light emitting structure 1110 may be grown as a plurality of compound semiconductor layers. The plurality of compound semiconductor layers may be formed using an electron beam evaporator, physical vapor deposition, chemical vapor deposition, plasma laser deposition, dual-type thermal evaporator, sputtering, metal organic chemical vapor deposition, or the like.

The first semiconductor layer 1111 may be provided as at least one of Group III-V or Group II-VI compound semiconductors doped with a dopant of a first conductivity type. For example, the first semiconductor layer 1111 may be one of a group including GaAs, GaAl, InP, InAs, and GaP. The first semiconductor layer 1111 may be provided with a semiconductor material having a composition formula of, for example, $Al_xGa_{1-x}As$ (0<x<1)/$Al_yGa_{1-y}As$ (0<y<1) (y<x). The first semiconductor layer 1111 may be an n-type semiconductor layer doped with an n-type dopant that is the first conductivity type dopant such as Si, Ge, Sn, Se, or Te, for example. The first semiconductor layer 1111 may be a Distributed Bragg Reflector (DBR) having a thickness of $\lambda/4n$ by alternately arranging different semiconductor layers.

The active layer 1113 may be provided as at least one of Group III-V or Group II-VI compound semiconductors. For example, the active layer 1113 may be one of a group including GaAs, GaAl, InP, InAs, and GaP. When the active layer 1113 is implemented as a multi-well structure, the active layer 1113 may comprise alternately arranged a plurality of well layers and a plurality of barrier layers. The plurality of well layers may be provided as a semiconductor material having a composition formula of $In_pGa_{1-p}As$ (0≤p≤1), for example. The barrier layer may be disposed of a semiconductor material having a composition formula of $In_qGa_{1-q}As$ (0≤q<p), for example.

The aperture layer 1114 may be disposed on the active layer 1113. The aperture layer 1114 may comprise a circular opening at its center. The aperture layer 1114 may comprise a function of restricting current movement so as to concentrate a current to the center of the active layer 1113. That is, the aperture layer 1114 may adjust the resonance wavelength and adjust the angle of beam emitted from the active layer 1113 in the vertical direction. The aperture layer 1114 may comprise an insulating material such as $SiO_2$ or $Al_2O_3$. The aperture layer 1114 may have a higher band gap than the active layer 1113 and the first and second semiconductor layers 1111 and 1115.

The second semiconductor layer 1115 may be provided as at least one of Group III-V or Group II-VI compound semiconductors doped with a second conductivity type dopant. For example, the second semiconductor layer 1115 may be one of a group including GaAs, GaAl, InP, InAs, and GaP. The second semiconductor layer 1115 may be formed of a semiconductor material having a composition formula of, for example, $Al_xGa_{1-x}As$ (0<x<1)/$Al_yGa_{1-y}As$ (0<y<1) (y<x). The second semiconductor layer 1115 may be a p-type semiconductor layer having a p-type dopant that is the second conductivity type dopant such as Mg, Zn, Ca, Sr, or Ba. The second semiconductor layer 1115 may be a DBR having a thickness of $\lambda/4n$ by alternately arranging different semiconductor layers. The second semiconductor layer 1115 may have a reflectance lower than that of the first semiconductor layer 1111. For example, the first and second semiconductor layers 1111 and 1115 can form a resonant cavity in the vertical direction by a reflectance of 90% or more. At this time, light may be emitted to the outside through the second semiconductor layer 1115 which is lower than the reflectivity of the first semiconductor layer 1111.

The semiconductor device 1100 of the embodiment may comprise a second conductive layer 1140 provided on the light emitting structure 1110. The second conductive layer 1140 may be disposed on the second semiconductor layer 1115 and may be disposed along the edge of the light emitting region EA. The second conductive layer 1140 may be of a circular ring type when viewed from the top. The second conductive layer 1140 may comprise an ohmic contact function. The second conductive layer 1140 may be formed of at least one of Group III-V or Group II-VI compound semiconductors doped with a dopant of the second conductivity type. For example, the second conductive layer 1140 may be one of a group including GaAs, GaAl, InP, InAs, and GaP. The second conductive layer 1140 may be a p-type semiconductor layer having a p-type dopant such as Mg, Zn, Ca, Sr, and Ba.

The semiconductor device 1100 of the embodiment may comprise a protective layer 1150 provided on the light emitting structure 1110. The protective layer 1150 may be disposed on the second semiconductor layer 1115. The protective layer 1150 may overlap with the light emitting region EA in the vertical direction.

The semiconductor device 1100 of the embodiment may comprise an insulating layer 1130. The insulating layer 1130 may be disposed on the light emitting structure 1110. The insulating layer 1130 may comprise an insulating material such as an oxide, a nitride, a fluoride, and a sulfide of a material selected from a group including Al, Cr, Si, Ti, Zn, and Zr or an insulating resin. The insulating layer 1130 may be provided as at least one material selected from a group including, for example, $SiO_2$, $Si_3N_4$, $Al_2O_3$, and $TiO_2$. The insulating layer 1130 may be provided as a single layer or a multilayer.

The second electrode 1160 may be disposed on the second conductive layer 1140 and the insulating layer 1130. The second electrode 1160 may be electrically connected to the second conductive layer 1140. The second electrode 1160 may be formed of a material selected from a group including Ti, Ru, Rh, Ir, Mg, Zn, Al, In, Ta, Pd, Co, Ni, Si, Ge, Ag, Au, and those alloys. The second electrode 1160 may be provided as a single layer or a multilayer.

The features, structures, effects and the like described in the above embodiments are included in at least one embodiment and are not limited to one embodiment only. Further, with respect to the features, structures, effects, and the like described in the embodiments, other embodiments may be carried out with combinations or modifications by those having ordinary skill in the art. Accordingly, the contents relevant to the combinations and modifications should be construed as being included in the scope of the embodiments.

Although preferable embodiments have been proposed and set forth in the aforementioned description, the present invention should not be construed as limited thereto. It will be apparent that various deformations and modifications not illustrated are available within the scope without departing from inherent features of the embodiment of the present invention by any one having ordinary skill in the art. For example, each component specifically shown in the embodiments may be carried out with the modifications. In addition, it is apparent that differences relevant to the modifications and deformations are included in the scope of the embodiments set in the accompanying claims of the present invention.

INDUSTRIAL APPLICABILITY

According to the optical transmission module and the optical transmission apparatus of the embodiment, there is an advantage that the optical transmission module can be small in size and can perform optical alignment easily.

According to the optical transmission module and the optical transmission apparatus of the embodiment, the manufacturing cost can be reduced and the manufacturing process can be simplified, which is advantageous for mass production.

According to the optical transmission module and the optical transmission apparatus of the embodiment, there is an advantage that a coupling efficiency can be improved by implementing a high optical alignment scheme.

According to the semiconductor device, the optical module, and the optical assembly of the embodiment, there is an advantage that a technical effect capable of self-alignment between the optical cable and the semiconductor light emitting device can be provided.

According to the semiconductor device, the optical module and the optical assembly of the embodiment, there is an advantage that a technical effect capable of self-alignment and self-attachment between the optical cable and the semiconductor light emitting device can be provided.

The invention claimed is:

1. An optical transmission module, comprising:
   a board;
   a submount disposed directly on a first surface of the board;
   at least one vertical cavity surface emitting laser (VCSEL) semiconductor device, each VCSEL semiconductor device being disposed directly on a first surface of the submount and including a light emitting aperture that emits a circular beam; and
   a module housing comprising a coupling unit and a body, the coupling unit spaced apart from each VCSEL semiconductor device and facing the first surface of the submount, the body extending from the coupling unit toward the first surface of the board and disposed around the submount and each VCSEL semiconductor device,
   wherein the coupling unit of the module housing comprises at least one first opening, at least one through hole, and at least one second opening, each first opening facing and being aligned with a beam emitting surface of a respective VCSEL semiconductor device among the at least one VCSEL semiconductor device and having a diameter larger than a diameter of the beam emitting surface, each through hole extending from a respective first opening among the at least one first opening and passing through the coupling unit, and each second opening being connected to a respective through hole among the at least one through hole and provided at an outer surface of the coupling unit,
   wherein there are no intervening elements between each beam emitting surface and a lower surface of the coupling unit,
   wherein the body of the module housing is coupled to the first surface of the board,
   wherein the coupling unit of the module housing comprises a first coupling unit, a second coupling unit, and a protrusion,
   wherein the first coupling unit provides the at least one first opening and a first through hole of the at least one through hole,
   wherein the second coupling unit is connected to the first coupling unit and provides the at least one second opening and a second through hole of the at least one through hole that is connected to the first through hole,
   wherein the protrusion is disposed on a region where the first coupling unit and the second coupling unit are in contact with each other,
   wherein the protrusion is disposed to protrude toward a center of each first through hole in the region where the first coupling unit and the second coupling unit are in contact with each other,
   wherein a distance from the beam emitting surface of each VCSEL semiconductor device to a portion where the first through hole and the second through hole meet each other ranges from several tens of micrometers to several hundreds of micrometers, and
   wherein the portion where the first through hole and the second through hole meet each other directly faces and is aligned with the beam emitting surface of each VCSEL semiconductor device and has a diameter larger than the diameter of the beam emitting surface of each VCSEL semiconductor device.

2. The optical transmission module of claim 1, wherein each VCSEL semiconductor device is electrically connected to the submount, and the submount is electrically connected to the board.

3. The optical transmission module of claim 1, wherein the submount comprises a second surface extending from the first surface of the submount toward the board, and
wherein the body of the module housing is coupled to the second surface of the submount and the first surface of the board.

4. The optical transmission module of claim 1, wherein a diameter of the first through hole is smaller than a diameter of the second through hole in the portion where the first through hole and the second through hole meet each other.

5. The optical transmission module of claim 1, comprising an adhesive layer disposed between the body and the first surface of the board.

6. The optical transmission module of claim 1, wherein the at least one VCSEL semiconductor device directly disposed on the submount comprises a plurality of VCSEL semiconductor devices, and the at least one through hole of the coupling unit is among a plurality of through holes aligned to face to the beam emitting surface of each of the plurality of VCSEL semiconductor devices, respectively.

7. The optical transmission module of claim 1, wherein the module housing comprises an extension extending from the body in a direction perpendicular to the first surface of the board and provided around the board.

8. The optical transmission module of claim 1, wherein a diameter of the first through hole is reduced from the first opening to the region in which the first coupling unit and the second coupling unit are in contact with each other.

9. An optical transmission apparatus, comprising:
the optical transmission module according to claim 1; and
an optical cable coupled to the optical transmission module and comprising a core receiving a beam provided from the optical transmission module.

10. The optical transmission apparatus of claim 9, wherein a beam incident surface of the core is disposed parallel with the beam emitting surface of each VCSEL semiconductor device.

11. The optical transmission apparatus of claim 9, wherein a distance from the beam emitting surface of each VCSEL semiconductor device to a beam incident surface of the core is several tens of micrometers to several hundreds of micrometers.

12. An optical transmission module, comprising:
a board;
a submount disposed directly on an upper surface of the board in a vertical direction;
at least one vertical cavity surface emitting laser (VCSEL) semiconductor device, each VCSEL semiconductor device being disposed directly on an upper surface of the submount in the vertical direction and including a light emitting aperture that emits a circular beam; and
a module housing coupled to the board and comprising a coupling unit, a body, and an extension,
wherein a lower surface of the coupling unit is disposed spaced apart from each VCSEL semiconductor device and facing the upper surface of the submount,
wherein the body extends from the coupling unit toward the upper surface of the board and is disposed around side surfaces of the submount and each VCSEL semiconductor device,
wherein the extension extends from the body in a direction perpendicular to the upper surface of the board and is provided around side surfaces of the board, and
wherein a distance from a beam emitting surface of each VCSEL semiconductor device to the lower surface of the coupling unit of the module housing is several tens of micrometers to several hundreds of micrometers, the beam emitting surface of each VCSEL semiconductor device and the lower surface of the coupling unit directly face each other in the vertical direction and there are no intervening elements between each beam emitting surface and the lower surface of the coupling unit.

13. The optical transmission module of claim 12, wherein the coupling unit of the module housing is disposed to face and arranged in aligned with the beam emitting surface of each VCSEL semiconductor device.

14. The optical transmission module of claim 12, wherein the coupling unit of the module housing comprises at least one first opening, at least one through hole, and at least one second opening,
wherein each first opening faces to the beam emitting surface of each VCSEL semiconductor device and is provided with a diameter larger than a diameter of each beam emitting surface,
wherein each second opening is provided at an outer surface of the coupling unit, and
wherein each through hole connects a respective first opening among the at least one first opening and a respective second opening among the at least one second opening and is provided in the coupling unit.

15. The optical transmission module of claim 12, wherein a lower surface of the body of the module housing faces and is coupled to the upper surface of the board.

16. The optical transmission module of claim 15, comprising an adhesive layer disposed between the lower surface of the body and the upper surface of the board.

17. The optical transmission module of claim 12, wherein the at least one VCSEL semiconductor device disposed directly on the submount comprises a plurality of VCSEL semiconductor devices, and
wherein the at least one through hole of the coupling unit is among a plurality of through holes aligned to face to the beam emitting surface of each of the plurality of VCSEL semiconductor devices, respectively.

18. The optical transmission module of claim 14, wherein the coupling unit comprises a first coupling unit providing the at least one first opening, and a second coupling unit coupled to the first coupling unit and providing the at least one second opening,
wherein the at least one through hole, provided in the coupling unit and connecting the respective first opening and the respective second opening, comprises a first through hole provided in the first coupling unit and a second through hole provided in the second coupling unit, and
wherein a diameter of the first through hole is reduced from the first opening to a region in which the first coupling unit and the second coupling unit are in contact with each other.

19. The optical transmission module of claim 12, wherein the coupling unit of the module housing comprises a first coupling unit, a second coupling unit, and a protrusion,
- wherein the first coupling unit provides a first opening and a first through hole of the at least one through hole,
- wherein the second coupling unit is connected to the first coupling unit and provides a second opening and a second through hole of the at least one through hole that is connected to the first through hole,
- wherein the protrusion is disposed on a region where the first coupling unit and the second coupling unit are in contact with each other,
- wherein the protrusion is disposed to protrude toward a center of the first through hole in the region where the first coupling unit and the second coupling unit are in contact with each other, and
- wherein a distance from the beam emitting surface of each VCSEL semiconductor device to a portion where the first through hole and the second through hole meet each other ranges from several tens of micrometers to several hundreds of micrometers.

20. The optical transmission module of claim 19, wherein the portion where the first through hole and the second through hole meet each other directly faces and is aligned with the beam emitting surface of the VCSEL semiconductor device and has a diameter larger than the diameter of the beam emitting surface of the VCSEL semiconductor device.

\* \* \* \* \*